US012489897B2

(12) United States Patent
Wang

(10) Patent No.: US 12,489,897 B2
(45) Date of Patent: Dec. 2, 2025

(54) VIDEO ENCODING METHOD AND APPARATUS, VIDEO DECODING METHOD AND APPARATUS, AND DEVICE

(71) Applicant: Tencent Technology (Shenzhen) Company Limited, Shenzhen (CN)

(72) Inventor: Liqiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 421 days.

(21) Appl. No.: 17/969,624

(22) Filed: Oct. 19, 2022

(65) Prior Publication Data

US 2023/0050468 A1 Feb. 16, 2023

Related U.S. Application Data

(63) Continuation of application No. PCT/CN2021/118872, filed on Sep. 16, 2021.

(30) Foreign Application Priority Data

Sep. 27, 2020 (CN) .......................... 202011032892.5
Sep. 27, 2020 (CN) .......................... 202011032954.2

(51) Int. Cl.
*H04N 19/124* (2014.01)
*H04N 19/107* (2014.01)
(Continued)

(52) U.S. Cl.
CPC ......... *H04N 19/124* (2014.11); *H04N 19/107* (2014.11); *H04N 19/136* (2014.11); *H04N 19/159* (2014.11); *H04N 19/176* (2014.11)

(58) Field of Classification Search
CPC ...... H04N 19/18; H04N 19/70; H04N 19/124; H04N 19/44; H04N 19/46; H04N 19/60;
(Continued)

(56) References Cited

U.S. PATENT DOCUMENTS

2014/0133553 A1 5/2014 Shima
2020/0288130 A1 9/2020 Seregin et al.
(Continued)

FOREIGN PATENT DOCUMENTS

CN 110650343 A 1/2020
CN 110999293 A 4/2020
(Continued)

OTHER PUBLICATIONS

Tencent Technology, ISR, PCT/CN2021/118872, Dec. 7, 2021, 2 pgs.

(Continued)

*Primary Examiner* — Farhan Mahmud
(74) *Attorney, Agent, or Firm* — Morgan, Lewis & Bockius LLP

(57) ABSTRACT

A video encoding method includes: decoding a target coding unit to obtain a quantization coefficient matrix corresponding to the target coding unit; determining first reference information according to a quantization coefficient in the quantization coefficient matrix; obtaining a value of a target flag bit corresponding to the first reference information, the target flag bit being a flag bit of a target sub-block position, the target sub-block position being a position of a sub-block that requires processing of residual data in a coding unit; and determining the target sub-block position of the target coding unit according to the value of the target flag bit. A flag bit of a sub-block transform position or a transform skip sub-block position in a target coding unit is implicitly indicated using a quantization coefficient in a quantization coefficient matrix corresponding to a coding unit.

19 Claims, 14 Drawing Sheets

(51) Int. Cl.
*H04N 19/136* (2014.01)
*H04N 19/159* (2014.01)
*H04N 19/176* (2014.01)

(58) Field of Classification Search
CPC .. H04N 19/122; H04N 19/136; H04N 19/157; H04N 19/463
See application file for complete search history.

(56) References Cited

U.S. PATENT DOCUMENTS

2021/0409772 A1   12/2021  Shima
2022/0007057 A1*  1/2022  Liu ..................... H04N 19/119

FOREIGN PATENT DOCUMENTS

| JP | 2015159378 A | 9/2020 |
|---|---|---|
| WO | WO 2020106124 A1 | 5/2020 |
| WO | WO 2020162690 A1 | 8/2020 |
| WO | WO 2020162732 A1 | 8/2020 |
| WO | WO 2020182213 A1 | 9/2020 |
| WO | WO 2020184229 A1 | 9/2020 |

OTHER PUBLICATIONS

Kyohei Unno, "AHG9: On Signaling of the Maximum Transform Skip Size", Joint Video Experts Team (JVET) of ITU-T SG 16 WP 3 and ISO/IEC JTC 1/SC 29/WG 11, 19th Meeting: by Teleconference, Jun. 22-Jul. 1, 2020, KDDI Research, Inc., Jun. 10, 2020, 14 pgs.
Tencent Technology, WO, PCT/CN2021/118872, Dec. 7, 2021, 5 pgs.
Tencent Technology, Iprp, PCT/CN2021/118872, Mar. 28, 2023, 6 pgs.
Tencent Technology, Extended European Search Report and Supplementary Search Report, EP21871410.3, Oct. 20, 2023, 10 pgs.
Tencent Technology, European Office Action, EP Patent Application No. 21871410.3, May 7, 2025, 4 pgs.

* cited by examiner (a)

(b)

(c)

(d)

VIDEO ENCODING METHOD AND APPARATUS, VIDEO DECODING METHOD AND APPARATUS, AND DEVICE

CROSS-REFERENCE TO RELATED APPLICATIONS

This application is a continuation application of PCT Patent Application No. PCT/CN2021/118872, entitled "VIDEO CODING/DECODING METHOD, APPARATUS, AND DEVICE" filed on Sep. 16, 2021, which claims priority to Chinese Patent Application No. 202011032954.2, filed with the State Intellectual Property Office of the People's Republic of China on Sep. 27, 2020, and entitled "VIDEO ENCODING METHOD AND APPARATUS, VIDEO DECODING METHOD AND APPARATUS, AND DEVICE", and Chinese Patent Application No. 202011032892.5, filed with the State Intellectual Property Office of the People's Republic of China on Sep. 27, 2020, and entitled "VIDEO ENCODING METHOD AND APPARATUS, VIDEO DECODING METHOD AND APPARATUS, AND DEVICE", all of which are incorporated herein by reference in their entirety.

FIELD OF THE TECHNOLOGY

Embodiments of this application relate to the field of audio and video technologies, and in particular, to a video encoding method and apparatus, a video decoding method and apparatus, and a device.

BACKGROUND OF THE DISCLOSURE

A video signal is an image sequence that includes a plurality of frames. As the data bandwidth of the video signal is high after digitization, it is difficult for a computer device to store, transmit, or perform other processing on the video signal directly. Therefore, the data bandwidth of the video signal needs to be reduced by using a video compression technology.

The video compression technology is implemented by video coding. In some mainstream video coding technologies, a series of operations and processing are performed on an inputted raw video signal by using a hybrid coding framework. At an encoder side, an encoder performs block partitioning on the inputted raw video signal (video sequence) to obtain a number of non-overlapping coding units. Then predictive coding is performed on the coding units to obtain residual data. Next, transform and quantization are performed on the residual data or transform skip and quantization are performed on the residual data to obtain a quantization coefficient matrix. Subsequently, entropy coding or statistical coding is performed on the quantization coefficient matrix and other information to obtain a compressed video bit stream. At a decoder side, a decoder performs an inverse operation of the above operation performed at the encoder side on the obtained video bit stream. For transform and quantization of a residual signal corresponding to a coding unit or for transform skip and quantization of a residual signal corresponding to a coding unit, sub-block partitioning is performed on the coding unit in the related art, and transform and quantization are performed on residual data for some sub-blocks obtained from the partitioning, or transform skip and quantization are performed on residual data while other sub-blocks are forcibly cleared to zero. For sub-blocks that require transform and quantization of residual data or for sub-blocks that require transform skip and quantization of residual data, positions of these sub-blocks (referred to as a "target sub-block position" in this application) are indicated by flag bits in the relevant art. In a process of video encoding, the encoder explicitly encodes the flag bits to write the flag bits into a video bit stream, and subsequently the decoder decodes the video bit stream to obtain the flag bits, to further derive target sub-block positions according to the flag bits.

However, the encoding of flag bits of target sub-block positions leads to an increase in the number of bits in a bit stream, which is not conducive to improving the efficiency of video coding.

SUMMARY

Embodiments of this application provide a video encoding method and apparatus, a video decoding method and apparatus, and a device, which can reduce the number of bits in a bit stream and improve the efficiency of video coding. The technical solutions are as follows.

According to an aspect, the embodiments of this application provide a video decoding method, the method including:
  decoding a target coding unit to obtain a quantization coefficient matrix corresponding to the target coding unit;
  determining first reference information according to a quantization coefficient in the quantization coefficient matrix;
  obtaining a value of a target flag bit corresponding to the first reference information, the target flag bit being a flag bit of a target sub-block position, the target sub-block position being a position of a sub-block that requires processing of residual data in a coding unit; and
  determining the target sub-block position of the target coding unit according to the value of the target flag bit.

In an example, the processing of the residual data includes: performing transform and quantization on the residual data or performing transform skip and quantization on the residual data; in accordance with a determination that processing of the residual data includes performing transform and quantization on the residual data, setting the target flag bit as a transform flag bit, setting the target sub-block position as a sub-block transform position, and setting the sub-block transform position as a position of a sub-block that requires transform and quantization of the residual data in the coding unit; and in accordance with a determination that the processing of the residual data includes performing transform skip and quantization on the residual data, setting the target flag bit as a transform skip flag bit, setting the target sub-block position as a transform skip sub-block position, and setting the transform skip sub-block position as a position of a sub-block that requires transform skip and quantization of the residual data in the coding unit.

According to another aspect, the embodiments of this application provide a video encoding method, the method including:
  obtaining a quantization coefficient matrix corresponding to a target coding unit;
  determining a value of a target flag bit whose value needs to be indicated according to the quantization coefficient matrix, the target flag bit being a flag bit of a target sub-block position of the target coding unit, the target sub-block position being a position of a sub-block that requires processing of residual data in the target coding unit;

adjusting a quantization coefficient in the quantization coefficient matrix according to the value of the target flag bit to obtain an adjusted quantization coefficient matrix; and encoding the adjusted quantization coefficient matrix.

In an example, the processing of the residual data includes: performing transform and quantization on the residual data or performing transform skip and quantization on the residual data; when the processing of the residual data includes performing transform and quantization on the residual data, the target flag bit is a transform flag bit, the target sub-block position is a sub-block transform position, and the sub-block transform position is a position of a sub-block that requires transform and quantization of the residual data in the coding unit; and when the processing of the residual data includes performing transform skip and quantization on the residual data, the target flag bit is a transform skip flag bit, the target sub-block position is a transform skip sub-block position, and the transform skip sub-block position is a position of a sub-block that requires transform skip and quantization of the residual data in the coding unit.

In an example, the adjusting a quantization coefficient in the quantization coefficient matrix according to the value of the target flag bit to obtain an adjusted quantization coefficient matrix includes: determining reference information corresponding to the value of the target flag bit as first reference information; obtaining at least one quantization coefficient in the quantization coefficient matrix; performing statistical summation on the at least one quantization coefficient to obtain a statistical summation result; and adjusting the at least one quantization coefficient according to the statistical summation result, the first reference information, and a first calculation factor to obtain at least one adjusted quantization coefficient, the first reference information being obtained by calculating a remainder of a statistical summation result of the at least one adjusted quantization coefficient by using the first calculation factor.

In an example, the at least one quantization coefficient in the quantization coefficient matrix is obtained in any manner in the following: obtaining all quantization coefficients in the quantization coefficient matrix; obtaining quantization coefficients in at least one row and at least one column in the quantization coefficient matrix; obtaining all quantization coefficients in a scan region coefficient coding SRCC region of the quantization coefficient matrix; and obtaining quantization coefficients in at least one row and at least one column in an SRCC region of the quantization coefficient matrix.

In an example, the at least one quantization coefficient in the quantization coefficient matrix is obtained in at least one manner in the following: obtaining a quantization coefficient in at least one designated position in the quantization coefficient matrix; obtaining quantization coefficients in at least one row in the quantization coefficient matrix; obtaining quantization coefficients in at least one column in the quantization coefficient matrix; obtaining quantization coefficients in at least one diagonal in the quantization coefficient matrix; obtaining quantization coefficients in first n positions in a scan order in the quantization coefficient matrix, n being a positive integer; and obtaining quantization coefficients in middle m positions in a scan order in the quantization coefficient matrix, m being a positive integer.

In an example, the at least one quantization coefficient in the quantization coefficient matrix is obtained in any manner in the following: obtaining a quantization coefficient in at least one designated position in an SRCC region of the quantization coefficient matrix; obtaining quantization coefficients in at least one row in an SRCC region of the quantization coefficient matrix; obtaining quantization coefficients in at least one column in an SRCC region of the quantization coefficient matrix; obtaining quantization coefficients in at least one diagonal in an SRCC region of the quantization coefficient matrix; obtaining quantization coefficients in first s positions in a scan order in an SRCC region of the quantization coefficient matrix, s being a positive integer; and obtaining quantization coefficients in middle t positions in a scan order in an SRCC region of the quantization coefficient matrix, t being a positive integer.

In an example, the performing statistical summation on the at least one quantization coefficient to obtain a statistical summation result includes: performing statistical summation on an original value of the at least one quantization coefficient to obtain the statistical summation result; or performing statistical summation on an absolute value of the at least one quantization coefficient to obtain the statistical summation result; or performing statistical summation on an original value of a quantization coefficient with an original value being an odd number in the at least one quantization coefficient to obtain the statistical summation result; or performing statistical summation on an original value of a quantization coefficient with an absolute value being an odd number in the at least one quantization coefficient to obtain the statistical summation result; or performing statistical summation on an original value of a quantization coefficient with an original value being an even number in the at least one quantization coefficient to obtain the statistical summation result; or performing statistical summation on an original value of a quantization coefficient with an absolute value being an even number in the at least one quantization coefficient to obtain the statistical summation result; or performing statistical summation on an original value of a quantization coefficient with an original value being a nonzero even number in the at least one quantization coefficient to obtain the statistical summation result; or performing statistical summation on an original value of a quantization coefficient with an absolute value being a nonzero even number in the at least one quantization coefficient to obtain the statistical summation result; or mapping quantization coefficients in the at least one quantization coefficient to obtain at least one mapped quantization coefficient, and performing statistical summation on the at least one mapped quantization coefficient to obtain the statistical summation result.

In an example, the mapping quantization coefficients in the at least one quantization coefficient to obtain at least one mapped quantization coefficient includes: mapping a quantization coefficient with an original value being an odd number in the at least one quantization coefficient into a first value to obtain at least one first quantization coefficient, and mapping a quantization coefficient with an original value being an even number in the at least one quantization coefficient into a second value to obtain at least one second quantization coefficient, the at least one mapped quantization coefficient including the at least one first quantization coefficient and/or the at least one second quantization coefficient; or mapping a quantization coefficient with an original value being zero in the at least one quantization coefficient into a first value to obtain at least one first quantization coefficient, and mapping a quantization coefficient with an original value being nonzero in the at least one quantization coefficient into a second value to obtain at least one second quantization coefficient, the at least one mapped quantization coefficient including the at least one first quantization coefficient and/or the at least one second quantization coefficient; or mapping a quantization coefficient with an original value being a nonzero even number in the at least one quantization coefficient into a first value to obtain at least one first quantization coefficient, and mapping a quantization coefficient with an original value being an odd number or zero in the at least one quantization coefficient into a second value to obtain at least one second quantization coefficient, the at least one mapped quantization coefficient including the at least one first quantization coefficient and/or the at least one second quantization coefficient; or performing computational mapping on the at least one quantization coefficient to obtain the at least one mapped quantization coefficient, the computational mapping including at least one of the following: negative mapping, additive mapping, subtractive mapping, multiplicative mapping, and divisive mapping.

In an example, the target flag bit includes at least one of the following: a first flag bit, used for indicating a partitioning direction of the target sub-block position of the target coding unit, the partitioning direction including transverse partitioning and longitudinal partitioning; a second flag bit, used for indicating the target sub-block position of the target coding unit based on the partitioning direction indicated by the first flag bit.

In an example, the method further includes: indicating, according to a target index in encoded data, whether it is necessary to determine a value of the target flag bit according to the quantization coefficient matrix for a coding unit in the encoded data, where the coding unit in the encoded data includes any one of the following: all coding units in the encoded data, a coding unit using an intra-frame prediction mode in the encoded data, and a coding unit using an inter-frame prediction mode in the encoded data.

In an example, the determining, according to a target index in encoded data, whether it is necessary to determine a value of the target flag bit according to the quantization coefficient matrix for a coding unit in the encoded data includes at least one of the following: indicating, according to a first index encoded in a sequence header included in the encoded data, whether it is necessary to determine the value of the target flag bit according to the quantization coefficient matrix for a coding unit in a first sequence, the target index including the first index; indicating, according to a second index encoded in an image header included in the encoded data, whether it is necessary to determine the value of the target flag bit according to the quantization coefficient matrix for a coding unit in a first image, the target index including the second index; indicating, according to a third index encoded in a slice header included in the encoded data, whether it is necessary to determine the value of the target flag bit according to the quantization coefficient matrix for a coding unit in a first slice, the target index including the third index; and indicating, according to a fourth index encoded in header information of a large coding unit included in the encoded data, whether it is necessary to determine the value of the target flag bit according to the quantization coefficient matrix for a coding unit in a first large coding unit, the target index including the fourth index.

In an example, the determining, according to a target index in encoded data, whether it is necessary to determine a value of the target flag bit according to the quantization coefficient matrix for a coding unit in the encoded data includes: when it is necessary to determine the value of the target flag bit according to the quantization coefficient matrix for the coding unit in the first image, indicating, according to a first index encoded in a sequence header included in the encoded data and a second index encoded in an image header included in the encoded data, whether it is necessary to determine the value of the target flag bit according to the quantization coefficient matrix for the coding unit in the first image, the target index including the first index and the second index.

In an example, the obtaining a quantization coefficient matrix corresponding to a target coding unit includes: performing predictive coding on the target coding unit to obtain residual data corresponding to the target coding unit; determining the target sub-block position of the target coding unit; and processing the residual data according to the target sub-block position to obtain the quantization coefficient matrix.

In an example, the method further includes: determining, according to the value of a flag bit of the target sub-block position, whether the quantization coefficient matrix needs to be rotated; and when it is determined that the quantization coefficient matrix needs to be rotated, rotating a direction of the quantization coefficient matrix from a second direction to a first direction to obtain a rotated quantization coefficient matrix, the rotated quantization coefficient matrix being used for encoding.

According to still another aspect, the embodiments of this application provide a video decoding apparatus, the apparatus including:
    a decoding module, configured to decode a target coding unit to obtain a quantization coefficient matrix corresponding to the target coding unit;
    an information determining module, configured to determine first reference information according to a quantization coefficient in the quantization coefficient matrix;
    a value obtaining module, configured to obtain a value of a target flag bit corresponding to the first reference information, the target flag bit being a flag bit of a target sub-block position, the target sub-block position being a position of a sub-block that requires processing of residual data in a coding unit; and
    a position determining module, configured to determine the target sub-block position of the target coding unit according to the value of the target flag bit.

In an example, the processing of the residual data includes: performing transform and quantization on the residual data or performing transform skip and quantization on the residual data; when the processing of the residual data includes performing transform and quantization on the residual data, the target flag bit is a transform flag bit, the target sub-block position is a sub-block transform position, and the sub-block transform position is a position of a sub-block that requires transform and quantization of the residual data in the coding unit; and when the processing of the residual data includes performing transform skip and quantization on the residual data, the target flag bit is a transform skip flag bit, the target sub-block position is a transform skip sub-block position, and the transform skip sub-block position is a position of a sub-block that requires transform skip and quantization of the residual data in the coding unit.

According to yet another aspect, the embodiments of this application provide a video encoding apparatus, the apparatus including:
    a matrix obtaining module, configured to obtain a quantization coefficient matrix corresponding to a target coding unit;
    a value determining module, configured to determine a value of a target flag bit whose value needs to be indicated according to the quantization coefficient matrix, the target flag bit being a flag bit of a target sub-block position of the target coding unit, the target sub-block position being a position of a sub-block that requires processing of residual data in the target coding unit;

a coefficient adjustment module, configured to adjust a quantization coefficient in the quantization coefficient matrix according to the value of the target flag bit to obtain an adjusted quantization coefficient matrix; and an encoding module, configured to encode the adjusted quantization coefficient matrix.

In an example, the processing of the residual data includes: performing transform and quantization on the residual data or performing transform skip and quantization on the residual data; when the processing of the residual data includes performing transform and quantization on the residual data, the target flag bit is a transform flag bit, the target sub-block position is a sub-block transform position, and the sub-block transform position is a position of a sub-block that requires transform and quantization of the residual data in the coding unit; and when the processing of the residual data includes performing transform skip and quantization on the residual data, the target flag bit is a transform skip flag bit, the target sub-block position is a transform skip sub-block position, and the transform skip sub-block position is a position of a sub-block that requires transform skip and quantization of the residual data in the coding unit.

According to a further aspect, the embodiments of this application provide a computer device, the computer device including a processor and a memory, the memory storing at least one instruction, at least one program, a code set or an instruction set, the at least one instruction, the at least one program, the code set, or the instruction set being loaded or executed by the processor to implement the foregoing video decoding method or to implement the foregoing video encoding method.

According to a further aspect, the embodiments of this application provide a computer-readable storage medium, the computer-readable storage medium storing at least one instruction, at least one program, a code set or an instruction set, the at least one instruction, the at least one program, the code set, or the instruction set being loaded or executed by a processor to implement the foregoing video decoding method or to implement the foregoing video encoding method.

According to a further aspect, the embodiments of this application provide a computer program product or a computer program, the computer program product or the computer program including computer instructions, the computer instructions being stored in a computer-readable storage medium, a processor of a computer device reading the computer instructions from the computer-readable storage medium, the processor executing the computer instructions, to cause the computer device to perform the foregoing video decoding method or implement the foregoing video encoding method. According to a further aspect, the embodiments of this application provide a chip, the chip including a programmable logic circuit and/or program instructions, the chip being configured to, when being run on a computer device, implement the foregoing video decoding method or to implement the foregoing video encoding method.

The technical solutions provided in the embodiments of this application may bright the following beneficial effects:

a flag bit of a sub-block transform position in a target coding unit is implicitly indicated by using a quantization coefficient in a quantization coefficient matrix corresponding to a coding unit to determine the sub-block transform position in the target coding unit, to avoid explicit coding of the sub-block transform position, thereby reducing a quantity of bits occupied by a video bit stream, and improving the efficiency of video coding. In addition, in the technical solutions provided in the embodiments of this application, it is not necessary to explicitly encode and decode every flag bit at a sub-block transform position, so that the processing overheads of a video encoder and a video decoder can be reduced, which is conducive to improving the encoding efficiency of the video encoder and the decoding efficiency of the video decoder. Alternatively, a flag bit of a transform skip sub-block position in a target coding unit is implicitly indicated by using a quantization coefficient in a quantization coefficient matrix corresponding to a coding unit to determine the transform skip sub-block position in the target coding unit, to avoid explicit coding of the transform skip sub-block position, thereby reducing a quantity of bits occupied by a video bit stream, and improving the efficiency of video coding. In addition, in the technical solutions provided in the embodiments of this application, it is not necessary to explicitly encode and decode every flag bit at a transform skip sub-block position, so that the processing overheads of a video encoder and a video decoder can be reduced, which is conducive to improving the encoding efficiency of the video encoder and the decoding efficiency of the video decoder.

DESCRIPTION OF EMBODIMENTS

Figure 1:
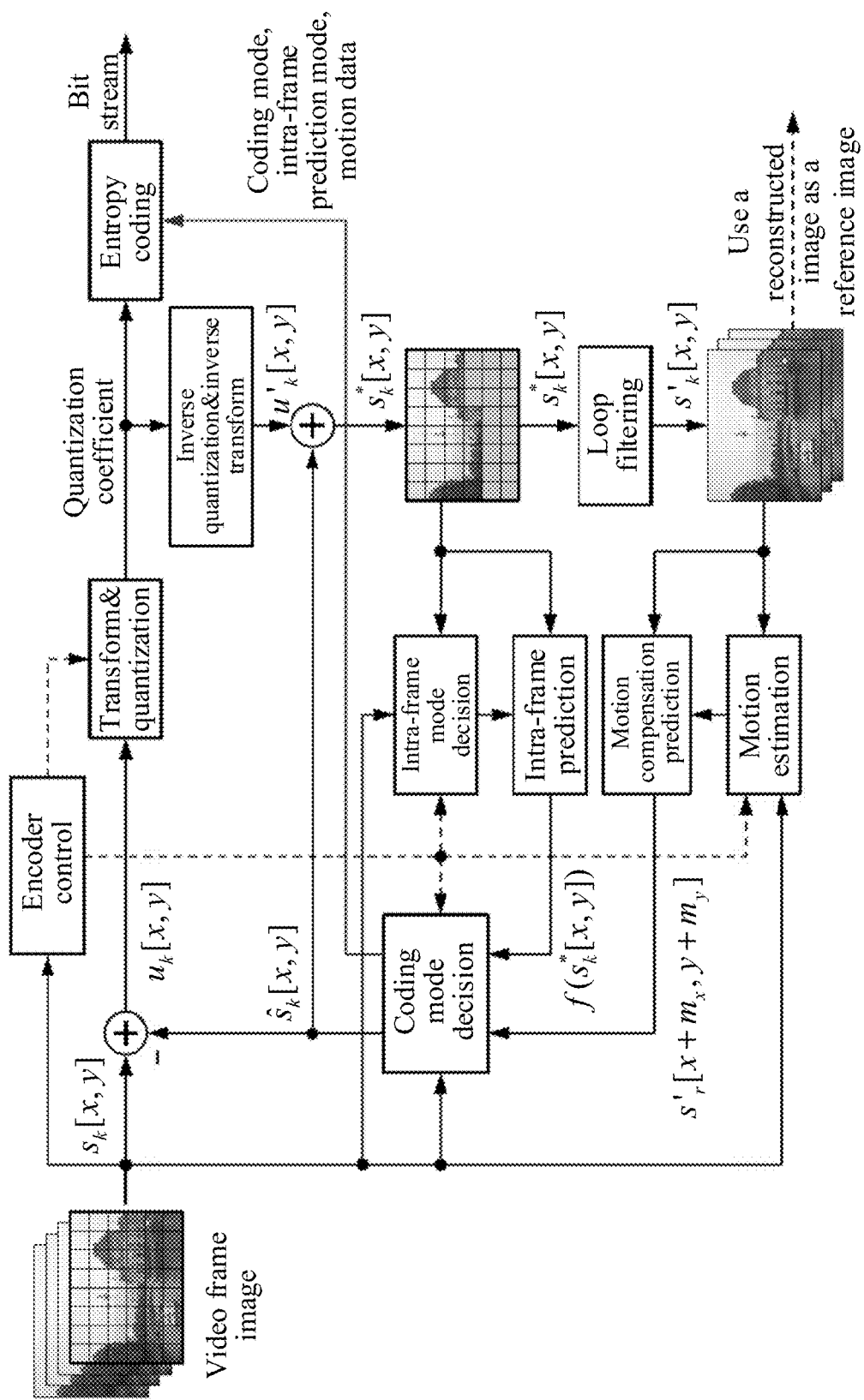
FIG. 1 is a schematic diagram of a video encoding process according to an embodiment of this application.

A video compression technology is first brief described with reference to FIG. 1. FIG. 1 is a schematic diagram of a video encoding process according to an embodiment of this application.

A video signal is an image sequence that includes one or more frames. A frame is a representation of spatial information of the video signal. A YUV mode is used as an example. One frame includes one luminance sample matrix (Y) and two chrominance sample matrices (Cb and Cr). For an obtaining manner of a video signal, a video signal may be photographed by a camera and generated by a computer. Due to different statistical characteristics, compression coding modes corresponding to the manners may be different.

In some mainstream video compression technologies such as H.265/High Efficient Video Coding (HEVC), an H.266/Versatile Video Coding (VVC) standard, Audio Video coding Standard (AVS) (for example, AVS3), a series of operations and processing are performed on an inputted raw video signal by using a hybrid coding framework:

1. Block Partition Structure: An inputted image is partitioned into a plurality of non-overlapping processing units. Similar compression operations are performed on each processing unit. Each processing unit is referred to as a Coding Tree Unit (CTU) or a Large Coding Unit (LCU). A CTU may continue to be further partitioned to obtain one or more basic coding units, referred to as coding units (CUs). Each CU is the most fundamental element in one encoding stage. During prediction, a CU needs to be further divided into different predict units (PUs). Various coding modes that may be used for each CU are described below.

2. Predictive coding includes an intra-frame prediction mode, an inter-frame prediction mode, and the like. A residual video signal is obtained after the prediction of a raw video signal through a selected reconstructed video signal. An encoder side needs to determine and select the most appropriate mode from various possible predictive coding modes for a current CU, and informs the mode to a decoder side. Intra-frame prediction refers to that a predicted signal is from an encoded and reconstructed region in the same image. Inter-frame prediction refers to that a predicted signal is from another encoded image (referred to as a reference image) different from a current image.

3. Transform&quantization: Transform operations such as Discrete Fourier Transform (DFT) and Discrete Cosine Transform (DCT) are performed on a residual video signal to convert the signal into a transform domain, which is referred to as a conversion coefficient. A lossy quantization operation is further performed on a signal in the transform domain, and certain information is discarded, so that a quantized signal is readily available for compression and expression. In some video coding standards, there may be more than one transform modes for selection. Therefore, the encoder side also needs to select one transform mode for the current CU and informs the decoder side of the mode. The fineness of quantization is usually determined by a quantization parameter. When the value of a quantization parameter (QP) is larger, it indicates that coefficients in a larger value range are quantized into one same output, usually causing a severer distortion and a lower bit rate. In comparison, when the value of the QP is smaller, it indicates that coefficients in a smaller value range are quantized into one same output, usually causing a less severe distortion and a corresponding higher bit rate.

4. Entropy coding or statistical coding: Statistical compression coding is performed on a quantized transform domain signal according to the frequency of each value, and finally a binary (0 or 1) compressed bit stream (or referred to as a "video bit stream", and is generally referred to as "a video bit stream" below for ease of description). In addition, other information such as a selected mode and a motion vector generated through coding also require entropy coding to reduce a bit rate. Statistical coding is a lossless coding mode, and can effectively reduce a bit rate required to express the same signal. A common statistical coding mode is Variable Length Coding (VLC) or Content Adaptive Binary Arithmetic Coding (CABAC).

5. Loop filtering: A reconstructed decoded image may be obtained by performing operations such as inverse quantization, inverse transform, and predictive compensation (inverse operations of 2 to 4 in the foregoing) on an encoded image. Compared with a raw image, in a reconstructed image, some information may be different from that in the raw image due to the impact of quantization, causing a distortion. Filtering operations, for example, operations of filters such as deblocking, Sample Adaptive Offset or an Adaptive Lattice Filter, are performed on the reconstructed image, so that the degree of the distortion caused by quantization can be effectively reduced. These filtered reconstructed images are used as a reference for subsequent encoded images for predicting a future signal. Therefore, the foregoing filtering operations are also referred to as loop filtering, or referred to as a filtering operation in an encoding loop.

At a decoder side, a decoder performs an inverse operation of the above operation performed at the encoder side on the obtained video bit stream. As can be seen from the foregoing description, at the decoder side, for each CU, the decoder first decodes a video bit stream to obtain a quantization coefficient matrix, various coding modes, and the like. Subsequently, in one aspect, inverse quantization and inverse transform are performed on a quantization coefficient matrix to obtain residual data corresponding to a coding unit, or inverse quantization is performed on a quantization coefficient matrix to obtain residual data corresponding to a coding unit. In another aspect, a predicted signal corresponding to the coding unit is obtained according to various coding mode information. Next, a reconstructed signal may be obtained according to the residual data and predicted information (residual data and the predicted signal). Finally, processing such as loop filtering is performed on the reconstructed signal to obtain an eventual video output signal.

In the embodiments of this application, when inverse quantization and inverse transform are performed on a quantization coefficient matrix to obtain residual data corresponding to a coding unit, the quantization coefficient matrix includes a quantized transform coefficient (or referred to as a "quantization coefficient"). Therefore, the "quantization coefficient matrix" may also be referred to as a "transform quantization coefficient matrix" or the like. With the evolution of video compression technologies and different naming habits, the quantization coefficient matrix may have another name. It is to be understood that the name "quantization coefficient matrix" does not constitute a limitation to this application. Subsequent names having the same meaning as the "quantization coefficient matrix" also fall within the protection scope of this application. In the embodiments of this application, at the encoder side, the encoder may perform transform and quantization on residual data to obtain a quantization coefficient matrix or may perform transform skip and quantization on residual data to obtain a quantization coefficient matrix. For the decoder side, when the encoder performs transform and quantization on residual data to obtain a quantization coefficient matrix, the decoder performs inverse quantization and inverse transform on the quantization coefficient matrix to obtain residual data. In a case that the encoder performs transform skip and quantization on residual data to obtain a quantization coefficient matrix, the decoder performs inverse quantization on the quantization coefficient matrix to obtain residual data.

As can be seen from the foregoing description, because there may be a relatively large prediction error in predictive coding, a residual needs to be transmitted to compensate for a predicted signal, thereby improving the quality of a reconstructed signal. As shown in FIG. 1, in a hybrid coding framework, residual data is a difference between a raw video signal (a raw image) and a predicted signal (a predicted image).

$$u_k[x,y] = S_k[x,y] - \hat{S}_k[x,y],$$

$u_k[x,y]$ is the residual data, $S_k[x,y]$ is the raw video signal, and $\hat{S}_k[x,y]$ is the predicted signal.

In an example, energy concentration may be performed on residual data through a transform by using the relevance of residual data, to make energy concentrate at a relatively small low-frequency coefficient, to allow most coefficients to have relatively small values. Next, through subsequent quantization, a relatively small coefficient value becomes zero. Through transform and quantization of residual data or through transform skip and quantization of residual data, the cost of coding residual data is greatly reduced, thereby improving the efficiency of video coding.

Figure 2:
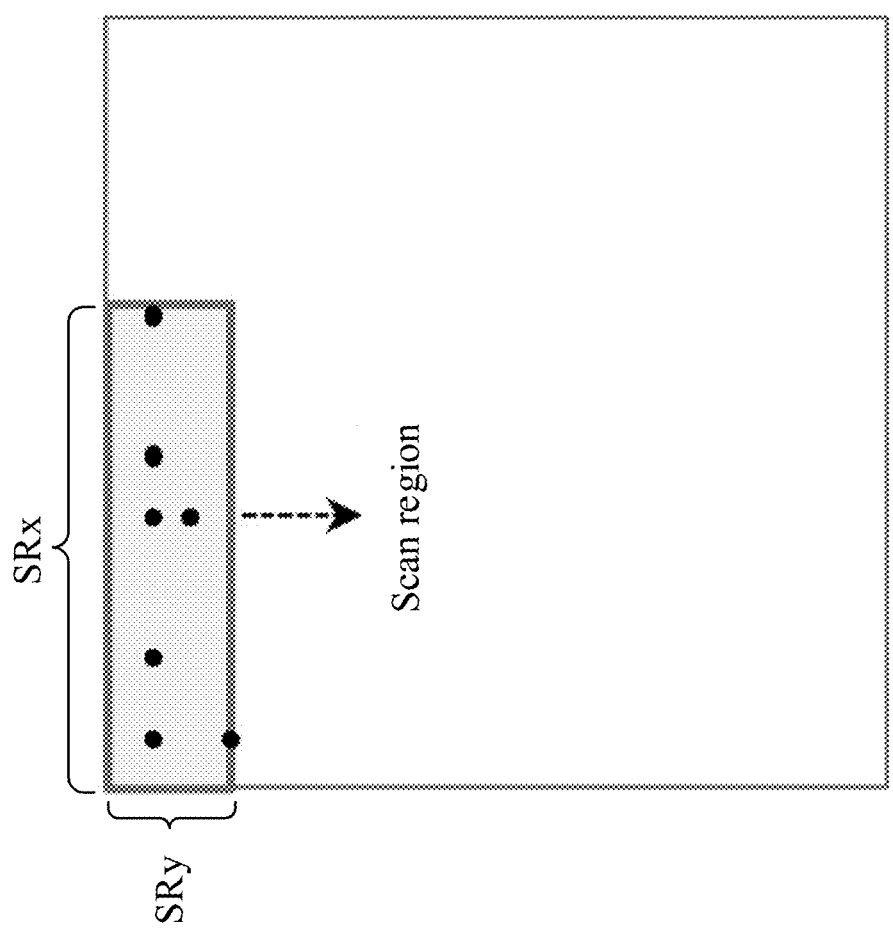
FIG. 2 is a schematic diagram of an SRCC scan region according to an embodiment of this application.
Figure 3:
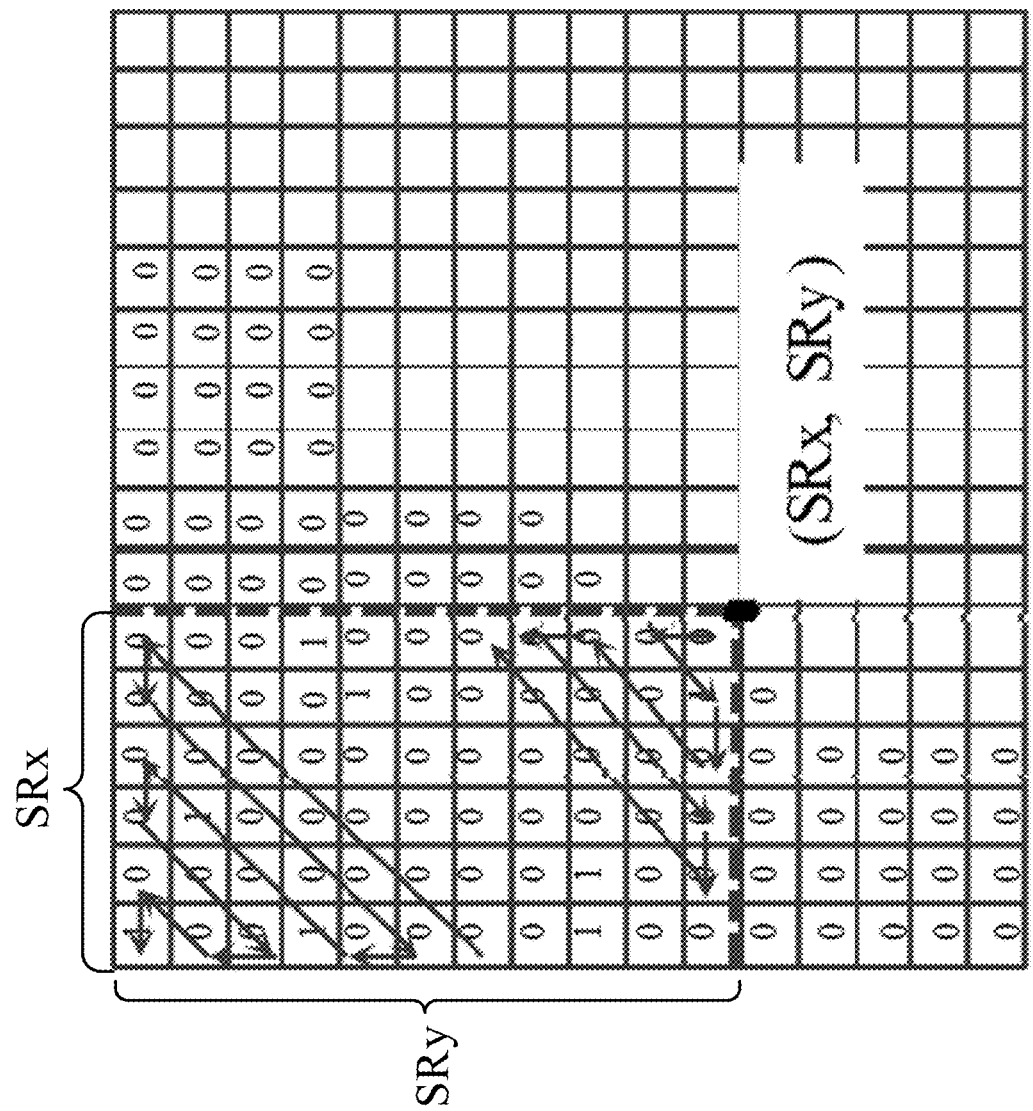
FIG. 3 is a schematic diagram of an SRCC scan order according to an embodiment of this application.

After transform and quantization of a residual signal or after transform skip and quantization, nonzero coefficients in a quantization coefficient matrix are highly likely gather in a left area and an upper area of the matrix, and 0s usually appear in a right area and a lower area of the matrix. Therefore, a Scan Region Coefficient Coding (SRCC) technology is introduced. Through the SRCC technology, it may be labeled that the size of an upper left area of nonzero coefficients included in each quantization coefficient matrix (having a size of W×H) is SRx×SRy. SRx is a horizontal coordinate of a rightmost nonzero coefficient in a quantization coefficient block, and SRy is a vertical coordinate of a lowermost nonzero coefficient in the quantization coefficient block. 1≤SRx≤W, and 1≤SRy≤H. Coefficients outside the area are all 0. In the SRCC technology, a quantization coefficient area that needs to be scanned in one quantization coefficient matrix is determined by using (SRx, SRy). As shown in FIG. 2, only quantization coefficients in a scan area labeled by (SRx, SRy) need to be coded. A scan order of coding is shown in FIG. 3, and may be an opposite Z shaped scan from the lower right corner to the upper left corner.

A conventional Discrete Cosine Transform (DCT) is used as an example. The transform is shown as follows:

$$C_{O_k} = C U_k C^T.$$

A two-dimensional discrete transform is implemented by using two separate one-dimensional discrete transform (a horizontal transform and a vertical transform). In some embodiments, due to the diversity of residual distribution, a single DCT cannot adapt to all residual characteristics. Therefore, a transform kernel such as a Discrete Sine Transform (DST) 7 and DCT8 is introduced into a transform module, and different transform kernels may be used for a horizontal transform and a vertical transform. An adaptive multiple core transform (AMT) technology is used as an example. A transform combination that may be selected for one residual block includes any one of the following: (DCT2, DCT2), (DCT8, DCT8), (DCT8, DST7), (DST7, DCT8), and (DST7, DST7). For one residual block, a specific transform combination to be selected needs to be decided at the decoder side by using Rate-Distortion Optimization (RDO).

In an example, for transform and quantization of a residual signal corresponding to a coding unit, sub-block partitioning needs to be performed on the coding unit, transform and quantization of residual data are performed on some sub-blocks obtained through partitioning, and other sub-blocks are forcibly cleared to zero. For transform skip and quantization of a residual signal corresponding to a coding unit, sub-block partitioning needs to be performed on the coding unit, transform skip and quantization of residual data are performed on some sub-blocks obtained through partitioning, and other sub-blocks are forcibly cleared to zero. In the embodiments of this application, a sub-block transform position or a transform skip sub-block position (the sub-block transform position or the transform skip sub-block position may be generally referred to as a target sub-block position below. It is to be understood that the target sub-block position may be implemented as a sub-block transform position or may be implemented as a transform skip sub-block position) may be indicated by using a flag bit. In an example, the text of a Sub-Block Transform (SBT) is shown below.

TABLE 1

| Text of an SBT |
| --- |
| if (SbtEnableFlag && (width <= 64) && (height <= 64) && (width > 4 \|\| height > 4) && (InterpfFlag == 0) && ctp_y[0] ) { |
|     sbt_cu_flag                                                                                   u(1) |
|     if (SbtCuFlag) { |
|         SbtVerHalf = width >= 8 |
|         SbtVerQuad = width >= 16 |
|         SbtHorHalf = height >= 8 |
|         SbtHorQuad = height >= 16 |
|         if ( (SbtVerHalf \|\| SbtHorHalf) && (SbtVerQuad \|\| SbtHorQuad) ) { |
|             sbt_quad_flag                                                   ae(v) |
|         } |
|         if ( (SbtQuadFlag && SbtVerQuad && SbtHorQuad) \|\| (!SbtQuadFlag && SbtVerHalf && SbtHorHalf)) { |
|             sbt_dir_flag                                                     ae(v) |
|         } |
|         sbt_pos_flag                                                        ae(v) |
|     } |
| } |

Figure 4:
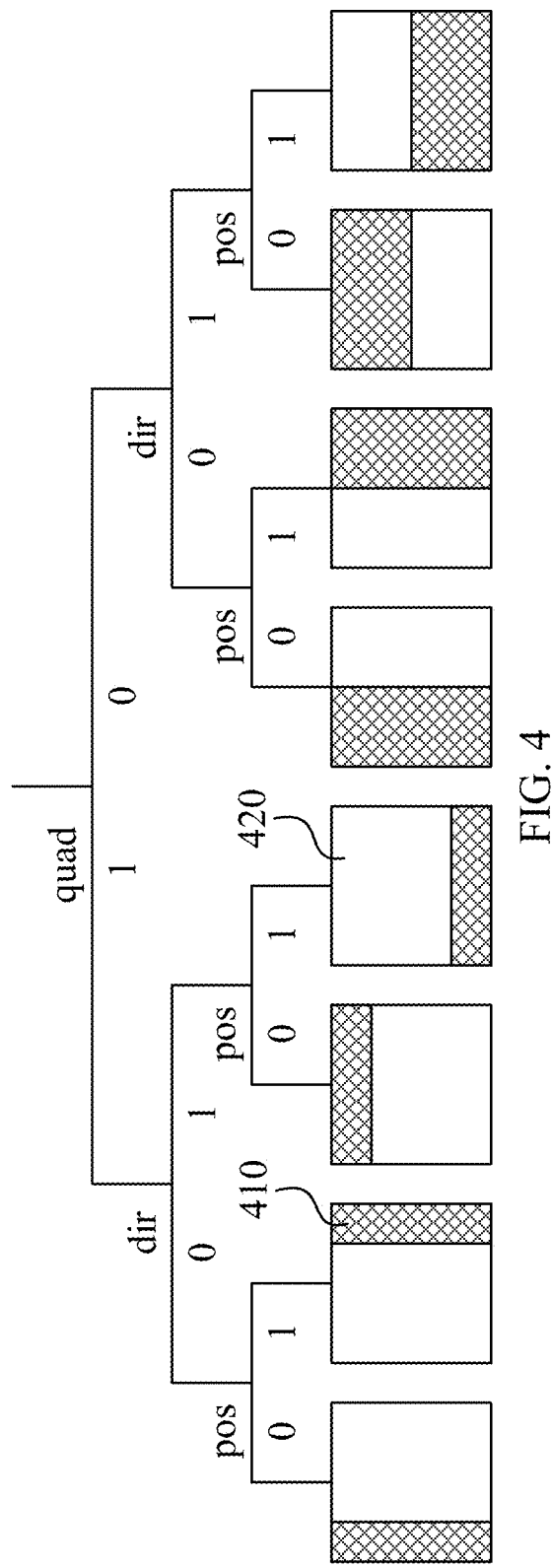
FIG. 4 is a schematic diagram of sub-block partitioning according to an embodiment of this application.

An analysis diagram shown in FIG. 4 is derived from the SBT text shown in Table 1. quad, dir, and pos in FIG. 4 respectively correspond to sbt_quad_flag, sbt_dir_flag, and sbt_pos_flag in a text shown in Table 1 above. quad may be considered as a size control syntax of a sub-block, and dir and pos may be both considered as a syntax for controlling the position of a sub-block. That is, quad determines the size (area) of a sub-block, and dir and pos may determine the position of the sub-block.

Figure 5:
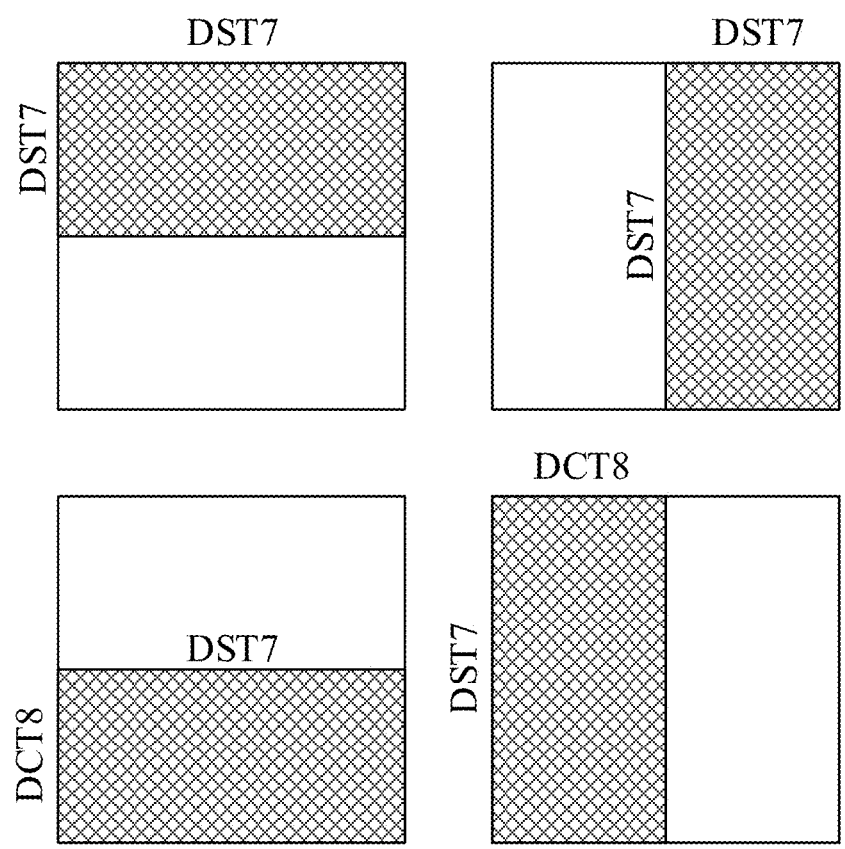
FIG. 5 is a schematic diagram of sub-block transform according to an embodiment of this application.

As shown in FIG. 4, the SBT has eight partitioning results, that is, eight possible target sub-block positions. As shown in FIG. 4, a shaded part 410 is a target sub-block position, that is, a position of a sub-block that requires transform and quantization. A blank part 420 is forcibly cleared to zero. About the selection of a transform combination of sub-blocks, when the width or height of a nonzero residual sub-block is 64, a horizontal transform and a vertical transform of the nonzero residual sub-block are both DCT2. In other cases, the selection of the horizontal transform and the vertical transform are shown in FIG. 5. In addition, a shaded part 510 in FIG. 5 is a nonzero residual sub-block, and a blank part 520 is a zero residual sub-block.

As can be seen from the foregoing description, the target sub-block position may be indicated by three flag bits sbt_quad_flag, sbt_dir_flag, and sbt_pos_flag. In an example, the encoder explicitly encodes the flag bits of the target sub-block position to write the flag bits into a video bit stream, and subsequently the decoder decodes the video bit stream to obtain the flag bits, to further derive target sub-block positions according to the flag bits. However, the encoding of flag bits of target sub-block positions leads to an increase in the number of bits in a bit stream, which is not conducive to improving the efficiency of video coding.

Based on this, the embodiments of this application provide a video encoding method and a video decoding method, which may be used for implicitly indicate flag bits of target sub-block positions according to a quantization coefficient matrix, to avoid explicit coding of the flag bits of the target sub-block positions, thereby reducing a quantity of bits of a bit stream, and improving the efficiency of video coding. The technical solutions of this application are described below with reference to several embodiments.

Figure 6:
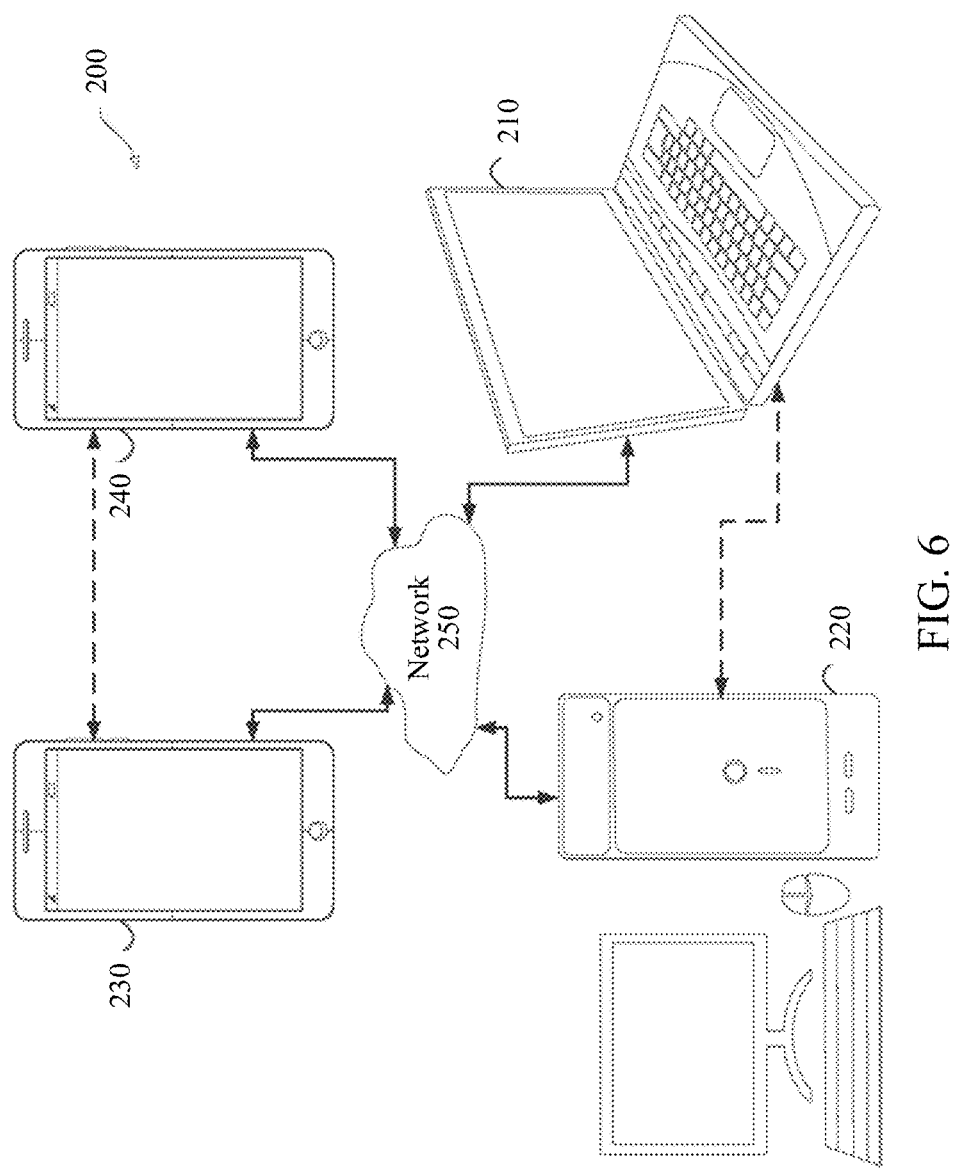
FIG. 6 is a block diagram of a communication system according to an embodiment of this application.

FIG. 6 is a simplified block diagram of a communication system according to an embodiment of this application. A communication system 200 includes a plurality of devices. The devices may communicate with each other over, for example, a network 250. For example, the communication system 200 includes a first device 210 and a second device 220 interconnected by the network 250. In the embodiment in FIG. 6, the first device 210 and the second device 220 perform unidirectional data transmission. For example, the first device 210 may encode video data such as a video picture stream acquired by the first device 210 to transmit encoded video data to the second device 220 through the network 250. The encoded video data is transmitted in the form of one or more encoded video bit streams. The second device 220 may receive encoded video data from the network 250, decode the encoded video data to restore the video data, and display a video picture according to the restored video data. The unidirectional data transmission is common in applications such as a media service.

In another embodiment, the communication system 200 includes a third device 230 and a fourth device 240 that perform bidirectional transmission of encoded video data. The bidirectional transmission may take place during, for example, a video conference. For bidirectional data transmission, one device in the third device 230 and the fourth device 240 encodes video data (for example, a video picture stream acquired by a device), to transmit encoded video data to the other device in the third device 230 and the fourth device 240 through the network 250. One device in the third device 230 and the fourth device 240 may further receive the encoded video data transmitted by the other device in the third device 230 and the fourth device 240, may decode the encoded video data to restore the video data, and may display a video picture on an accessible display device according to the restored video data.

In the embodiment in FIG. 6, the first device 210, the second device 220, the third device 230, and the fourth device 240 may be computer devices such as servers, personal computers, and smartphones. However, the principle disclosed in this application may be not limited thereto. The embodiments of this application are applicable to a personal computer (PC), a mobile phone, a tablet computer, a media server and/or a dedicated video conference device. The network 250 represents any quantity of networks that transfer the encoded video data between the first device 210, the second device 220, the third device 230, and the fourth device 240, and includes a wired and/or wireless communication network. The communication network 250 may exchange data in a circuit switched and/or packet switched channel. The network may include a telecommunication network, a local area network, a wide area network and/or the internet. For the purpose of this application, unless described below, the architecture and topology of the network 250 may be irrelevant for the operations disclosed in this application.

Figure 7:
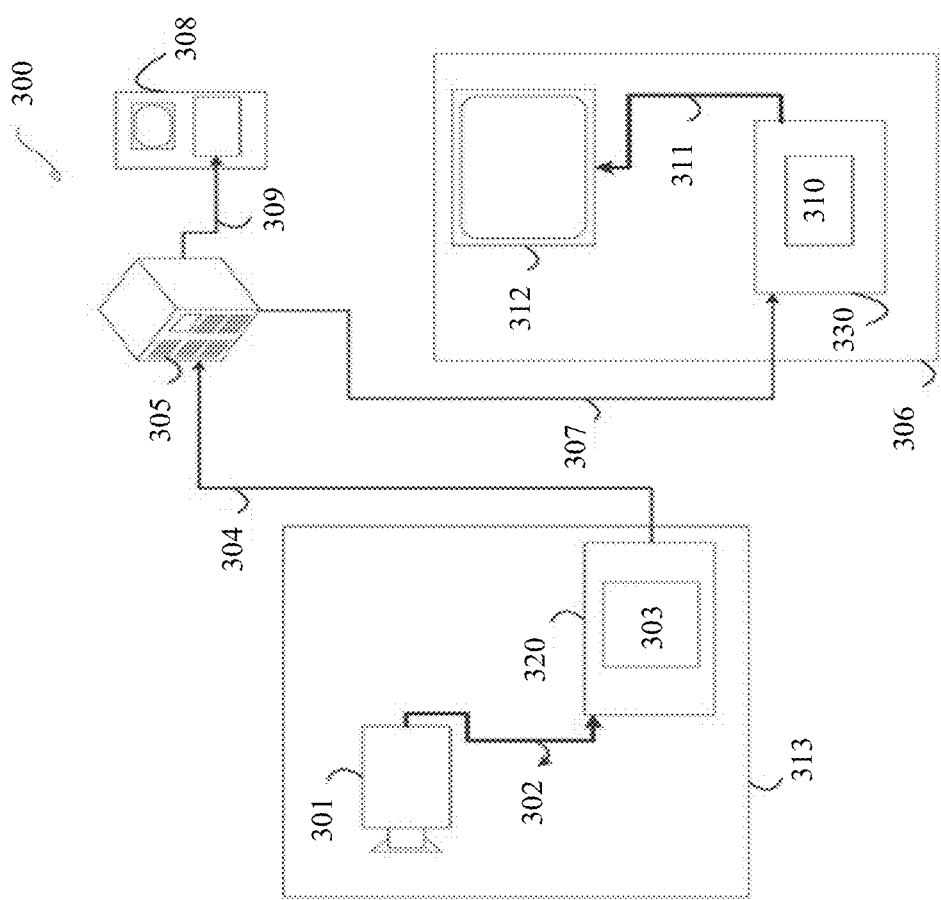
FIG. 7 is a block diagram of a streaming system according to an embodiment of this application.

In an embodiment, FIG. 7 shows a placement manner of a video encoder and a video decoder in a streaming environment. The subject disclosed in this application is equivalently applicable other video-supporting applications, including, for example, video conference, a digital TV (television), and storage of compressed video in a digital medium such as a compact disc (CD), a digital versatile disc (DVD), and a memory stick.

The streaming system may include an acquisition subsystem 313. The acquisition subsystem may include a video source 301 such as a digital camera. The video source creates an uncompressed video picture stream 302. In this embodiment, the video picture stream 302 includes a sample photographed by a digital camera. Compared with encoded video data 304 (or an encoded video bit stream), the video picture stream 302 is depicted as a bold line to stress a video picture stream with a high data amount. The video picture stream 302 may be processed by an electronic device 320. The electronic device 320 includes a video encoder 303 coupled to the video source 301. The video encoder 303 may include software, hardware or a combination of software and hardware to implement the aspects of the disclosed subject described below in detail. The video encoder 303 may be a computer device. The computer device is an electronic device having data computing, processing, and storage capabilities, for example, a PC, a mobile phone, a tablet computer, a media player, a dedicated video conference device, and a server. The video encoder 303 based on the method provided in this application may be implemented by one or more processors or one or more integrated circuits.

Compared with the video picture stream 302, the encoded video data 304 (or encoded video bit stream 304) is depicted as a thin line to stress encoded video data 304 (or encoded video bit stream 304) with a low data amount. The encoded video data may be stored in a streaming server 305 for future use. One or more streaming client subsystems, for example, a client subsystem 306 and a client subsystem 308 in FIG. 7, may access the streaming server 305 to respectively retrieve a copy 307 and a copy 309 of the encoded video data 304. The client subsystem 306 may include, for example, a video decoder 310 in an electronic device 330. The video decoder 310 decodes a transferred copy 307 of the encoded video data and generates an output video picture stream 311 that can be displayed on a display 312 (for example, a display screen) or another display apparatus (not depicted). In some streaming systems, the encoded video data 304, the copy 307, and the copy 309 (for example, a video bit stream) may be encoded according to some video coding/compression standards.

The electronic device 320 and the electronic device 330 may include other components (not shown). For example, the electronic device 320 may include a video decoder (not shown), and the electronic device 330 may include a video encoder (not shown). The video decoder is configured to decode encoded video data, and the video encoder is configured to encode video data.

The technical solutions of this application are described below by using several embodiments.

Figure 8:
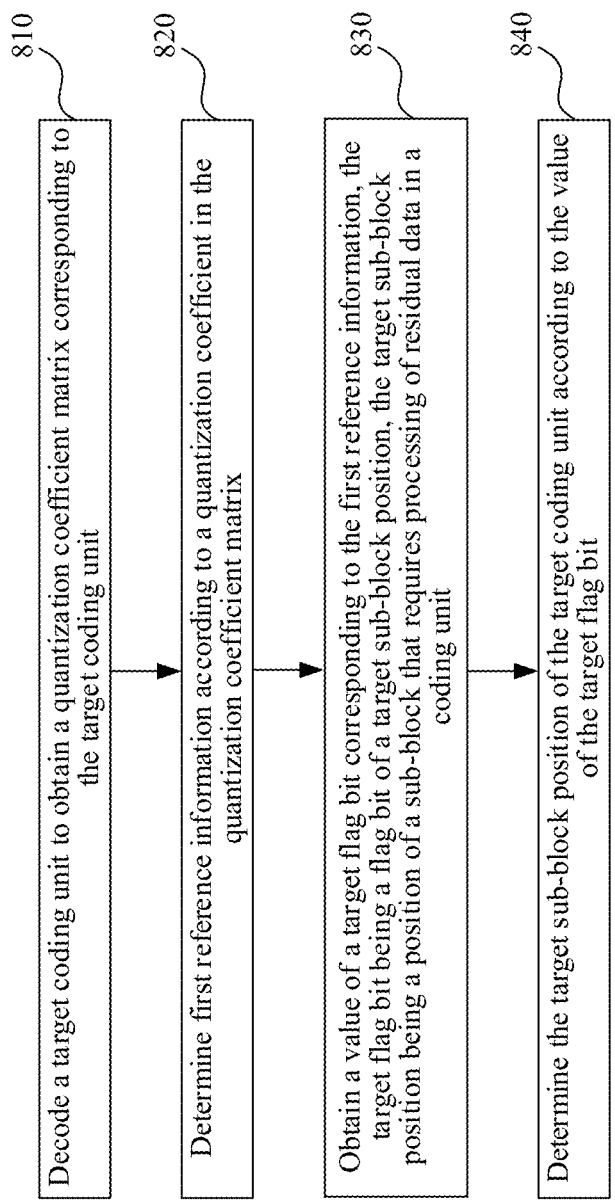
FIG. 8 is a flowchart of a video decoding method according to an embodiment of this application.

FIG. 8 is a flowchart of a video decoding method according to an embodiment of this application. The method is applicable to a video decoder, for example, the second device 220 in the communication system shown in FIG. 6. The method may include several steps (steps 810 to 840) in the following.

Step 810: Decode a target coding unit to obtain a quantization coefficient matrix corresponding to the target coding unit.

As can be seen from the above description, after obtaining a video bit stream, the video decoder performs an inverse operation of an operation performed by a video encoder, so that the video decoder needs to first decode coding units in the video bit stream. In some embodiments, the video decoder decodes the video bit stream in an entropy decoding manner. In the embodiments of this application, the video decoder decodes a target coding unit to obtain a quantization coefficient matrix corresponding to the target coding unit. The quantization coefficient matrix includes at least one quantized transform coefficient (the "quantized transform coefficient" is referred to as a "quantization coefficient" below) or the quantization coefficient matrix includes at least one quantized coefficient.

The target coding unit is a coding unit to be processed in a video decoding process. In some embodiments, the target coding unit is a current coding unit to be processed or a coding unit to be processed following a current coding unit to be processed. The shape of the target coding unit is not limited in the embodiments of this application. In some embodiments, the target coding unit is a square. That is, the width and height of the target coding unit are equal. Alternatively, the target coding unit is a rectangle. That is, the width and height of the target coding unit are not equal. The block size of the target coding unit is not limited in the embodiments of this application. In some embodiments, the size of the target coding unit is 64×64 or 128×128 or 128×64. During actual application, the size of the target coding unit may be determined by a block size of an allowable large coding unit in a video encoding/decoding process. For example, the block size of the allowable large coding unit in the video encoding/decoding process is 128×128. The block size of the target coding unit is equal to or less than 128×128.

Step 820: Determine first reference information according to a quantization coefficient in the quantization coefficient matrix.

After obtaining the quantization coefficient matrix, the video decoder determines first reference information according to a quantization coefficient in the quantization coefficient matrix. The first reference information is used for determining a value of a flag bit of the target sub-block position of the target coding unit. In some embodiments, the first reference information is a value. For example, the first reference information is a quantization coefficient in the quantization coefficient matrix. Alternatively, the first reference information is a statistical summation result of a plurality of quantization coefficients in the quantization coefficient matrix. Alternatively, the first reference information is a remainder obtained by dividing a statistical summation result of a plurality of quantization coefficients in the quantization coefficient matrix by a calculation factor. For the description of a process of determining the first reference information, reference may be made to the following method embodiments. Details are not described herein.

The "quantization coefficient in the quantization coefficient matrix" herein is only used for indicating that the "quantization coefficient" used as a reference for determining the first reference information is a quantization coefficient in the quantization coefficient matrix of the target coding unit, but is not used for limiting a specific quantity of quantization coefficients. It is to be understood that the "quantization coefficient in the quantization coefficient matrix" herein may be a quantization coefficient in the quantization coefficient matrix or may be a plurality of quantization coefficients in the quantization coefficient matrix or may be all quantization coefficients in the quantization coefficient matrix. This is not limited in the embodiments of this application.

Step 830: Obtain a value of a target flag bit corresponding to the first reference information, the target flag bit being a flag bit of a target sub-block position, the target sub-block position being a position of a sub-block that requires processing of residual data in a coding unit.

The processing of the residual data includes: performing transform and quantization on the residual data or performing transform skip and quantization on the residual data. As can be seen from the above description, for a process of transform and quantization of a residual signal corresponding to a coding unit, sub-block partitioning needs to be performed on the coding unit, transform and quantization of residual data are performed on some sub-blocks obtained through partitioning, and other sub-blocks are forcibly cleared to zero. The position of the sub-block that requires transform and quantization of the residual data in the coding unit may be referred to as a sub-block transform position. The transform flag bit is a flag bit of the sub-block transform position. That is, the sub-block transform position may be determined according to the value of the transform flag bit. For a process of transform skip and quantization of a residual signal corresponding to a coding unit, sub-block partitioning also needs to be performed on the coding unit, transform skip and quantization of residual data are performed on some sub-blocks obtained through partitioning, and other sub-blocks are forcibly cleared to zero. The position of the sub-block that requires transform skip and quantization of the residual data in the coding unit may be referred to as a transform skip sub-block position. The transform skip flag bit is a flag bit of the transform skip sub-block position. That is, the transform skip sub-block position may be determined according to the value of the transform skip flag bit.

The "sub-block transform position", the "transform flag bit", the "transform skip sub-block position", and the "transform skip position" are only exemplary names. With the evolution of video standards and different naming habits, the "sub-block transform position", the "transform flag bit", the "transform skip sub-block position", and the "transform skip position" may have other names. For example, the "sub-block transform position" may be referred to as a "transform sub-block position" or the like. The "transform flag bit" may be referred to as a "sub-block transform flag bit". The "transform skip sub-block position" may be referred to as a "sub-block transform skip position". The "transform skip flag bit" may be referred to as a "sub-block transform skip flag bit". These names having the same meaning as the "sub-block transform position", these names having the same meaning as the "transform flag bit", these names having the same meaning as the "transform skip flag bit", and these names having the same meaning as the "transform skip sub-block position" all fall within the protection scope of this application.

In the following embodiments, for ease of description, the "sub-block transform position" and the "transform skip sub-block position" are generally referred to as a "target sub-block position", and the "transform flag bit" and the "transform skip flag bit" are generally referred to as a "target flag bit". A person skilled in the art can understand that when the video encoder performs transform and quantization on residual data to obtain a quantization coefficient matrix and the video decoder performs inverse quantization and inverse transform on the quantization coefficient matrix to obtain the residual data, the target flag bit is a transform flag bit, and the target sub-block position is a sub-block transform position. In a case that the video encoder performs transform skip and quantization on residual data to obtain a quantization coefficient matrix and the video decoder performs inverse quantization on the quantization coefficient matrix to obtain the residual data, the target flag bit is a transform skip flag bit, and the target sub-block position is a transform skip sub-block position.

An implementation of the "obtaining a value of a target flag bit corresponding to the first reference information" is not limited in the embodiments of this application. In an example, the value of the target flag bit is obtained through calculation of reference information. Based on this, after determining the first reference information according to the quantization coefficient in the quantization coefficient matrix, the video decoder performs calculation based on the first reference information. For example, sum calculation, remainder calculation, product calculation, difference calculation, and the like are performed on the first reference information by using a calculation factor, to obtain the value of the target flag bit corresponding to the first reference information. In another example, there is a correspondence relationship (or referred to as a "mapping relationship") between reference information used for determining a value of the target flag bit and the value of the target flag bit. That is, the value of the target flag bit corresponding to the reference information may be obtained by using the reference information and the correspondence relationship. Based on this, after determining the first reference information according to the quantization coefficient in the quantization coefficient matrix, the video decoder may further obtain the value of the target flag bit corresponding to the first reference information based on the correspondence relationship between reference information and a value of the target flag bit. In the embodiments of this application, a manner of correspondence between reference information and a value of the target flag bit is not limited. In some embodiments, reference information corresponds one to one to a value of the target flag bit. Alternatively, correspondence between reference information and a value of the target flag bit is multiple-to-one correspondence. Alternatively, there is no correspondence relationship between reference information and a value of the target flag bit, but instead there is a correspondence relationship between a property of reference information and a value of the target flag bit. For example, there is a correspondence relationship between the parity of reference information and a value of the target flag bit. In the embodiments of this application, a manner of determining the correspondence relationship between reference information and a value of the target flag bit is not limited. In some embodiments, the correspondence relationship may be pre-defined in a video standard; or is determined through negotiation between the video encoder and the video decoder; or is determined by the video encoder and written into a video bit stream to notify the video decoder; or is preset (pre-stored) in the video decoder.

In an example, the target flag bit includes at least one of the following: a first flag bit, used for indicating a partitioning direction of the target sub-block position of the target coding unit, the partitioning direction including transverse partitioning and longitudinal partitioning; and a second flag bit, used for indicating the target sub-block position of the target coding unit based on the partitioning direction indicated by the first flag bit. The first flag bit may be "sbt_dir_flag" in the foregoing embodiments. The second flag bit may be "sbt_pos_flag" in the foregoing embodiments. Based on this, in the embodiments of this application, according to the first reference information, the value of only one flag bit (for example, sbt_dir_flag or sbt_pos_flag) may be determined, or the values of a plurality of flag bits (for example, sbt_dir_flag and sbt_pos_flag) may be determined. The values of other flag bits may be indicated by a video encoder through explicit encoding. For other description of the value of the target flag bit corresponding to the first reference information, reference may be made to the following method embodiments. Details are not described herein. In some embodiments, an operation such as position selection of a sub-block can be performed only when the size of the sub-block is determined. Therefore, a flag bit (for example, sbt_quad_flag) used for indicating the size of the sub-block may be explicitly indicated by the video encoder. That is, the video encoder explicitly encodes the flag bit (for example, sbt_quad_flag) used for indicating the size of the sub-block to write the flag bit into a video bit stream. Subsequently, the video decoder may obtain the flag bit by decoding the video bit stream to further determine the size of the sub-block.

Step 840: Determine the target sub-block position of the target coding unit according to the value of the target flag bit.

The video decoder may derive the target sub-block position of the target coding unit according to the obtained value of the target flag bit, and perform subsequent processing according to the target sub-block position.

Figure 9:
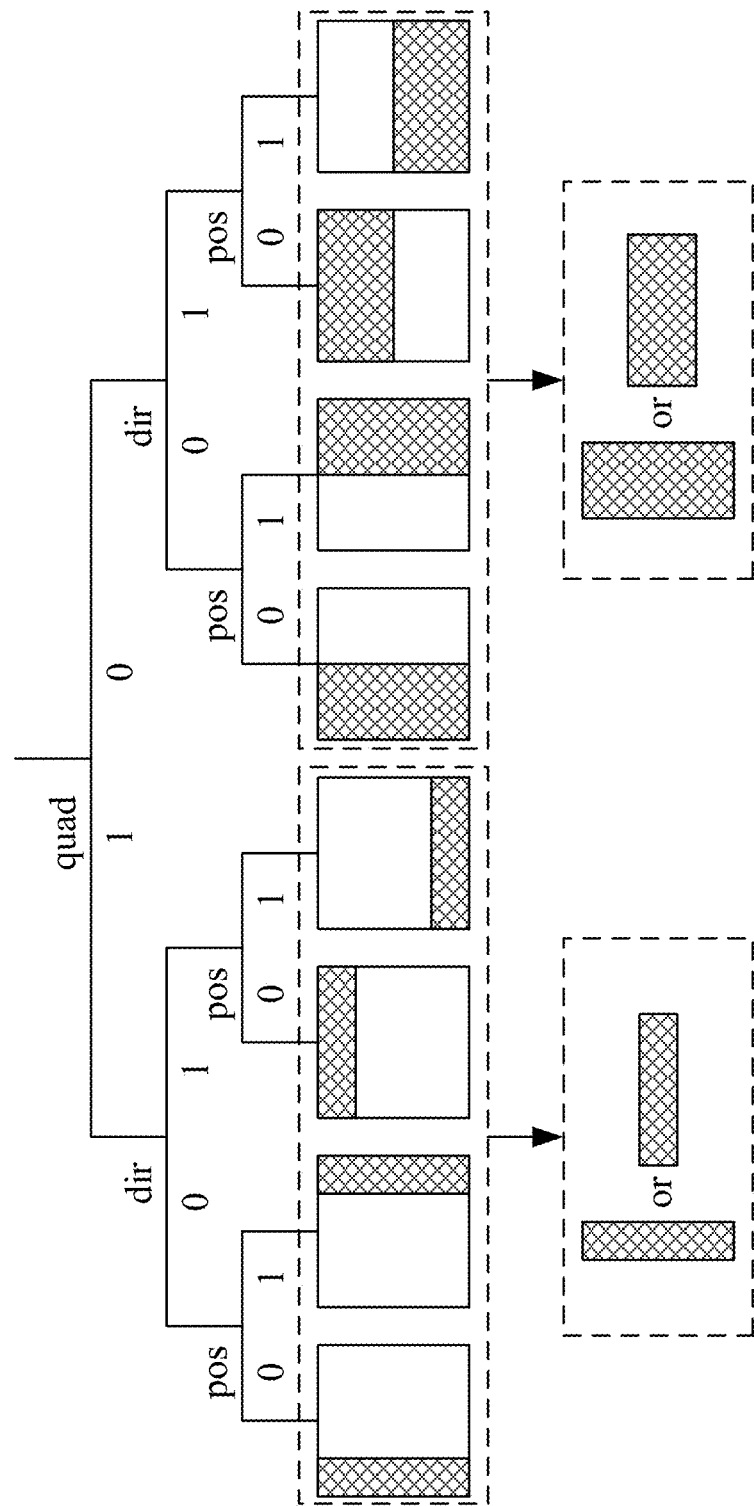
FIG. 9 is a schematic diagram of rotating a quantization coefficient matrix according to an embodiment of this application.

In an example, because the video encoder may rotate the quantization coefficient matrix and then encodes the rotated quantization coefficient matrix, in this case, to ensure that an encoding process of the video encoder corresponds to a decoding process of the video decoder, after obtaining the quantization coefficient matrix through decoding, the video decoder is to rotate the quantization coefficient matrix. In some embodiments, as shown in FIG. 9, directions of quantization coefficient matrices in a video encoding/decoding process include a horizontal direction and a vertical direction. When the directions of the quantization coefficient matrices need to be unified to the horizontal direction, a quantization coefficient matrix in the vertical direction needs to be rotated to the horizontal direction, and a quantization coefficient matrix that is originally in the horizontal direction does not need to be rotated. When the directions of the quantization coefficient matrices need to be unified to the vertical direction, a quantization coefficient matrix in the horizontal direction needs to be rotated to the vertical direction, and a quantization coefficient matrix that is originally in the vertical direction does not need to be rotated.

In some embodiments, the video decoder determines, according to the value of the target flag bit, whether to rotate a quantization coefficient matrix, based on this, after the obtaining a value of a target flag bit corresponding to the first reference information, the method further includes: determining, according to the value of the target flag bit, whether the quantization coefficient matrix needs to be rotated; when it is determined that the quantization coefficient matrix needs to be rotated, rotating a direction of the quantization coefficient matrix from a first direction to a second direction to obtain a rotated quantization coefficient matrix; and processing the rotated quantization coefficient matrix to obtain the residual data. The processing the rotated quantization coefficient matrix includes: performing inverse quantization and inverse transform on the rotated quantization coefficient matrix, or performing inverse quantization on the rotated quantization coefficient matrix; when the processing the rotated quantization coefficient matrix includes performing inverse quantization and inverse transform on the rotated quantization coefficient matrix, the target flag bit is a transform flag bit, the target sub-block position is a sub-block transform position, and the sub-block transform position is a position of a sub-block that requires transform and quantization of the residual data in the coding unit; and when the processing the rotated quantization coefficient matrix includes performing inverse quantization on the rotated quantization coefficient matrix, the target flag bit is a transform skip flag bit, the target sub-block position is a transform skip sub-block position, and the transform skip sub-block position is a position of a sub-block that requires transform skip and quantization of the residual data in the coding unit. The reference for the video decoder to determine whether to rotate the quantization coefficient matrix may be a first flag bit in the target flag bit. The first flag bit is used for indicating a partitioning direction of the target sub-block position of the target coding unit, and is, for example, the foregoing "sbt_dir_flag".

For example, as shown in FIG. 9, it is assumed that "sbt_dir_flag" at a target sub-block position in a horizontal direction is 1, and "sbt_dir_flag" at a target sub-block position in a vertical direction is 0. Therefore, in addition, in an encoding/decoding process, the directions of the quantization coefficient matrices need to be uniformly rotated to the horizontal direction, a quantization coefficient matrix corresponding to a target sub-block position with "sbt_dir_flag" being 0 needs to be rotated to the horizontal direction, and a quantization coefficient matrix corresponding to a target sub-block position with "sbt_dir_flag" being 1 does not need to be rotated.

In summary, in the technical solutions provided in the embodiments of this application, a flag bit of a sub-block transform position in a target coding unit is implicitly indicated by using a quantization coefficient in a quantization coefficient matrix corresponding to a coding unit to determine the sub-block transform position in the target coding unit, to avoid explicit coding of the sub-block transform position, thereby reducing a quantity of bits occupied by a video bit stream, and improving the efficiency of video coding. In addition, in the technical solutions provided in the embodiments of this application, it is not necessary to explicitly encode and decode every flag bit at a sub-block transform position, so that the processing overheads of a video encoder and a video decoder can be reduced, which is conducive to improving the encoding efficiency of the video encoder and the decoding efficiency of the video decoder. Alternatively, in the technical solutions provided in the embodiments of this application, a flag bit of a transform skip sub-block position in a target coding unit is implicitly indicated by using a quantization coefficient in a quantization coefficient matrix corresponding to a coding unit to determine the transform skip sub-block position in the target coding unit, to avoid explicit coding of the transform skip sub-block position, thereby reducing a quantity of bits occupied by a video bit stream, and improving the efficiency of video coding. In addition, in the technical solutions provided in the embodiments of this application, it is not necessary to explicitly encode and decode every flag bit at a transform skip sub-block position, so that the processing overheads of a video encoder and a video decoder can be reduced, which is conducive to improving the encoding efficiency of the video encoder and the decoding efficiency of the video decoder.

A manner of implicitly indicating a target flag bit by using a quantization coefficient matrix provided in the embodiments of this application is described below.

In an example, the foregoing step 820 includes several steps (steps 822 to 826) in the following.

Step 822: Obtain at least one quantization coefficient in the quantization coefficient matrix.

If a correspondence relationship between a quantization coefficient and a value of the target flag bit is directly established, the target flag bit may only values of 0 and 1 because a value range of the quantization coefficient is excessively large. As a result, excessive quantization coefficients need to correspond to one same value of the target flag bit, causing an excessively complex correspondence relationship between a quantization coefficient and a value of the target flag bit. In the embodiments of this application, statistical summation is performed on quantization coefficients, a remainder is then calculated, and a correspondence relationship between the remainder and a value of the target flag bit is established. Because the value range of the remainder is less than the value range of the quantization coefficient, the complexity of the correspondence relationship can be reduced to some extent. Therefore, at least one quantization coefficient in a quantization coefficient matrix needs to be obtained first. That is, a statistical region of the quantization coefficient matrix is determined.

A manner of obtaining at least one quantization coefficient is not limited in the embodiments of this application. Several possible obtaining manners are exemplarily shown below.

(1) Obtain all quantization coefficients in the quantization coefficient matrix.

In this implementation, the "at least one quantization coefficient in the quantization coefficient matrix" in step 822 includes "all quantization coefficients in the quantization coefficient matrix". That is, the entire quantization coefficient matrix is used as a reference for implicitly indicating the value of the target flag bit.

(2) Obtain a quantization coefficient in at least one designated position in the quantization coefficient matrix.

In this implementation, the "at least one quantization coefficient in the quantization coefficient matrix" in step 822 includes "a quantization coefficient in at least one designated position in the quantization coefficient matrix". The designated position may be predefined in a video standard or may be designated by a video encoder and informed to a video decoder or may be determined by a video encoder and a video decoder in the same determining manner. This is not limited in the embodiments of this application.

In some embodiments, the designated position may be consecutive positions in the quantization coefficient matrix, for example, one designated row or column in the quantization coefficient matrix. Alternatively, the designated position may be nonconsecutive positions in the quantization coefficient matrix. For example, the designated position includes the following four designated positions in the quantization coefficient matrix: the first position in the first row, the third position in the second row, the second position in the third row, and the fourth position in the fourth row. In some embodiments, the designated position may have a certain pattern or may be randomly designated. This is not limited in the embodiments of this application.

(3) Obtain quantization coefficients in at least one row in the quantization coefficient matrix.

Figure 10:
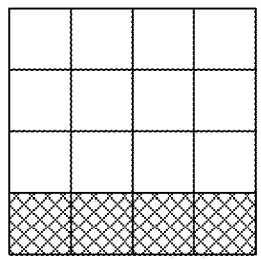
FIG. 10 is a schematic diagram of obtaining a quantization coefficient according to an embodiment of this application.
Figure 10:
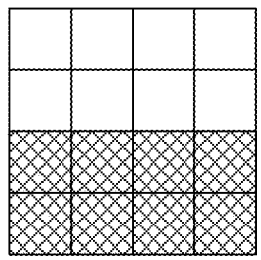
Figure 10:
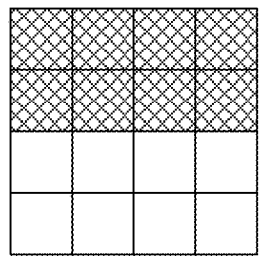
Figure 10:
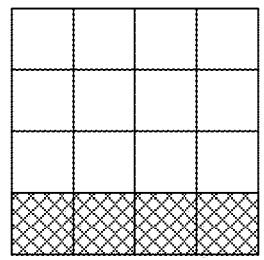
Figure 10:
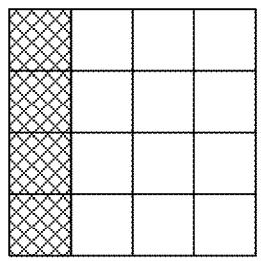
Figure 10:
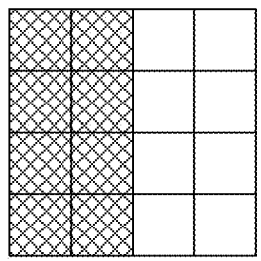
Figure 10:
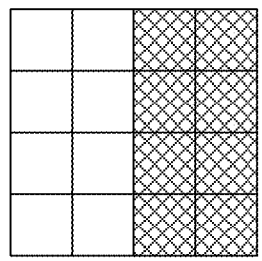
Figure 10:
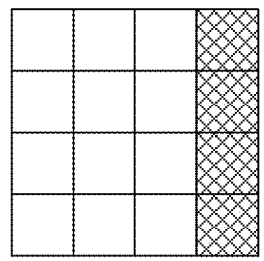
Figure 10:
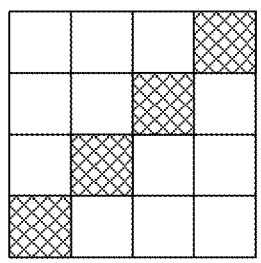
Figure 10:
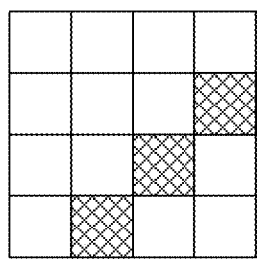
Figure 10:
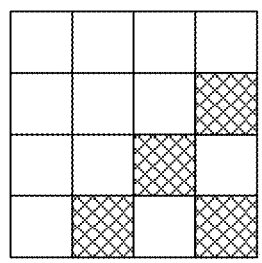
Figure 10:
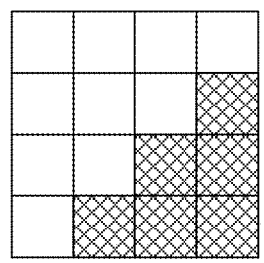
Figure 10:
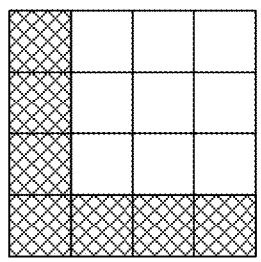
Figure 10:
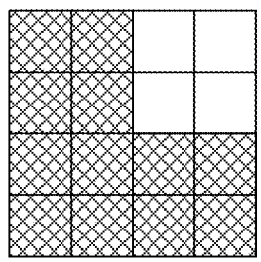
Figure 10:
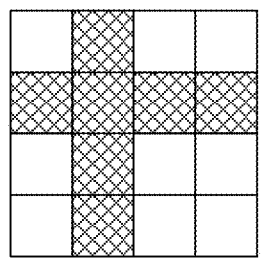
Figure 10:
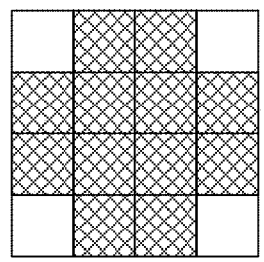

In this implementation, the "at least one quantization coefficient in the quantization coefficient matrix" in step 822 includes "a quantization coefficient in at least one row in the quantization coefficient matrix". For example, as shown in FIG. 10, squares are used to represent quantization coefficients in the quantization coefficient matrix, and each square represents one quantization coefficient. It is assumed that the quantization coefficient matrix is a 4×4 coefficient matrix. In this case, as shown in FIG. 10(*a*), quantization coefficients in one row shown by a shaded part in the quantization coefficient matrix may be obtained; or as shown in FIG. 10(*a*), quantization coefficients in two rows shown by a shaded part in the quantization coefficient matrix may be obtained.

In the embodiments of this application, a relative position of an area in which the obtained quantization coefficients are located in the quantization coefficient matrix is not limited. In some embodiments, the area (that is, at least one row) in which the obtained quantization coefficients are located is located at an edge (for example, an upper edge, a lower edge, or an upper edge and a lower edge) of the quantization coefficient matrix, or is located in the middle of the quantization coefficient matrix.

(4) Obtain quantization coefficients in at least one column in the quantization coefficient matrix.

In this implementation, the "at least one quantization coefficient in the quantization coefficient matrix" in step 822 includes "a quantization coefficient in at least one column in the quantization coefficient matrix". For example, as shown in FIG. 10, squares are used to represent quantization coefficients in the quantization coefficient matrix, and each square represents one quantization coefficient. It is assumed that the quantization coefficient matrix is a 4×4 coefficient matrix. In this case, as shown in FIG. 10(*b*), quantization coefficients in one column shown by a shaded part in the quantization coefficient matrix may be obtained; or as shown in FIG. 10(*b*), quantization coefficients in two columns shown by a shaded part in the quantization coefficient matrix may be obtained.

In the embodiments of this application, a relative position of an area in which the obtained quantization coefficients are located in the quantization coefficient matrix is not limited. In some embodiments, the area (that is, at least one column) in which the obtained quantization coefficients are located is located at an edge (for example, a left edge, a right edge, or a left edge and a right edge) of the quantization coefficient matrix, or is located in the middle of the quantization coefficient matrix.

(5) Obtain quantization coefficients in at least one diagonal in the quantization coefficient matrix.

In this implementation, the "at least one quantization coefficient in the quantization coefficient matrix" in step 822 includes "a quantization coefficient in at least one diagonal in the quantization coefficient matrix". For example, as shown in FIG. 10, squares are used to represent quantization coefficients in the quantization coefficient matrix, and each square represents one quantization coefficient. It is assumed that the quantization coefficient matrix is a 4×4 coefficient matrix. In this case, as shown in FIG. 10(*c*), quantization coefficients in one diagonal shown by a shaded part in the quantization coefficient matrix may be obtained; or as shown in FIG. 10(*c*), quantization coefficients in two diagonals shown by a shaded part in the quantization coefficient matrix may be obtained. In some embodiments, the diagonal at which the obtained quantization coefficients are located corresponds to an order of the opposite Z shaped scan used for the quantization coefficient matrix in the foregoing embodiments.

(6) Obtain quantization coefficients in first n positions in a scan order in the quantization coefficient matrix, n being a positive integer.

In this implementation, the "at least one quantization coefficient in the quantization coefficient matrix" in step 822 includes "a quantization coefficient in first n positions in a scan order in the quantization coefficient matrix". That is, the first scanned n quantization coefficients in the quantization coefficient matrix are obtained.

(7) Obtain quantization coefficients in middle m positions in a scan order in the quantization coefficient matrix, m being a positive integer.

In this implementation, the "at least one quantization coefficient in the quantization coefficient matrix" in step 822 includes "a quantization coefficient in middle m positions in a scan order in the quantization coefficient matrix". That is, m quantization coefficients in the middle in the scan order in a process of scanning the quantization coefficient matrix are obtained.

In some embodiments, in the embodiments of this application, quantization coefficients located in last w positions in a scan order in the quantization coefficient matrix may be obtained, w being a positive integer. In this implementation, the "at least one quantization coefficient in the quantization coefficient matrix" in step 822 includes "a quantization coefficient in last w positions in a scan order in the quantization coefficient matrix". That is, the last scanned w quantization coefficients in the quantization coefficient matrix are obtained.

As can be seen from the following description, in a video encoding/decoding process, an SRCC scan may be performed on the quantization coefficient matrix. Subsequently, only quantization coefficients in a labeled scan region need to be encoded. Therefore, when an SRCC scan is performed on the quantization coefficient matrix, the value of the target flag bit may be implicitly indicated by using a quantization coefficient in an SRCC region (scan region). Based on this, at least one quantization coefficient may be obtained in the following obtaining manners. That is, in the foregoing step 822, at least one implementation in the following may further be included.

(8) Obtain all quantization coefficients in an SRCC region of the quantization coefficient matrix.

In this implementation, the "at least one quantization coefficient in the quantization coefficient matrix" in step 822 includes "all quantization coefficients in an SRCC region of the quantization coefficient matrix". That is, the entire SRCC region is used as a reference for implicitly indicating the value of the target flag bit.

(9) Obtain a quantization coefficient in at least one designated position in an SRCC region of the quantization coefficient matrix.

In this implementation, the "at least one quantization coefficient in the quantization coefficient matrix" in step 822 includes "a quantization coefficient in at least one designated position in an SRCC region of the quantization coefficient matrix". In some embodiments, the quantization coefficient in the at least one designated position in the SRCC region may be at least one quantization coefficient first scanned in the SRCC region or may be at least one last scanned quantization coefficient or may be at least one quantization coefficient in a scan process. Referring to the foregoing description, the at least one designated position in the SRCC region may be predefined in a video standard or may be designated by a video encoder and informed to a video decoder or may be determined by a video encoder and a video decoder in the same determining manner. This is not limited in the embodiments of this application.

(10) Obtain quantization coefficients in at least one row in an SRCC region of the quantization coefficient matrix.

In this implementation, the "at least one quantization coefficient in the quantization coefficient matrix" in step 822 includes "a quantization coefficient in at least one row in an SRCC region of the quantization coefficient matrix". For example, as shown in FIG. 10, squares are used to represent quantization coefficients in an SRCC region of the quantization coefficient matrix, and each square represents one quantization coefficient in the SRCC region. It is assumed that the SRCC region is a 4×4 coefficient matrix. In this case, as shown in FIG. 10(*a*), quantization coefficients in one row shown by a shaded part in the SRCC region may be obtained; or as shown in FIG. 10(*a*), quantization coefficients in two rows shown by a shaded part in the SRCC region may be obtained.

In the embodiments of this application, a relative position of an area in which the obtained quantization coefficients are located in the SRCC region of the quantization coefficient matrix is not limited. In some embodiments, the area (that is, at least one row) in which the obtained quantization coefficients are located is located at an edge (for example, an upper edge, a lower edge, or an upper edge and a lower edge) of the SRCC region, or is located in the middle of the SRCC region.

(11) Obtain quantization coefficients in at least one column in an SRCC region of the quantization coefficient matrix.

In this implementation, the "at least one quantization coefficient in the quantization coefficient matrix" in step 822 includes "a quantization coefficient in at least one column in an SRCC region of the quantization coefficient matrix". For example, as shown in FIG. 10, squares are used to represent quantization coefficients in an SRCC region of the quantization coefficient matrix, and each square represents one quantization coefficient in the SRCC region. It is assumed that the SRCC region is a 4×4 coefficient matrix. In this case, as shown in FIG. 10(*b*), quantization coefficients in one column shown by a shaded part in the SRCC region may be obtained; or as shown in FIG. 10(*b*), quantization coefficients in two columns shown by a shaded part in the SRCC region may be obtained.

In the embodiments of this application, a relative position of an area in which the obtained quantization coefficients are located in the SRCC region of the quantization coefficient matrix is not limited. In some embodiments, the area (that is, at least one column) in which the obtained quantization coefficients are located is located at an edge (for example, a left edge, a right edge, or a left edge and a right edge) of the SRCC region, or is located in the middle of the SRCC region.

(12) Obtain quantization coefficients in at least one diagonal in an SRCC region of the quantization coefficient matrix.

In this implementation, the "at least one quantization coefficient in the quantization coefficient matrix" in step 822 includes "a quantization coefficient in at least one diagonal in an SRCC region of the quantization coefficient matrix". For example, as shown in FIG. 10, squares are used to represent quantization coefficients in an SRCC region of the quantization coefficient matrix, and each square represents one quantization coefficient in the SRCC region. It is assumed that the SRCC region is a 4×4 coefficient matrix. In this case, as shown in FIG. 10(*c*), quantization coefficients in one diagonal shown by a shaded part in the SRCC region may be obtained; or as shown in FIG. 10(*c*), quantization coefficients in two diagonals shown by a shaded part in the SRCC region may be obtained. In some embodiments, the diagonal at which the obtained quantization coefficients are located corresponds to an order of the opposite Z shaped scan used for the quantization coefficient matrix in the foregoing embodiments.

(13) Obtain quantization coefficients in first s positions in a scan order in an SRCC region of the quantization coefficient matrix, s being a positive integer.

In this implementation, the "at least one quantization coefficient in the quantization coefficient matrix" in step 822 includes "a quantization coefficient in first s positions in a scan order in an SRCC region of the quantization coefficient matrix". That is, the first scanned n quantization coefficients in an SRCC region of the quantization coefficient matrix are obtained.

(14) Obtain quantization coefficients in middle t positions in a scan order in an SRCC region of the quantization coefficient matrix, t being a positive integer.

In this implementation, the "at least one quantization coefficient in the quantization coefficient matrix" in step 822 includes "a quantization coefficient in middle t positions in a scan order in an SRCC region of the quantization coefficient matrix". That is, m quantization coefficients in the middle in the scan order in a process of scanning the SRCC region of the quantization coefficient matrix are obtained.

In some embodiments, in the embodiments of this application, quantization coefficients located in last x positions in a scan order in the SRCC region of the quantization coefficient matrix may be obtained, x being a positive integer. In this implementation, the "at least one quantization coefficient in the quantization coefficient matrix" in step 822 includes "a quantization coefficient in last x positions in a scan order in an SRCC region of the quantization coefficient matrix". That is, the last scanned x quantization coefficients in an SRCC region of the quantization coefficient matrix are obtained.

The foregoing is only provided for ease of description, and various manners of obtaining at least one quantization coefficient are respectively described. During actual application, at least one quantization coefficient may be obtained by combining the foregoing various obtaining manners. These combined manners all fall within the protection scope of this application. For example:

(15) Obtain quantization coefficients in at least one row and at least one column in the quantization coefficient matrix.

In this implementation, the "at least one quantization coefficient in the quantization coefficient matrix" in step 822 includes "a quantization coefficient in at least one row and at least one column in the quantization coefficient matrix". As shown in FIG. 10, squares are used to represent quantization coefficients in the quantization coefficient matrix, and each square represents one quantization coefficient. It is assumed that the quantization coefficient matrix is a 4×4 coefficient matrix. In this case, as shown in FIG. 10(*d*), quantization coefficients in one row and one column shown by a shaded part in the quantization coefficient matrix may be obtained; or as shown in FIG. 10(*d*), quantization coefficients in two rows and two columns shown by a shaded part in the quantization coefficient matrix may be obtained. In the embodiments of this application, a relative position of an area in which the obtained quantization coefficients are located in the quantization coefficient matrix is not limited. In some embodiments, the area (that is, at least one row and at least one column) in which the obtained quantization coefficients are located is located at an edge (for example, an upper edge and a left edge, a lower edge and a right edge, an upper edge and a right edge, or a lower edge and a left edge) of the quantization coefficient matrix; or is located in the middle of the quantization coefficient matrix; or is located at any designated position in the quantization coefficient matrix.

(16) Obtain quantization coefficients in at least one row and at least one column in an SRCC region of the quantization coefficient matrix.

In this implementation, the "at least one quantization coefficient in the quantization coefficient matrix" in step 822 includes "a quantization coefficient in at least one row and at least one column in an SRCC region of the quantization coefficient matrix". As shown in FIG. 10, squares are used to represent quantization coefficients in an SRCC region of the quantization coefficient matrix, and each square represents one quantization coefficient. It is assumed that the SRCC region of the quantization coefficient matrix is a 4×4 coefficient matrix. In this case, as shown in FIG. 10(*d*), quantization coefficients in one row and one column shown by a shaded part in the SRCC region of the quantization coefficient matrix may be obtained; or as shown in FIG. 10(*d*), quantization coefficients in two rows and two columns shown by a shaded part in the SRCC region of the quantization coefficient matrix may be obtained. In the embodiments of this application, a relative position of an area in which the obtained quantization coefficients are located in the SRCC region is not limited. In some embodiments, the area (that is, at least one row and at least one column) in which the obtained quantization coefficients are located is located at an edge (for example, an upper edge and a left edge, a lower edge and a right edge, an upper edge and a right edge, or a lower edge and a left edge) of the SRCC region; or is located in the middle of the SRCC region; or is located at any designated position in the SRCC region.

(17) Obtain quantization coefficients in at least one diagonal and at least one designated position in the quantization coefficient matrix.

In this implementation, the "at least one quantization coefficient in the quantization coefficient matrix" in step 822 includes "a quantization coefficient in at least one diagonal and at least one designated position in the quantization coefficient matrix". As shown in FIG. 10, squares are used to represent quantization coefficients in the quantization coefficient matrix, and each square represents one quantization coefficient. It is assumed that the quantization coefficient matrix is a 4×4 coefficient matrix. In this case, as shown in FIG. 10(*c*), quantization coefficients in one diagonal and one designated position shown by a shaded part in the quantization coefficient matrix may be obtained; or as shown in FIG. 10(*c*), quantization coefficients in two diagonals and one designated position shown by a shaded part in the quantization coefficient matrix may be obtained.

(18) Obtain quantization coefficients in at least one diagonal and at least one designated position in an SRCC region of the quantization coefficient matrix.

In this implementation, the "at least one quantization coefficient in the quantization coefficient matrix" in step 822 includes "a quantization coefficient in at least one diagonal and at least one designated position in an SRCC region of the quantization coefficient matrix". As shown in FIG. 10, squares are used to represent quantization coefficients in an SRCC region of the quantization coefficient matrix, and each square represents one quantization coefficient. It is assumed that the SRCC region of the quantization coefficient matrix is a 4×4 coefficient matrix. In this case, as shown in FIG. 10(*c*), quantization coefficients in one diagonal and one designated position shown by a shaded part in the SRCC region of the quantization coefficient matrix may be obtained; or as shown in FIG. 10(*c*), quantization coefficients in two diagonals and one designated position shown by a shaded part in the SRCC region of the quantization coefficient matrix may be obtained.

It is to be understood that when at least one quantization coefficient is obtained by combining the foregoing various obtaining manners, there are no repetitive quantization coefficients in the at least one quantization coefficient. If quantization coefficients in the same position are repetitively obtained in an obtaining process, deduplication needs to be performed. For example, when at least one quantization coefficient is obtained in a manner of obtaining quantization coefficients in at least one row and at least one column in the quantization coefficient matrix, there are definitely repetitive quantization coefficients in quantization coefficients in at least one row and quantization coefficients in at least one column in the quantization coefficient matrix. In this case, quantization coefficients at repetitive positions only need to be counted once but do not need to be repeatedly counted. As shown in FIG. 10, squares are used to represent quantization coefficients in the quantization coefficient matrix, and each square represents one quantization coefficient. It is assumed that the quantization coefficient matrix is a 4×4 coefficient matrix. In this case, as shown in FIG. 10(*d*), in a combined obtaining manner of one row and one column in the quantization coefficient matrix, 7 quantization coefficients rather than 8 quantization coefficients are to be obtained. In a combined obtaining manner of two rows and two columns in the quantization coefficient matrix, 12 quantization coefficients rather than 16 quantization coefficients are to be obtained.

In addition, in the embodiments of this application, the video decoder and the video encoder are to use the same manner of implicitly indicating the value of the target flag bit, and select quantization coefficients in the same area in the quantization coefficient matrix to implicitly indicate the value of the target flag bit, to ensure that a video encoding process is consistent with a video decoding process.

Step 824: Perform statistical summation on the at least one quantization coefficient to obtain a statistical summation result.

After obtaining at least one quantization coefficient, statistical summation may be performed on the at least one quantization coefficient to obtain a statistical summation result.

A statistical summation manner of at least one quantization coefficient is not limited in the embodiments of this application. Several possible statistical summation manners are exemplarily shown below. In some embodiments, in the foregoing step 824, any implementation in the following may be included.

(1) Perform statistical summation on an original value of the at least one quantization coefficient to obtain the statistical summation result.

That is, statistical summation is directly performed on the at least one quantization coefficient to obtain a statistical summation result.

(2) Perform statistical summation on an absolute value of the at least one quantization coefficient to obtain the statistical summation result.

That is, an absolute value of at least one quantization coefficient is first calculated, and then statistical summation is performed on the absolute value of the at least one quantization coefficient, to obtain a statistical summation result.

(3) Perform statistical summation on an original value of a quantization coefficient with an original value being an odd number in the at least one quantization coefficient to obtain the statistical summation result.

That is, a quantization coefficient with an original value being an odd number in the at least one quantization coefficient is first obtained, and then statistical summation is directly performed on the obtained quantization coefficient, to obtain a statistical summation result.

(4) Perform statistical summation on an original value of a quantization coefficient with an original value being an even number in the at least one quantization coefficient to obtain the statistical summation result.

That is, a quantization coefficient with an original value being an even number in the at least one quantization coefficient is first obtained, and then statistical summation is directly performed on the obtained quantization coefficient, to obtain a statistical summation result.

(5) Perform statistical summation on an original value of a quantization coefficient with an absolute value being an odd number in the at least one quantization coefficient to obtain the statistical summation result.

That is, a quantization coefficient with an original value being an odd number in the at least one quantization coefficient is first obtained, then an absolute value of the obtained quantization coefficient is first obtained respectively, and then statistical summation is performed based on the absolute value, to obtain a statistical summation result.

(6) Perform statistical summation on an original value of a quantization coefficient with an absolute value being an even number in the at least one quantization coefficient to obtain the statistical summation result.

That is, a quantization coefficient with an original value being an even number in the at least one quantization coefficient is first obtained, then an absolute value of the obtained quantization coefficient is first obtained respectively, and then statistical summation is performed based on the absolute value, to obtain a statistical summation result.

(7) Perform statistical summation on an original value of a quantization coefficient with an original value being a nonzero even number in the at least one quantization coefficient to obtain the statistical summation result.

That is, a quantization coefficient with an original value being a nonzero even number in the at least one quantization coefficient is first obtained, and then statistical summation is directly performed on the obtained quantization coefficient, to obtain a statistical summation result.

(8) Perform statistical summation on an original value of a quantization coefficient with an absolute value being a nonzero even number in the at least one quantization coefficient to obtain the statistical summation result.

That is, a quantization coefficient with an original value being a nonzero even number in the at least one quantization coefficient is first obtained, then an absolute value of the obtained quantization coefficient is first obtained respectively, and then statistical summation is performed based on the absolute value, to obtain a statistical summation result.

(9) Map quantization coefficients in the at least one quantization coefficient to obtain at least one mapped quantization coefficient, and perform statistical summation on the at least one mapped quantization coefficient to obtain the statistical summation result.

That is, at least one quantization coefficient is respectively mapped, and then statistical summation is performed on at least one mapped quantization coefficient to obtain a statistical summation result.

A manner of mapping is not limited in the embodiments of this application. Several manners of mapping provided in the embodiments of this application are exemplarily shown below. In some embodiments, the mapping quantization coefficients in the at least one quantization coefficient to obtain at least one mapped quantization coefficient includes any implementation in the following.

(1) Map a quantization coefficient with an original value being an odd number in the at least one quantization coefficient into a first value to obtain at least one first quantization coefficient, and mapping a quantization coefficient with an original value being an even number in the at least one quantization coefficient into a second value to obtain at least one second quantization coefficient, the at least one mapped quantization coefficient including the at least one first quantization coefficient and/or the at least one second quantization coefficient.

The first value and the second value may be different values. In some embodiments, the parity of the first value is the same as the parity of the second value, or the parity of the first value is different from the parity of the second value. Specific values of the first value and the second value are not limited in the embodiments of this application. In some embodiments, the first value and the second value include several possible value selection manners in the following.

For example, the first value is 0, and the second value is 1. In this case, the foregoing mapping is respectively mapping a quantization coefficient with an original value being an odd number in the at least one quantization coefficient into 0 and a quantization coefficient with an original value being an even number into 1. That is, a quantization coefficient with an original value being an even number in the at least one quantization coefficient is respectively mapped and then summation is performed, and a quantization coefficient with an original value being an odd number in the at least one quantization coefficient is omitted.

For example, the first value is 1, and the second value is 0. In this case, the foregoing mapping is respectively mapping a quantization coefficient with an original value being an odd number in the at least one quantization coefficient into 1 and a quantization coefficient with an original value being an even number into 0. That is, a quantization coefficient with an original value being an odd number in the at least one quantization coefficient is respectively mapped and then summation is performed, and a quantization coefficient with an original value being an even number in the at least one quantization coefficient is omitted.

For example, the first value is 3, and the second value is 2. In this case, the foregoing mapping is respectively mapping a quantization coefficient with an original value being an odd number in the at least one quantization coefficient into 3 and a quantization coefficient with an original value being an even number into 2.

For example, the first value is 2, and the second value is 3. In this case, the foregoing mapping is respectively mapping a quantization coefficient with an original value being an odd number in the at least one quantization coefficient into 2 and a quantization coefficient with an original value being an even number into 3.

(2) Map a quantization coefficient with an original value being zero in the at least one quantization coefficient into a first value to obtain at least one first quantization coefficient, and mapping a quantization coefficient with an original value being nonzero in the at least one quantization coefficient into a second value to obtain at least one second quantization coefficient, the at least one mapped quantization coefficient including the at least one first quantization coefficient and/or the at least one second quantization coefficient.

The first value and the second value may be different values. In some embodiments, the parity of the first value is the same as the parity of the second value, or the parity of the first value is different from the parity of the second value. Specific values of the first value and the second value are not limited in the embodiments of this application. In some embodiments, the first value and the second value include several possible value selection manners in the following.

For example, the first value is 0, and the second value is 1. In this case, the foregoing mapping is respectively mapping a quantization coefficient with an original value being zero in the at least one quantization coefficient into 0 and a quantization coefficient with an original value being nonzero into 1. That is, a quantization coefficient with an original value being nonzero in the at least one quantization coefficient is respectively mapped and then summation is performed, and a quantization coefficient with an original value being zero in the at least one quantization coefficient is omitted.

For example, the first value is 1, and the second value is 0. In this case, the foregoing mapping is respectively mapping a quantization coefficient with an original value being zero in the at least one quantization coefficient into 1 and a quantization coefficient with an original value being nonzero into 0. That is, a quantization coefficient with an original value being zero in the at least one quantization coefficient is respectively mapped and then summation is performed, and a quantization coefficient with an original value being nonzero in the at least one quantization coefficient is omitted.

For example, the first value is 3, and the second value is 2. In this case, the foregoing mapping is respectively mapping a quantization coefficient with an original value being zero in the at least one quantization coefficient into 3 and a quantization coefficient with an original value being nonzero into 2.

For example, the first value is 2, and the second value is 3. In this case, the foregoing mapping is respectively mapping a quantization coefficient with an original value being zero in the at least one quantization coefficient into 2 and a quantization coefficient with an original value being nonzero into 3.

(3) Map a quantization coefficient with an original value being a nonzero even number in the at least one quantization coefficient into a first value to obtain at least one first quantization coefficient, and mapping a quantization coefficient with an original value being an odd number and zero in the at least one quantization coefficient into a second value to obtain at least one second quantization coefficient, the at least one mapped quantization coefficient including the at least one first quantization coefficient and/or the at least one second quantization coefficient.

The first value and the second value may be different values. In some embodiments, the parity of the first value is the same as the parity of the second value, or the parity of the first value is different from the parity of the second value. Specific values of the first value and the second value are not limited in the embodiments of this application. In some embodiments, the first value and the second value include several possible value selection manners in the following.

For example, the first value is 0, and the second value is 1. In this case, the foregoing mapping is respectively mapping a quantization coefficient with an original value being a nonzero even number in the at least one quantization coefficient into 0 and a quantization coefficient with an original value being an odd number or zero into 1. That is, a quantization coefficient with an original value being an odd number or zero in the at least one quantization coefficient is respectively mapped and then summation is performed, and a quantization coefficient with an original value being a nonzero even number in the at least one quantization coefficient is omitted.

For example, the first value is 1, and the second value is 0. In this case, the foregoing mapping is respectively mapping a quantization coefficient with an original value being a nonzero even number in the at least one quantization coefficient into 1 and a quantization coefficient with an original value being an odd number or zero into 0. That is, a quantization coefficient with an original value being a nonzero even number in the at least one quantization coefficient is respectively mapped and then summation is performed, and a quantization coefficient with an original value being an odd number or zero in the at least one quantization coefficient is omitted.

For example, the first value is 3, and the second value is 2. In this case, the foregoing mapping is respectively mapping a quantization coefficient with an original value being a nonzero even number in the at least one quantization coefficient into 3 and a quantization coefficient with an original value being an odd number or zero into 2.

For example, the first value is 2, and the second value is 3. In this case, the foregoing mapping is respectively mapping a quantization coefficient with an original value being a nonzero even number in the at least one quantization coefficient into 2 and a quantization coefficient with an original value being an odd number or zero into 3.

(4) Perform computational mapping on the at least one quantization coefficient to obtain the at least one mapped quantization coefficient, the computational mapping including at least one of the following: negative mapping, additive mapping, subtractive mapping, multiplicative mapping, and divisive mapping.

In addition to respectively mapping quantization coefficients of different properties according to different properties of at least one quantization coefficient, uniform mapping may be performed on at least one quantization coefficient. In the embodiments of this application, computational mapping may be performed on at least one quantization coefficient, and statistical summation is performed on at least one quantization coefficient after computational mapping to obtain a statistical summation result.

In some embodiments, the computational mapping includes at least one of the following: negative mapping (that is, each quantization coefficient in the at least one quantization coefficient is mapped into an opposite number), additive mapping (that is, a value such as 1 or 2 is added to each quantization coefficient in the at least one quantization coefficient), subtractive mapping (that is, a value such as 1 or 2 is subtracted from each quantization coefficient in the at least one quantization coefficient), multiplicative mapping (that is, each quantization coefficient in the at least one quantization coefficient is multiplied by a value such as 2 or 4), and divisive mapping (that is, each quantization coefficient in the at least one quantization coefficient is divided by a value such as 2 or 4).

In the embodiments of this application, in consideration of a calculation amount or the like, linear mapping is used in mapping of at least one quantization coefficient. During actual application, if a calculation amount constraint or the like is not taken into consideration, nonlinear mapping such as exponential mapping may be used for the at least one quantization coefficient.

In addition, the mapping manners provided in the embodiments of this application may be separately implemented or may be implemented in combination. For example, additive mapping is first performed on each quantization coefficient in the at least one quantization coefficient to obtain at least one mapped quantization coefficient. Next, an odd number in the at least one mapped quantization coefficient is mapped into the first value to obtain at least one first quantization coefficient, and an even number is mapped into the second value to obtain at least one second quantization coefficient. It is to be understood that these all fall within the protection scope of this application.

Step 826: Calculate a remainder of the statistical summation result according to a first calculation factor to obtain the first reference information.

The first calculation factor is a nonzero integer. For the video decoder, the first calculation factor is a calculation factor used for calculating a remainder of a statistical summation result. That is, the first calculation factor is a divisor. In some embodiments, the first calculation factor is a predetermined calculation factor or a designated calculation factor or a calculation factor determined by the video encoder and the video decoder in the same determining manner. The first reference information may be obtained according to the statistical summation result and the first calculation factor. In some embodiments, the first reference information is a remainder obtained by dividing the statistical summation result by the first calculation factor.

The first reference information is a result of calculating the remainder of the statistical summation result by using the first calculation factor. Therefore, the value of the first reference information may be equal to the first calculation factor. For example, the first calculation factor is N, N being a positive integer. In this case, the value of the first reference information may be any value from 0 to N−1.

Based on this, the foregoing step 830 includes: determining the value of the target flag bit corresponding to the first reference information according to a correspondence relationship between reference information and a value of the target flag bit.

In the embodiments of this application, the correspondence relationship between reference information and a value of the target flag bit may be established. In some embodiments, the target flag bit includes a first flag bit and/or a second flag bit. That is, there may be three cases of the target flag bit: the first flag bit (for example, sbt_dir_flag), the second flag bit (for example, sbt_pos_flag), and the first flag bit and the second flag bit. The correspondence relationship between reference information and a value of the target flag bit is described below respectively for three cases of the target flag bit.

In a case that the target flag bit includes the first flag bit or the second flag bit, that is, there is one target flag bit, In some embodiments, the reference information includes a first partial remainder and a second partial remainder, and the value of the target flag bit includes 0 and 1. The correspondence relationship between reference information and a value of the target flag bit includes that: the first partial remainder corresponds to the value of the target flag bit being 0; and the second partial remainder corresponds to the value of the target flag bit being 1. In some embodiments, the first calculation factor is 2, the first partial remainder is 0, and the second partial remainder is 1.

In a case that the target flag bit includes the first flag bit (for example, sbt_dir_flag), because the value of the first flag bit may include 0 and 1. In this case, the reference information at least needs to include two possible values. That is, at least two possibilities need to be included for a remainder of calculating the remainder of the first reference information by using the first calculation factor. Based on this, the first calculation factor needs to be greater than or equal to 2. In a case that the first calculation factor is equal to 2, two possibilities are included for the calculated remainder, and respectively correspond to 0 and 1. For example, the remainder being 0 corresponds to the first flag bit being 0, and the remainder being 1 corresponds to the first flag bit being 1; or the remainder being 0 corresponds to the first flag bit being 1, and the remainder being 1 corresponds to the first flag bit being 0. In a case that the first calculation factor is greater than 2, there are more than two possibilities for the calculated remainder. In this case, a plurality of possible remainders need to correspond to one same value of the first flag bit. For example, the first calculation factor is 5. In this case, the calculated remainders may be 0, 1, 2, 3, and 4. It may be set that the remainder being 0, 1, and 2 corresponds to the first flag bit being 1, and the remainder being 3 and 4 corresponds to the first flag bit being 0. Alternatively, it is set that the remainder being 0 and 1 corresponds to the first flag bit being 1, and the remainder being 2, 3, and 4 corresponds to the first flag bit being 0.

In a case that the target flag bit includes the second flag bit (for example, sbt_pos_flag), because the value of the second flag bit may include 0 and 1. In this case, the reference information at least needs to include two possible values. That is, at least two possibilities need to be included for a remainder of calculating the remainder of the first reference information by using the first calculation factor. Based on this, the first calculation factor needs to be greater than or equal to 2. In a case that the first calculation factor is equal to 2, two possibilities are included for the calculated remainder, and respectively correspond to 0 and 1. For example, the remainder being 0 corresponds to the second flag bit being 0, and the remainder being 1 corresponds to the second flag bit being 1; or the remainder being 0 corresponds to the second flag bit being 1, and the remainder being 1 corresponds to the second flag bit being 0. In a case that the first calculation factor is greater than 2, there are more than two possibilities for the calculated remainder. In this case, a plurality of possible remainders need to correspond to one same value of the second flag bit. For example, the first calculation factor is 5. In this case, the calculated remainders may be 0, 1, 2, 3, and 4. It may be set that the remainder being 0, 1, and 2 corresponds to the second flag bit being 1, and the remainder being 3 and 4 corresponds to the second flag bit being 0. Alternatively, it is set that the remainder being 0 and 1 corresponds to the second flag bit being 1, and the remainder being 2, 3, and 4 corresponds to the second flag bit being 0.

In a case that the target flag bit includes the first flag bit and the second flag bit, that is, there are two target flag bits, in some embodiments, the reference information includes a first partial remainder, a second partial remainder, a third partial remainder, and a fourth partial remainder, the value of the first flag bit includes 0 and 1, and the value of the second flag bit includes 0 and 1; the correspondence relationship between reference information and a value of the target flag bit includes that: the first partial remainder corresponds to the value of the first flag bit being 0 and the value of the second flag bit being 0; the second partial remainder corresponds to the value of the first flag bit being 0 and the value of the second flag bit being 1; the third partial remainder corresponds to the value of the first flag bit being 1 and the value of the second flag bit being 0; and the fourth partial remainder corresponds to the value of the first flag bit being 1 and the value of the second flag bit being 1. In some embodiments, the first calculation factor is 4, the first partial remainder is 0, the second partial remainder is 1, the third partial remainder is 2, and the fourth partial remainder is 3.

When the target flag bit includes both the first flag bit (for example, sbt_dir_flag) and the second flag bit (for example, sbt_pos_flag), because the value of the first flag bit may include 0 and 1 and the value of the second flag bit may include 0 and 1, a combined value of the first flag bit and the second flag bit may include four possibilities: (0,0), (0,1), (1,0), and (1,1). To simultaneously indicate values of the two flag bits, the reference information at least needs to include four possible values, that is, at least four possibilities need to be included for a remainder of calculating the remainder of the first reference information by using the first calculation factor. Based on this, the first calculation factor needs to be greater than or equal to 4. When the first calculation factor is equal to 4, four possibilities are included for the calculated remainder, and respectively correspond to (0,0), (0,1), (1,0), and (1,1). For example, the remainder being 0 corresponds to (0,0), the remainder being 1 corresponds to (0,1), the remainder being 2 corresponds to (1,0), and the remainder being 3 corresponds to (1,1). When the first calculation factor is greater than 4, there are more than four possibilities for the calculated remainder. In this case, a plurality of possible remainders need to correspond to one same combined value. For example, the first calculation factor is 5. In this case, the calculated remainders may be 0, 1, 2, 3, and 4. It may be set that the remainder being 0 and 1 corresponds to (0,0), the remainder being 2 corresponds to (0,1), the remainder being 3 corresponds to (1,0), and the remainder being 4 corresponds to (1,1).

When the target flag bit includes both the first flag bit and the second flag bit, the foregoing description is that the value of the first flag bit and the value of the second flag bit are simultaneously indicated by a remainder of calculating the remainder of the statistical summation result, the value of the first flag bit and the value of the second flag bit may be separately indicated or jointly indicated. For example, remainders are respectively obtained by using the foregoing manner of obtaining at least one quantization coefficient and the foregoing manner of statistical summation and remainder calculation. One remainder corresponds to the value of the first flag bit, and the other remainder corresponds to the value of the second flag bit. It is to be understood that these all fall within the protection scope of this application.

For example, quantization coefficients in a first area in a quantization coefficient matrix are obtained in the foregoing manner of obtaining at least one quantization coefficient; then the foregoing statistical summation is performed on the quantization coefficients in the first area to obtain a first statistical summation result; and subsequently, a remainder is calculated for the first statistical summation result according to the second flag bit to obtain a first remainder. Quantization coefficients in a second area in a quantization coefficient matrix are obtained in the foregoing manner of obtaining at least one quantization coefficient; then the foregoing statistical summation is performed on the quantization coefficients in the second area to obtain a second statistical summation result; and subsequently, a remainder is calculated for the second statistical summation result according to the third flag bit to obtain a second remainder. The second calculation factor and the third calculation factor may be the same calculation factor. For example, the second calculation factor and the third calculation factor are both 2. Alternatively, the second calculation factor and the third calculation factor may be different calculation factors. For example, the second calculation factor is 4, and the third calculation factor is 3.

The first remainder and the second remainder may respectively indicate a value of one flag bit. For example, the first remainder indicates the value of the foregoing first flag bit, and the second remainder indicates the value of the foregoing second flag bit. Alternatively, the values of the foregoing two flag bits may be jointly indicated. For example, the second flag bit and the third flag bit are both 2, the first remainder indicates the value of the first flag bit, and the second remainder indicates the value of the second flag bit. In this case, the first remainder may be 0 or 1. The first remainder being 1 indicates that the value of the first flag bit is 1, and the first remainder being 0 indicates that the value of the first flag bit is 0. The second remainder may be 0 or 1. The second remainder being 1 indicates that the value of the second flag bit is 1, and the second remainder being 0 indicates that the value of the second flag bit is 0. The values of the first remainder and the second remainder may be respectively 0 or 1. In this case, a combination of the first remainder and the second remainder may be (0,0), (0,1), (1,0), and (1,1), so that the combination (0,0) indicates that the value of the first flag bit is 0 and the value of the second flag bit is 0, the combination (0,1) indicates that the value of the first flag bit is 0 and the value of the second flag bit is 1, the combination (1,0) indicates that the value of the first flag bit is 1 and the value of the second flag bit is 0, and the combination (1,1) indicates that the value of the first flag bit is 1 and the value of the second flag bit is 1.

Some steps in the manner of implicitly indicating the value of the target flag bit according to a remainder of calculating the remainder of the statistical summation result of the quantization coefficient may be used in combination with another manner of implicit indication. For example, the value of the target flag bit is implicitly indicated by the parity of the remainder of calculating the remainder of the statistical summation result; or the value of the target flag bit is implicitly indicated by the parity of the remainder of the statistical summation result. It is to be understood that these all fall within the protection scope of this application. A case in which the value of the target flag bit is implicitly indicated according to the parity of the statistical summation result is briefly described below.

In an example, the foregoing determining the first reference information according to the quantization coefficient in the quantization coefficient matrix includes: obtaining at least one quantization coefficient in the quantization coefficient matrix; and performing statistical summation on the at least one quantization coefficient to obtain the first reference information. In some embodiments, the foregoing obtaining a value of a target flag bit corresponding to the first reference information includes: determining the parity of the first reference information; and determine the value of the target flag bit corresponding to the first reference information according to a correspondence relationship between the parity and a value of the target flag bit. For a process of obtaining at least one quantization coefficient and a process of calculating a statistical summation result, reference may be made to the foregoing method embodiments. Details are not described herein.

In summary, in the technical solutions provided in the embodiments of this application, summation is performed on at least one quantization coefficient in the quantization coefficient matrix, a remainder is obtained by calculating the remainder of the summation result, and then a value of a flag bit of a sub-block transform position of a coding unit to be processed is determined according to a correspondence relationship between a remainder and a value of a flag bit of the sub-block transform position. Because the value range of the remainder is less than the value range of the quantization coefficient, a correspondence relationship is established between a remainder and a value of a flag bit of the sub-block transform position, so that a quantity of correspondence relationships can be prevented from becoming excessively large, thereby reducing the complexity of the correspondence relationship, and increasing the speed of obtaining the value of the flag bit of the sub-block transform position. Alternatively, in the technical solutions provided in the embodiments of this application, summation is performed on at least one quantization coefficient in the quantization coefficient matrix, a remainder is obtained by calculating the remainder of the summation result, and then a value of a flag bit of a transform skip sub-block position of a coding unit to be processed is determined according to a correspondence relationship between a remainder and a value of a flag bit of the transform skip sub-block position. Because the value range of the remainder is less than the value range of the quantization coefficient, a correspondence relationship is established between a remainder and a value of a flag bit of the transform skip sub-block position, so that a quantity of correspondence relationships can be prevented from becoming excessively large, thereby reducing the complexity of the correspondence relationship, and increasing the speed of obtaining the value of the flag bit of the transform skip sub-block position.

In the embodiments of this application, the video encoder may indicate, by using an index in encoded data in an encoding process, whether to implicitly indicate the value of a flag bit of a target sub-block position according to a quantization coefficient in a quantization coefficient matrix. Therefore, in a decoding process, the video decoder may first determine, according to the index in the encoded data, whether to determine the value of the target flag bit according to the quantization coefficient. If yes, the video decoder performs decoding by using the video decoding method provided in the embodiments of this application.

Based on this, in an example, the foregoing method further includes: determining, according to a target index in encoded data, whether it is necessary to determine a value of the target flag bit according to the quantization coefficient matrix for a coding unit in the encoded data.

For a target index in encoded data, an index bit may be added to the encoded data for indicating whether it is necessary to determine a value of the target flag bit according to the quantization coefficient matrix for a coding unit in the encoded data, It is to be understood that the "coding unit in the encoded data" in the embodiments of this application is only used for indicating that the coding unit belongs to the encoded data, but is not used for limiting a quantity of coding units, that is, is not used for limiting all coding units in the encoded data. In some embodiments, the coding unit in the encoded data includes any one of the following: all coding units in the encoded data, a coding unit using an intra-frame prediction mode in the encoded data, and a coding unit using an inter-frame prediction mode in the encoded data.

In some embodiments, the encoded data includes at least one sequence. Each sequence includes at least one image. Each image includes at least one slice. Each slice includes at least one large coding unit (LCU). Based on this, the determining, according to a target index in encoded data, whether it is necessary to determine a value of the target flag bit according to the quantization coefficient matrix for a coding unit in the encoded data includes at least one of the following.

(1) Decode a sequence header included in the encoded data to obtain a first index, the target index including the first index; determine, according to the first index, whether it is necessary to determine the value of the target flag bit according to the quantization coefficient matrix for a coding unit in a first sequence, a coding unit in the encoded data including a coding unit in the first sequence.

For example, when the value of the first index is 1, it is determined that it is necessary to determine the value of the target flag bit according to the quantization coefficient matrix for the coding unit in the first sequence. When the value of the first index is 0, it is determined that it is not necessary to determine the value of the target flag bit according to the quantization coefficient matrix for the coding unit in the first sequence. In some embodiments, the coding unit in the first sequence includes any one of the following: all coding units in the first sequence, a coding unit using an intra-frame prediction mode in the first sequence, and a coding unit using an inter-frame prediction mode in the first sequence.

(2) Decode an image header included in the encoded data to obtain a second index, the target index including the second index, and determine, according to the second index, whether it is necessary to determine the value of the target flag bit according to the quantization coefficient matrix for a coding unit in a first image; a coding unit in the encoded data including a coding unit in the first image.

For example, when the value of the second index is 1, it is determined that it is necessary to determine the value of the target flag bit according to the quantization coefficient matrix for the coding unit in the first image. When the value of the second index is 0, it is determined that it is not necessary to determine the value of the target flag bit according to the quantization coefficient matrix for the coding unit in the first image. In some embodiments, the coding unit in the first image includes any one of the following: all coding units in the first image, a coding unit using an intra-frame prediction mode in the first image, and a coding unit using an inter-frame prediction mode in the first image.

(3) Decode a slice header included in the encoded data to obtain a third index, the target index including the third index, and determine, according to the third index, whether it is necessary to determine the value of the target flag bit according to the quantization coefficient matrix for a coding unit in a first slice, a coding unit in the encoded data including a coding unit in the first slice.

For example, when the value of the third index is 1, it is determined that it is necessary to determine the value of the target flag bit according to the quantization coefficient matrix for the coding unit in the first slice. When the value of the third index is 0, it is determined that it is not necessary to determine the value of the target flag bit according to the quantization coefficient matrix for the coding unit in the first slice. In some embodiments, the coding unit in the first slice includes any one of the following: all coding units in the first slice, a coding unit using an intra-frame prediction mode in the first slice, and a coding unit using an inter-frame prediction mode in the first slice.

(4) Decode header information of a large coding unit included in the encoded data to obtain a fourth index, the target index including the fourth index, and determining, according to the fourth index, whether it is necessary to determine the value of the target flag bit according to the quantization coefficient matrix for a coding unit in the first large coding unit, a coding unit in the encoded data including a coding unit in the first large coding unit.

For example, when the value of the fourth index is 1, it is determined that it is necessary to determine the value of the target flag bit according to the quantization coefficient matrix for the coding unit in the first large coding unit. When the value of the fourth index is 0, it is determined that it is not necessary to determine the value of the target flag bit according to the quantization coefficient matrix for the coding unit in the first large coding unit. In some embodiments, the coding unit in the first large coding unit includes any one of the following: all coding units in the first large coding unit, a coding unit using an intra-frame prediction mode in the first large coding unit, and a coding unit using an inter-frame prediction mode in the first large coding unit.

In the embodiments of this application, it may be determined, by combining at least two indices in the foregoing first index, second index, third index, and fourth index, whether it is necessary to determine a value of the target flag bit according to the quantization coefficient matrix for a coding unit in the encoded data. In some embodiments, it is determined, by combining the foregoing first index and second index, whether it is necessary to determine a value of the target flag bit according to the quantization coefficient matrix, the foregoing determining, according to a target index in encoded data, whether it is necessary to determine a value of the target flag bit according to the quantization coefficient matrix for a coding unit in the encoded data includes: decoding a sequence header included in the encoded data to obtain a first index, the target index including the first index; determining, according to the first index, whether it is necessary to determine the value of the target flag bit according to the quantization coefficient matrix for a coding unit in a first sequence, a coding unit in the encoded data including a coding unit in the first sequence; when the first index indicates that it is necessary to determine the value of the target flag bit according to the quantization coefficient matrix for the coding unit in the first sequence, decoding an image header included in the encoded data to obtain a second index, the target index including the second index; and determining, according to the second index, whether it is necessary to determine the value of the target flag bit according to the quantization coefficient matrix for a coding unit in a first image, a coding unit in the first sequence including a coding unit in the first image.

It is assumed that the value of an index being 1 indicates that it is necessary to determine a value of the target flag bit according to the quantization coefficient matrix for a coding unit in encoded data corresponding to the index, and the value of an index being 0 indicates that it is necessary to determine a value of the target flag bit according to the quantization coefficient matrix for a coding unit in encoded data corresponding to the index; and it is assumed that the encoded data includes a first sequence, the first sequence includes a first image, the first image includes a first slice, and the first slice includes a first large coding unit. A manner of using a combination to determine whether it is necessary to determine a value of the target flag bit according to the quantization coefficient matrix for a coding unit in the encoded data provided in the embodiments of this application is exemplarily shown below.

When the first index is 0, it is determined that it is not necessary to determine the value of the target flag bit according to the quantization coefficient matrix for the coding unit in the first sequence. In this case, it is no longer necessary to continue to determine the values of the second index, the third index, and the fourth index. In some embodiments, the video encoder may encode only the first index, but does not need to encode the second index, the third index, and the fourth index.

When the first index is 1, the value of the second index is further determined. When the second index is 0, it is determined that it is not necessary to determine the value of the target flag bit according to the quantization coefficient matrix for the coding unit in the first image. In this case, it is no longer necessary to continue to determine the values of the third index and the fourth index. In some embodiments, the video encoder may encode the first index and the second index, but does not need to encode the third index and the fourth index.

When the first index is 1 and the second index is 1, the value of the third index is further determined. When the third index is 0, it is determined that it is not necessary to determine the value of the target flag bit according to the quantization coefficient matrix for the coding unit in the first slice. In this case, it is no longer necessary to continue to determine the value of the fourth index. In some embodiments, the video encoder may encode the first index, the second index, and the third index, but does not need to encode the fourth index.

When the value of the first index is 1, the value of the second index is 1, and the value of the third index is 1, the value of the fourth index is further determined. When the value of the fourth index is 0, it is determined that it is not necessary to determine the value of the target flag bit according to the quantization coefficient matrix for the coding unit in the first large coding unit. When the value of the fourth index is 1, it is determined that it is necessary to determine the value of the target flag bit according to the quantization coefficient matrix for the coding unit in the first large coding unit. In some embodiments, the video encoder needs to encode all the first index, the second index, the third index, and the fourth index.

In another example, the foregoing method further includes: determining, according to a size relationship between a block size of a coding unit and a target block size, whether it is necessary to determine the value of the target flag bit according to the quantization coefficient matrix for the coding unit.

The target block size may be a predefined block size or may be a block size determined by the video encoder and informed to the video decoder or may be a block size determined by the video encoder and the video decoder in the same determining manner. Neither of the determining manner and size of the target block size is limited in the embodiments of this application. In a video encoding/decoding process, it may be determined, according to a size relationship between a block size of a coding unit and a target block size, whether it is necessary to determine the value of the target flag bit according to the quantization coefficient matrix for the coding unit. For example, when the block size of the coding unit is less than the target block size, it is determined that it is necessary to determine the value of the target flag bit according to the quantization coefficient matrix for the coding unit; or when the block size of the coding unit is greater than or equal to the target block size, it is determined that it is not necessary to determine the value of the target flag bit according to the quantization coefficient matrix for the coding unit.

In still another example, the foregoing method further includes: determining, according to a quantity of quantization coefficients with an original value being nonzero in a quantization coefficient matrix corresponding to a coding unit, whether it is necessary to determine the value of the target flag bit according to the quantization coefficient matrix for the coding unit.

In some embodiments, after a quantization coefficient matrix is obtained, a quantity of quantization coefficients with an original value being nonzero in the quantization coefficient matrix may be determined, and then the quantity of quantization coefficients with an original value being nonzero is compared with a target quantity, to determine whether it is necessary to implicitly indicate a value of the target flag bit according to the quantization coefficient matrix for a coding unit. For example, when the quantity of quantization coefficients with an original value being nonzero is greater than the target quantity, it is determined that it is necessary to implicitly indicate a value of the target flag bit according to the quantization coefficient matrix. When the quantity of quantization coefficients with an original value being nonzero is less than or equal to the target quantity, it is determined that it is not necessary to implicitly indicate a value of the target flag bit according to the quantization coefficient matrix. The target quantity may be a predefined quantity or may be a quantity determined by the video encoder and informed to the video decoder or may be a quantity determined by the video encoder and the video decoder in the same determining manner. Neither of the determining manner and size of the target quantity is limited in the embodiments of this application.

In yet another example, the foregoing method further includes: determining, according to a position of vertex coordinates in an SRCC region of a quantization coefficient matrix corresponding to a coding unit, whether it is necessary to determine the value of the target flag bit according to the quantization coefficient matrix for the coding unit.

In some embodiments, after a quantization coefficient matrix is obtained, a position of vertex coordinates in an SRCC region of the quantization coefficient matrix may be determined, and it is determined, according to the position of the vertex coordinates, whether it is necessary to determine the value of the target flag bit according to the quantization coefficient matrix. For example, it is assumed that the vertex coordinates are represented by coordinates (x, y) in a two-dimensional coordinate system. When x is greater than a first reference value and y is greater than a second reference value, it is determined that it is necessary to implicitly indicate the value of the target flag bit according to the quantization coefficient matrix. When x is less than or equal to a first reference value or y is less than or equal to a second reference value, it is determined that it is not necessary to implicitly indicate the value of the target flag bit according to the quantization coefficient matrix. In another example, it is assumed that the vertex coordinates are represented by coordinates (x, y) in a two-dimensional coordinate system. When x is greater than a first reference value or y is greater than a second reference value, it is determined that it is necessary to implicitly indicate the value of the target flag bit according to the quantization coefficient matrix. When x is less than or equal to a first reference value and y is less than or equal to a second reference value, it is determined that it is not necessary to implicitly indicate the value of the target flag bit according to the quantization coefficient matrix. The target position may be a predefined position or may be a position determined by the video encoder and informed to the video decoder or may be a position determined by the video encoder and the video decoder in the same determining manner. Neither of the determining manner and size of the target position is limited in the embodiments of this application.

In summary, in the technical solutions provided in the embodiments of this application, it is determined, according to any one of manners such as an index in encoded data, a size of a coding unit, a quantity of quantization coefficients with an original value being nonzero in a quantization coefficient matrix, and a position of vertex coordinates in an SRCC region, whether it is necessary to determine the value of the flag bit of the target sub-block position (the sub-block transform position or the transform sub-block position) according to the quantization coefficient matrix, so that in a case of avoiding explicit encoding of a flag bit by a video encoder, the video decoder performs decoding in a manner of determining the value of a flag bit during implicit indication of a flag bit, thereby avoiding a waste of computing resources and improving the decoding efficiency.

Figure 11:
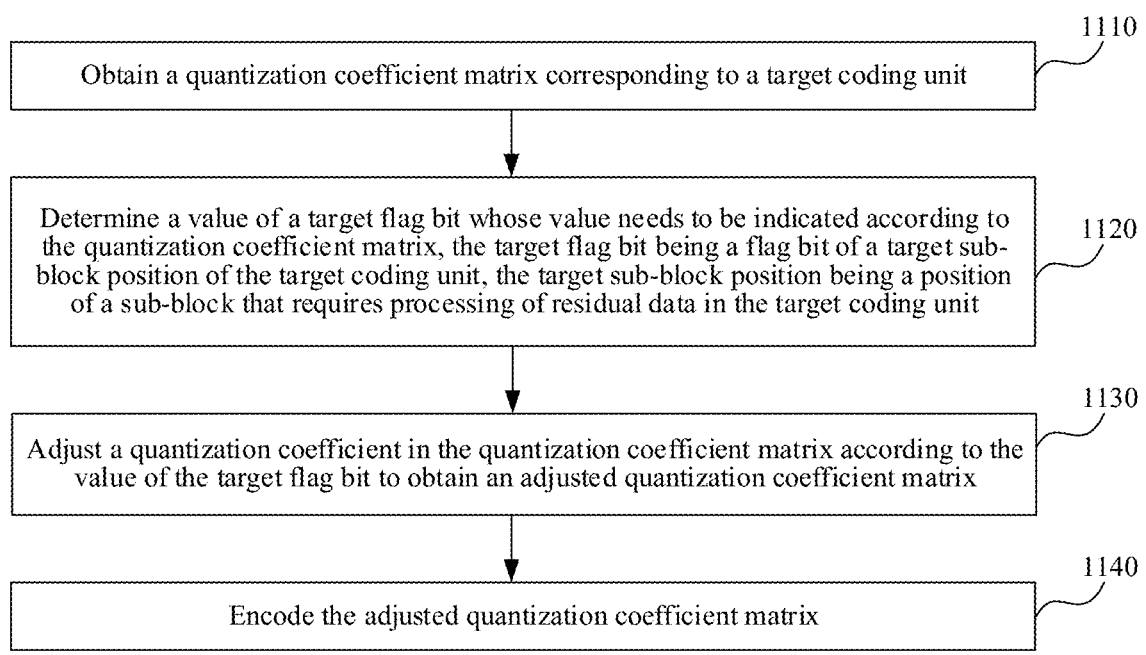
FIG. 11 is a flowchart of a video encoding method according to an embodiment of this application.

FIG. 11 is a flowchart of a video encoding method according to an embodiment of this application. The method is applicable to a video encoder, for example, the first device 210 in the communication system shown in FIG. 6. The method may include several steps (steps 1110 to 1140) in the following.

Step 1110: Obtain a quantization coefficient matrix corresponding to a target coding unit.

As can be seen from the foregoing description, after performing predictive coding on a target coding unit, the video encoder may obtain residual data corresponding to the target coding unit, and subsequently needs to perform residual processing on the residual data, to obtain a quantization coefficient matrix of the target coding unit. In an example, the residual processing on the residual data includes transform and quantization, a transform coefficient may be obtained by performing transform on the residual data, and subsequently a quantized transform coefficient, that is, a quantization coefficient, may be obtained by performing quantization on the transform coefficient. The at least one quantization coefficient may form a quantization coefficient matrix. In another example, the residual processing on the residual data includes transform skip and quantization, and a quantized coefficient, that is, a quantization coefficient, may be obtained by performing transform skip and directly performing quantization on the residual data. The at least one quantization coefficient may form a quantization coefficient matrix.

In the embodiments of this application, for transform and quantization of a residual signal corresponding to a target coding unit, sub-block partitioning needs to be performed on the target coding unit, and transform and quantization of residual data are performed on some sub-blocks obtained through partitioning; or for transform skip and quantization of a residual signal corresponding to a target coding unit, sub-block partitioning needs to be performed on the target coding unit, transform skip and quantization of residual data are performed on some sub-blocks obtained through partitioning, and other sub-blocks are forcibly cleared to zero, that is, neither transform nor quantization is performed on other sub-blocks. Based on this, in an example, the foregoing step 1110 includes: performing predictive coding on the target coding unit to obtain residual data corresponding to the target coding unit; determining the target sub-block position of the target coding unit; and performing transform and quantization on the residual data according to the target sub-block position to obtain a quantization coefficient matrix.

Step 1120: Determine a value of a target flag bit whose value needs to be indicated according to the quantization coefficient matrix, the target flag bit being a flag bit of a target sub-block position of the target coding unit.

The target flag bit is a transform flag bit, the target sub-block position is a sub-block transform position, and the sub-block transform position is a position of a sub-block that requires transform and quantization of the residual data in the coding unit; or the target flag bit is a transform skip flag bit, the target sub-block position is a transform skip sub-block position, and the transform skip sub-block position is a position of a sub-block that requires transform skip and quantization of the residual data in the coding unit.

The flag bit (the target flag bit) of the target sub-block position may include a plurality of flag bits. In an example, the target flag bit includes at least one of the following: a first flag bit, used for indicating a partitioning direction of the target sub-block position of the target coding unit, the partitioning direction including transverse partitioning and longitudinal partitioning; and a second flag bit, used for indicating the target sub-block position of the target coding unit based on the partitioning direction indicated by the first flag bit. The video encoder may determine a flag bit that needs to be implicitly indicated in these flag bits and a value of a flag bit that needs to be implicitly indicated. In some embodiments, in a case of determining the target sub-block position, the video encoder may determine the value of the flag bit that needs to be implicitly indicated.

Step 1130: Adjust a quantization coefficient in the quantization coefficient matrix according to the value of the target flag bit to obtain an adjusted quantization coefficient matrix.

To ensure that the video decoder can accurately determine, by using a quantization coefficient in a quantization coefficient matrix, a value of a flag bit that is implicitly indicated, in the embodiments of this application, in an encoding process, the video encoder adjusts the quantization coefficient in the quantization coefficient matrix according to the value of the flag bit that is implicitly indicated, to obtain an adjusted quantization coefficient matrix.

In an example, the foregoing step 1130 includes: determining reference information corresponding to the value of the target flag bit as first reference information; obtaining at least one quantization coefficient in the quantization coefficient matrix; performing statistical summation on the at least one quantization coefficient to obtain a statistical summation result; and adjusting the at least one quantization coefficient according to the statistical summation result, the first reference information, and a first calculation factor to obtain at least one adjusted quantization coefficient, the first reference information being obtained by calculating a remainder of a statistical summation result of the at least one adjusted quantization coefficient by using the first calculation factor, the first calculation factor being a nonzero integer.

In some embodiments, the foregoing at least one quantization coefficient in the quantization coefficient matrix is obtained in at least one implementation in the following:

(1) Obtain all quantization coefficients in the quantization coefficient matrix.

(2) Obtain a quantization coefficient in at least one designated position in the quantization coefficient matrix.

(3) Obtain quantization coefficients in at least one row in the quantization coefficient matrix.

(4) Obtain quantization coefficients in at least one column in the quantization coefficient matrix.

(5) Obtain quantization coefficients in at least one diagonal in the quantization coefficient matrix.

(6) Obtain quantization coefficients in first n positions in a scan order in the quantization coefficient matrix, n being a positive integer.

(7) Obtain quantization coefficients in middle m positions in a scan order in the quantization coefficient matrix, m being a positive integer.

(8) Obtain all quantization coefficients in an SRCC region of the quantization coefficient matrix.

(9) Obtain a quantization coefficient in at least one designated position in an SRCC region of the quantization coefficient matrix.

(10) Obtain quantization coefficients in at least one row in an SRCC region of the quantization coefficient matrix.

(11) Obtain quantization coefficients in at least one column in an SRCC region of the quantization coefficient matrix.

(12) Obtain quantization coefficients in at least one diagonal in an SRCC region of the quantization coefficient matrix.

(13) Obtain quantization coefficients in first s positions in a scan order in an SRCC region of the quantization coefficient matrix, s being a positive integer.

(14) Obtain quantization coefficients in middle t positions in a scan order in an SRCC region of the quantization coefficient matrix, t being a positive integer.

(15) Obtain quantization coefficients in at least one row and at least one column in the quantization coefficient matrix.

(16) Obtain quantization coefficients in at least one row and at least one column in an SRCC region of the quantization coefficient matrix.

(17) Obtain quantization coefficients in at least one diagonal and at least one designated position in the quantization coefficient matrix.

(18) Obtain quantization coefficients in at least one diagonal and at least one designated position in an SRCC region of the quantization coefficient matrix.

In some embodiments, the foregoing performing statistical summation on the at least one quantization coefficient to obtain a statistical summation result includes any implementation in the following:

(1) Perform statistical summation on an original value of the at least one quantization coefficient to obtain the statistical summation result.

(2) Perform statistical summation on an absolute value of the at least one quantization coefficient to obtain the statistical summation result.

(3) Perform statistical summation on an original value of a quantization coefficient with an original value being an odd number in the at least one quantization coefficient to obtain the statistical summation result.

(4) Perform statistical summation on an original value of a quantization coefficient with an absolute value being an odd number in the at least one quantization coefficient to obtain the statistical summation result.

(5) Perform statistical summation on an original value of a quantization coefficient with an original value being an even number in the at least one quantization coefficient to obtain the statistical summation result.

(6) Perform statistical summation on an original value of a quantization coefficient with an absolute value being an even number in the at least one quantization coefficient to obtain the statistical summation result.

(7) Perform statistical summation on an original value of a quantization coefficient with an original value being a nonzero even number in the at least one quantization coefficient to obtain the statistical summation result.

(8) Perform statistical summation on an original value of a quantization coefficient with an absolute value being a nonzero even number in the at least one quantization coefficient to obtain the statistical summation result.

(9) Map quantization coefficients in the at least one quantization coefficient to obtain at least one mapped quantization coefficient, and perform statistical summation on the at least one mapped quantization coefficient to obtain the statistical summation result.

In some embodiments, the mapping quantization coefficients in the at least one quantization coefficient to obtain at least one mapped quantization coefficient includes any implementation in the following:

(1) Map a quantization coefficient with an original value being an odd number in the at least one quantization coefficient into a first value to obtain at least one first quantization coefficient, and mapping a quantization coefficient with an original value being an even number in the at least one quantization coefficient into a second value to obtain at least one second quantization coefficient, the at least one mapped quantization coefficient including the at least one first quantization coefficient and/or the at least one second quantization coefficient.

(2) Map a quantization coefficient with an original value being zero in the at least one quantization coefficient into a first value to obtain at least one first quantization coefficient, and mapping a quantization coefficient with an original value being nonzero in the at least one quantization coefficient into a second value to obtain at least one second quantization coefficient, the at least one mapped quantization coefficient including the at least one first quantization coefficient and/or the at least one second quantization coefficient.

(3) Map a quantization coefficient with an original value being a nonzero even number in the at least one quantization coefficient into a first value to obtain at least one first quantization coefficient, and mapping a quantization coefficient with an original value being an odd number and zero in the at least one quantization coefficient into a second value to obtain at least one second quantization coefficient, the at least one mapped quantization coefficient including the at least one first quantization coefficient and/or the at least one second quantization coefficient.

(4) Perform computational mapping on the at least one quantization coefficient to obtain the at least one mapped quantization coefficient, the computational mapping including at least one of the following: negative mapping, additive mapping, subtractive mapping, multiplicative mapping, and divisive mapping.

For the description related to the foregoing obtaining of a quantization coefficient, the adjustment of a quantization coefficient matrix, the correspondence relationship between the parity and a value of the target flag bit, and the like, reference may be made to the exemplary description of the foregoing method on a video decoding side. It is to be understood that a person skilled in the art may learn a process of adjusting a quantization coefficient according to the value of the target flag bit from a process of determining the value of the target flag bit according to the quantization coefficient on a video decoding side.

In the embodiments of this application, when the value of the target flag bit is determined on the video decoding side, an area in which the obtained at least one quantization coefficient is located in the quantization coefficient matrix needs to be kept consistent with an area in which the quantization coefficient adjusted by the video encoder in an encoding process is located in the quantization coefficient matrix. It is only in this way that the consistency between a video decoding process and a video encoding process can be ensured.

Step 1140: Encode the adjusted quantization coefficient matrix.

After adjusting the quantization coefficient, the video encoder may encode the adjusted quantization coefficient matrix. In some embodiments, the video encoder may further encode other information (for example, mode information, and a motion vector), so that the video encoder may obtain encoded data corresponding to the target coding unit by encoding the adjusted quantization coefficient matrix and other information.

In the embodiments of this application, the video encoder may indicate, by using an index in encoded data in an encoding process, whether to implicitly indicate the value of a flag bit of a target sub-block position according to a quantization coefficient in a quantization coefficient matrix. That is, in an example, the foregoing method further includes: determining, according to a target index in encoded data, whether it is necessary to determine a value of the target flag bit according to the quantization coefficient matrix for a coding unit in the encoded data, the coding unit in the encoded data including any one of the following: all coding units in the encoded data, a coding unit using an intra-frame prediction mode in the encoded data, and a coding unit using an inter-frame prediction mode in the encoded data.

In some embodiments, the indicating, according to a target index in encoded data, whether it is necessary to determine a value of the target flag bit according to the quantization coefficient matrix for a coding unit in the encoded data includes at least one of the following.

(1) indicating, according to a first index encoded in a sequence header included in the encoded data, whether it is necessary to determine the value of the target flag bit according to the quantization coefficient matrix for a coding unit in a first sequence, the target index including the first index;

(2) indicating, according to a second index encoded in an image header included in the encoded data, whether it is necessary to determine the value of the target flag bit according to the quantization coefficient matrix for a coding unit in a first image, the target index including the second index;

(3) indicating, according to a third index encoded in a slice header included in the encoded data, whether it is necessary to determine the value of the target flag bit according to the quantization coefficient matrix for a coding unit in a first slice, the target index including the third index;

(4) indicating, according to a fourth index encoded in header information of a large coding unit included in the encoded data, whether it is necessary to determine the value of the target flag bit according to the quantization coefficient matrix for a coding unit in a first large coding unit, the target index including the fourth index;

(5) when it is necessary to determine the value of the target flag bit according to the quantization coefficient matrix for the coding unit in the first image, indicating, according to a first index encoded in a sequence header included in the encoded data and a second index encoded in an image header included in the encoded data, whether it is necessary to determine the value of the target flag bit according to the quantization coefficient matrix for the coding unit in the first image, the target index including the first index and the second index.

For the description related to the foregoing indicating, according to an index, whether it is necessary to determine a value of a flag bit of a target sub-block position according to a quantization coefficient matrix, reference may be made to the foregoing embodiments. Details are not described herein.

In an example, the foregoing method further includes: determining, according to the value of a flag bit of the target sub-block position, whether the quantization coefficient matrix needs to be rotated; and when it is determined that the quantization coefficient matrix needs to be rotated, rotating a direction of the quantization coefficient matrix from a second direction to a first direction to obtain a rotated quantization coefficient matrix, the rotated quantization coefficient matrix being used for encoding. For the description of the foregoing process of rotating the quantization coefficient matrix, reference may be made to the foregoing method embodiments. Details are not described herein.

In summary, in the technical solutions provided in the embodiments of this application, a quantization coefficient in a quantization coefficient matrix is adjusted according to a value of a flag bit of a sub-block transform position of a coding unit, to allow a video decoder to determine the value of the flag bit of the sub-block transform position according to the adjusted quantization coefficient in the quantization coefficient matrix, so that a flag bit of a sub-block transform position in a target coding unit is implicitly indicated according to a quantization coefficient in a quantization coefficient matrix corresponding to a coding unit, to avoid explicit coding of the sub-block transform position, thereby reducing a quantity of bits occupied by a video bit stream, and improving the efficiency of video coding. In addition, in the technical solutions provided in the embodiments of this application, it is not necessary to explicitly encode and decode every flag bit at a sub-block transform position, so that the processing overheads of a video encoder and a video decoder can be reduced, which is conducive to improving the encoding efficiency of the video encoder and the decoding efficiency of the video decoder. Alternatively, a flag bit of a transform skip sub-block position in a target coding unit is implicitly indicated by using a quantization coefficient in a quantization coefficient matrix corresponding to a coding unit to determine the transform skip sub-block position in the target coding unit, to avoid explicit coding of the transform skip sub-block position, thereby reducing a quantity of bits occupied by a video bit stream, and improving the efficiency of video coding. In addition, in the technical solutions provided in the embodiments of this application, it is not necessary to explicitly encode and decode every flag bit at a transform skip sub-block position, so that the processing overheads of a video encoder and a video decoder can be reduced, which is conducive to improving the encoding efficiency of the video encoder and the decoding efficiency of the video decoder.

Figure 12:
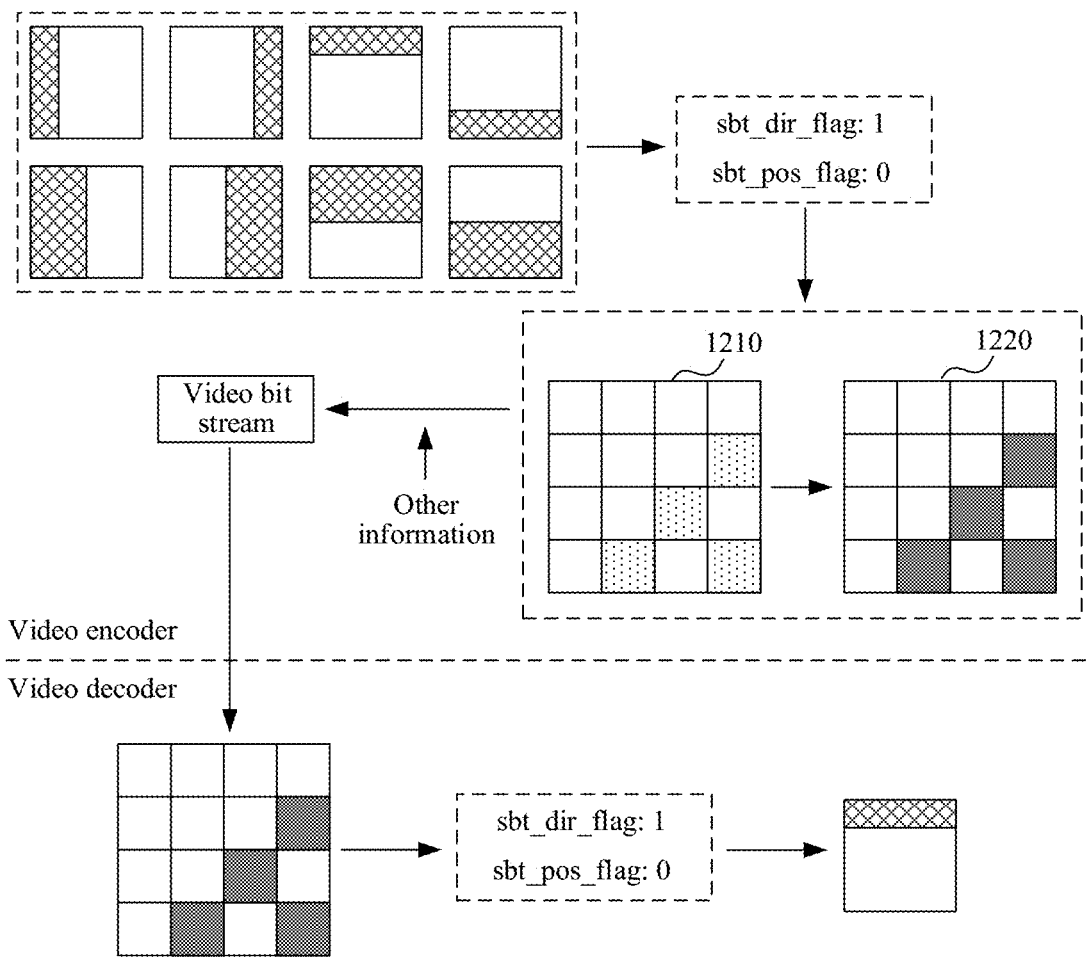
FIG. 12 is a schematic diagram of a video encoding/decoding process according to an embodiment of this application.

FIG. 12 is a schematic diagram of a video encoding process and a video decoding process according to an embodiment of this application. The method is applicable to a video encoder and a video decoder, for example, the first device 210 and the second device 220 in the communication system shown in FIG. 7.

For a Video Encoder:

As shown in FIG. 12, in an encoding process, the video encoder may determine a position of a sub-block that requires transform and quantization of residual data in a target coding unit or determine a position of a sub-block that requires transform skip and quantization of residual data in a target coding unit, that is, a target sub-block position, and indicate the target sub-block position by using a value of a target flag bit. Subsequently, the video encoder adjusts a quantization coefficient in a designated area in a quantization coefficient matrix 1210 according to the value of the target flag bit to obtain an adjusted quantization coefficient matrix 1220. Next, the video encoder encodes the adjusted quantization coefficient matrix (for example, mode information, and a motion vector) and other information, to obtain encoded data corresponding to the target coding unit.

For a Video Decoder:

As shown in FIG. 12, after obtaining encoded data, the video decoder decodes the encoded data to obtain a quantization coefficient matrix corresponding to a target coding unit. Next, a value of a flag bit of a target sub-block position is obtained according to a quantization coefficient in a designated area in the quantization coefficient matrix, to determine a target sub-block position in the target coding unit.

The following describes apparatus embodiments of this application, which can be used for executing the method embodiments of this application. For details not disclosed in the apparatus embodiments of this application, refer to the method embodiments of this application.

Figure 13:
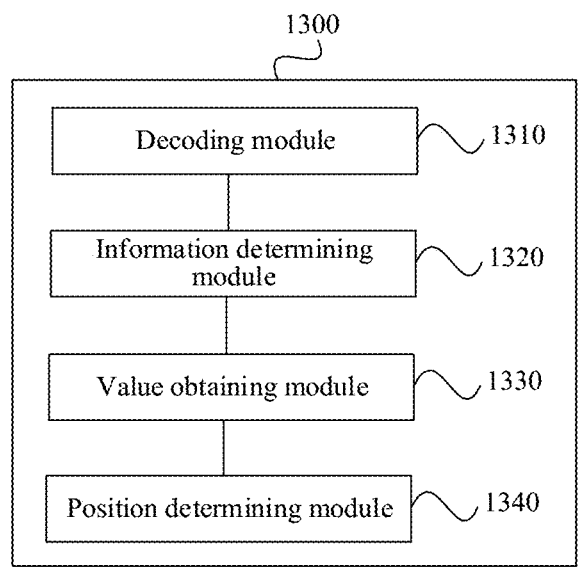
FIG. 13 is a block diagram of a video decoding apparatus according to an embodiment of this application.

FIG. 13 is a block diagram of a video decoding apparatus according to an embodiment of this application. The apparatus has functions of implementing an example of the foregoing video decoding method. The functions may be implemented by using hardware or may be implemented by using hardware executing corresponding software. The apparatus may be a video decoder or may be disposed in a video decoder. The apparatus 1300 may include a decoding module 1310, an information determining module 1320, a value obtaining module 1330, and a position determining module 1340.

The decoding module 1310 is configured to decode a target coding unit to obtain a quantization coefficient matrix corresponding to the target coding unit.

The information determining module 1320 is configured to determine first reference information according to a quantization coefficient in the quantization coefficient matrix.

The value obtaining module 1330 is configured to obtain a value of a target flag bit corresponding to the first reference information, the target flag bit being a flag bit of a target sub-block position, the target sub-block position being a position of a sub-block that requires processing of residual data in a coding unit.

The position determining module 1340 is configured to determine the target sub-block position of the target coding unit according to the value of the target flag bit.

In an example, the processing of the residual data includes: performing transform and quantization on the residual data or performing transform skip and quantization on the residual data; when the processing of the residual data includes performing transform and quantization on the residual data, the target flag bit is a transform flag bit, the target sub-block position is a sub-block transform position, and the sub-block transform position is a position of a sub-block that requires transform and quantization of the residual data in the coding unit; and when the processing of the residual data includes performing transform skip and quantization on the residual data, the target flag bit is a transform skip flag bit, the target sub-block position is a transform skip sub-block position, and the transform skip sub-block position is a position of a sub-block that requires transform skip and quantization of the residual data in the coding unit.

Figure 14:
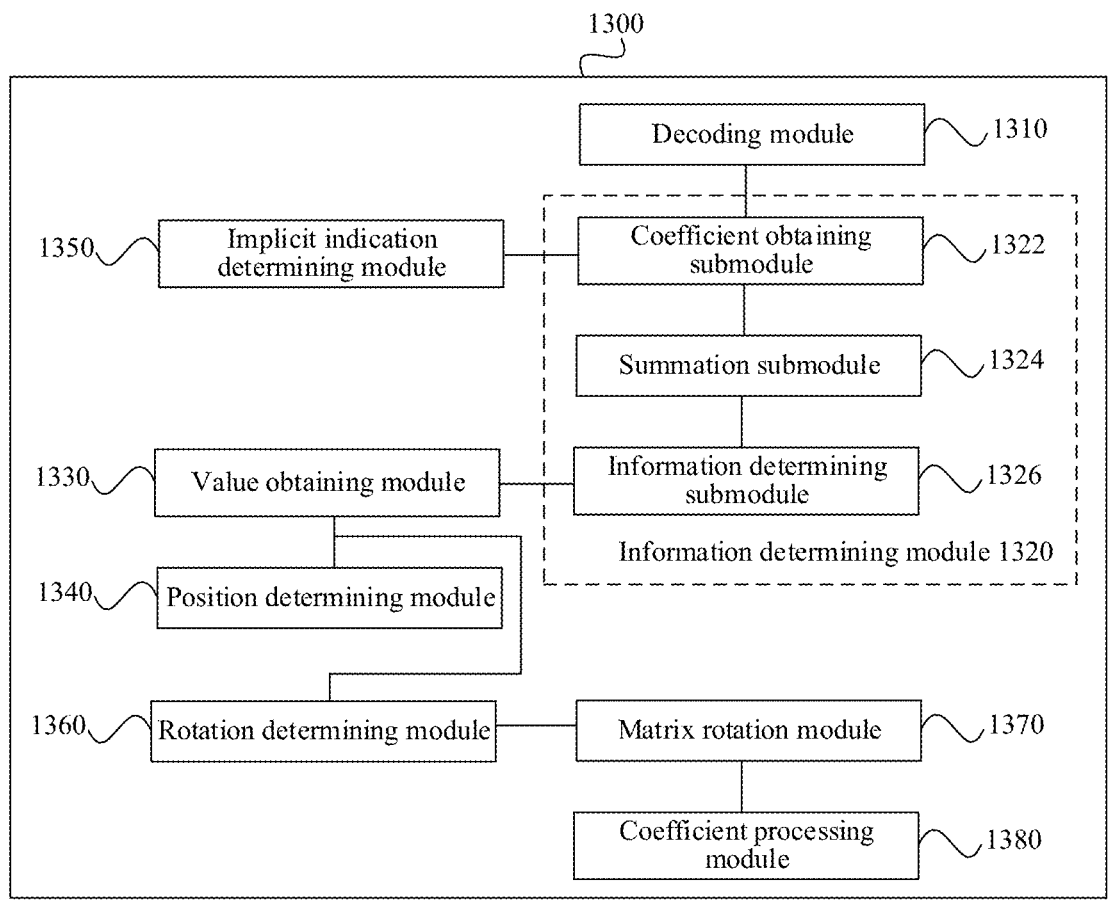
FIG. 14 is a block diagram of a video decoding apparatus according to another embodiment of this application.

In an example, as shown in FIG. 14, the foregoing information determining module 1320 includes: a coefficient obtaining submodule 1322, configured to obtain at least one quantization coefficient in the quantization coefficient matrix; a summation submodule 1324, configured to perform statistical summation on the at least one quantization coefficient to obtain a statistical summation result; and an information determining submodule 1326, configured to calculate a remainder of the statistical summation result according to a first calculation factor to obtain the first reference information, the first calculation factor being a nonzero integer.

In an example, as shown in FIG. 14, the coefficient obtaining submodule 1322 is configured to implement any manner in the following: obtaining all quantization coefficients in the quantization coefficient matrix; obtaining quantization coefficients in at least one row and at least one column in the quantization coefficient matrix; obtaining all quantization coefficients in an SRCC region of the quantization coefficient matrix; and obtaining quantization coefficients in at least one row and at least one column in an SRCC region of the quantization coefficient matrix.

In an example, as shown in FIG. 14, the coefficient obtaining submodule 1322 is configured to implement at least one manner in the following: obtaining a quantization coefficient in at least one designated position in the quantization coefficient matrix; obtaining quantization coefficients in at least one row in the quantization coefficient matrix; obtaining quantization coefficients in at least one column in the quantization coefficient matrix; obtaining quantization coefficients in at least one diagonal in the quantization coefficient matrix; obtaining quantization coefficients in first n positions in a scan order in the quantization coefficient matrix, n being a positive integer; and obtaining quantization coefficients in middle m positions in a scan order in the quantization coefficient matrix, m being a positive integer.

In an example, as shown in FIG. 14, the coefficient obtaining submodule 1322 is configured to implement at least one manner in the following: obtaining a quantization coefficient in at least one designated position in an SRCC region of the quantization coefficient matrix; obtaining quantization coefficients in at least one row in an SRCC region of the quantization coefficient matrix; obtaining quantization coefficients in at least one column in an SRCC region of the quantization coefficient matrix; obtaining quantization coefficients in at least one diagonal in an SRCC region of the quantization coefficient matrix; obtaining quantization coefficients in first s positions in a scan order in an SRCC region of the quantization coefficient matrix, s being a positive integer; and obtaining quantization coefficients in middle t positions in a scan order in an SRCC region of the quantization coefficient matrix, t being a positive integer.

In an example, as shown in FIG. 14, the foregoing summation submodule 1324 is configured to: perform statistical summation on an original value of the at least one quantization coefficient to obtain the statistical summation result; or perform statistical summation on an absolute value of the at least one quantization coefficient to obtain the statistical summation result; or perform statistical summation on an original value of a quantization coefficient with an original value being an odd number in the at least one quantization coefficient to obtain the statistical summation result; or perform statistical summation on an original value of a quantization coefficient with an absolute value being an odd number in the at least one quantization coefficient to obtain the statistical summation result; or perform statistical summation on an original value of a quantization coefficient with an original value being an even number in the at least one quantization coefficient to obtain the statistical summation result; or perform statistical summation on an original value of a quantization coefficient with an absolute value being an even number in the at least one quantization coefficient to obtain the statistical summation result; or perform statistical summation on an original value of a quantization coefficient with an original value being a nonzero even number in the at least one quantization coefficient to obtain the statistical summation result; or perform statistical summation on an original value of a quantization coefficient with an absolute value being a nonzero even number in the at least one quantization coefficient to obtain the statistical summation result; or map quantization coefficients in the at least one quantization coefficient to obtain at least one mapped quantization coefficient; perform statistical summation on the at least one mapped quantization coefficient to obtain the statistical summation result.

In an example, the foregoing mapping quantization coefficients in the at least one quantization coefficient to obtain at least one mapped quantization coefficient includes: mapping a quantization coefficient with an original value being an odd number in the at least one quantization coefficient into a first value to obtain at least one first quantization coefficient, and mapping a quantization coefficient with an original value being an even number in the at least one quantization coefficient into a second value to obtain at least one second quantization coefficient, the at least one mapped quantization coefficient including the at least one first quantization coefficient and/or the at least one second quantization coefficient; or mapping a quantization coefficient with an original value being zero in the at least one quantization coefficient into a first value to obtain at least one first quantization coefficient, and mapping a quantization coefficient with an original value being nonzero in the at least one quantization coefficient into a second value to obtain at least one second quantization coefficient, the at least one mapped quantization coefficient including the at least one first quantization coefficient and/or the at least one second quantization coefficient; or mapping a quantization coefficient with an original value being a nonzero even number in the at least one quantization coefficient into a first value to obtain at least one first quantization coefficient, and mapping a quantization coefficient with an original value being an odd number or zero in the at least one quantization coefficient into a second value to obtain at least one second quantization coefficient, the at least one mapped quantization coefficient including the at least one first quantization coefficient and/or the at least one second quantization coefficient; or performing computational mapping on the at least one quantization coefficient to obtain the at least one mapped quantization coefficient, the computational mapping including at least one of the following: negative mapping, additive mapping, subtractive mapping, multiplicative mapping, and divisive mapping.

In an example, the foregoing value obtaining module 1330 is configured to: determine the value of the target flag bit corresponding to the first reference information according to a correspondence relationship between reference information and a value of the target flag bit.

In an example, the reference information includes a first partial remainder and a second partial remainder, and the value of the target flag bit includes 0 and 1; and the correspondence relationship between reference information and a value of the target flag bit includes that: the first partial remainder corresponds to the value of the target flag bit being 0; and the second partial remainder corresponds to the value of the target flag bit being 1.

In an example, the first calculation factor is 2, the first partial remainder is 0, and the second partial remainder is 1.

In an example, the target flag bit includes at least one of the following: a first flag bit, used for indicating a partitioning direction of the target sub-block position of the target coding unit, the partitioning direction including transverse partitioning and longitudinal partitioning; and a second flag bit, used for indicating the target sub-block position of the target coding unit based on the partitioning direction indicated by the first flag bit.

In an example, as shown in FIG. 14, the foregoing apparatus 1300 further includes: an implicit indication determining module 1350, configured to determine, according to a target index in encoded data, whether it is necessary to determine a value of the target flag bit according to the quantization coefficient matrix for a coding unit in the encoded data, where the coding unit in the encoded data includes any one of the following: all coding units in the encoded data, a coding unit using an intra-frame prediction mode in the encoded data, and a coding unit using an inter-frame prediction mode in the encoded data.

In an example, as shown in FIG. 14, the foregoing implicit indication determining module 1350 is configured to implement at least one of the following: decoding a sequence header included in the encoded data to obtain a first index, the target index including the first index, and determining, according to the first index, whether it is necessary to determine the value of the target flag bit according to the quantization coefficient matrix for a coding unit in a first sequence; decoding an image header included in the encoded data to obtain a second index, the target index including the second index, and determining, according to the second index, whether it is necessary to determine the value of the target flag bit according to the quantization coefficient matrix for a coding unit in a first image; decoding a slice header included in the encoded data to obtain a third index, the target index including the third index, and determining, according to the third index, whether it is necessary to determine the value of the target flag bit according to the quantization coefficient matrix for a coding unit in a first slice; and decoding header information of a large coding unit included in the encoded data to obtain a fourth index, the target index including the fourth index, and determining, according to the fourth index, whether it is necessary to determine the value of the target flag bit according to the quantization coefficient matrix for a coding unit in the first large coding unit.

In an example, as shown in FIG. 14, the foregoing implicit indication determining module 1350 is configured to: decode a sequence header included in the encoded data to obtain a first index, the target index including the first index, and determining, according to the first index, whether it is necessary to determine the value of the target flag bit according to the quantization coefficient matrix for a coding unit in a first sequence; when the first index indicates that it is necessary to determine the value of the target flag bit according to the quantization coefficient matrix for the coding unit in the first sequence, decode an image header included in the encoded data to obtain a second index, the target index including the second index; and determine, according to the second index, whether it is necessary to determine the value of the target flag bit according to the quantization coefficient matrix for a coding unit in a first image.

In an example, as shown in FIG. 14, the foregoing apparatus 1300 further includes: an implicit indication determining module 1350, configured to: determine, according to a size relationship between a block size of a coding unit and a target block size, whether it is necessary to determine the value of the target flag bit according to the quantization coefficient matrix for the coding unit; or determine, according to a quantity of quantization coefficients with an original value being nonzero in a quantization coefficient matrix corresponding to a coding unit, whether it is necessary to determine the value of the target flag bit according to the quantization coefficient matrix for the coding unit; or determine, according to a position of vertex coordinates in a scan region coefficient coding SRCC region of a quantization coefficient matrix corresponding to a coding unit, whether it is necessary to determine the value of the target flag bit according to the quantization coefficient matrix for the coding unit.

In an example, as shown in FIG. 14, the foregoing apparatus 1300 further includes: a rotation determining module 1360, configured to determine, according to the value of the target flag bit, whether the quantization coefficient matrix needs to be rotated; a matrix rotation module 1370, configured to: when it is determined that the quantization coefficient matrix needs to be rotated, rotate a direction of the quantization coefficient matrix from a first direction to a second direction to obtain a rotated quantization coefficient matrix; and a coefficient processing module 1380, configured to process the rotated quantization coefficient matrix to obtain the residual data.

In an example, the processing the rotated quantization coefficient matrix includes: performing inverse quantization and inverse transform on the rotated quantization coefficient matrix, or performing inverse quantization on the rotated quantization coefficient matrix; when the processing the rotated quantization coefficient matrix includes performing inverse quantization and inverse transform on the rotated quantization coefficient matrix, the target flag bit is a transform flag bit, the target sub-block position is a sub-block transform position, and the sub-block transform position is a position of a sub-block that requires transform and quantization of the residual data in the coding unit; and when the processing the rotated quantization coefficient matrix includes performing inverse quantization on the rotated quantization coefficient matrix, the target flag bit is a transform skip flag bit, the target sub-block position is a transform skip sub-block position, and the transform skip sub-block position is a position of a sub-block that requires transform skip and quantization of the residual data in the coding unit.

In summary, in the technical solutions provided in the embodiments of this application, a flag bit of a sub-block transform position in a target coding unit is implicitly indicated by using a quantization coefficient in a quantization coefficient matrix corresponding to a coding unit to determine the sub-block transform position in the target coding unit, to avoid explicit coding of the sub-block transform position, thereby reducing a quantity of bits occupied by a video bit stream, and improving the efficiency of video coding. In addition, in the technical solutions provided in the embodiments of this application, it is not necessary to explicitly encode and decode every flag bit at a sub-block transform position, so that the processing overheads of a video encoder and a video decoder can be reduced, which is conducive to improving the encoding efficiency of the video encoder and the decoding efficiency of the video decoder. Alternatively, a flag bit of a transform skip sub-block position in a target coding unit is implicitly indicated by using a quantization coefficient in a quantization coefficient matrix corresponding to a coding unit to determine the transform skip sub-block position in the target coding unit, to avoid explicit coding of the transform skip sub-block position, thereby reducing a quantity of bits occupied by a video bit stream, and improving the efficiency of video coding. In addition, in the technical solutions provided in the embodiments of this application, it is not necessary to explicitly encode and decode every flag bit at a transform skip sub-block position, so that the processing overheads of a video encoder and a video decoder can be reduced, which is conducive to improving the encoding efficiency of the video encoder and the decoding efficiency of the video decoder.

Figure 15:
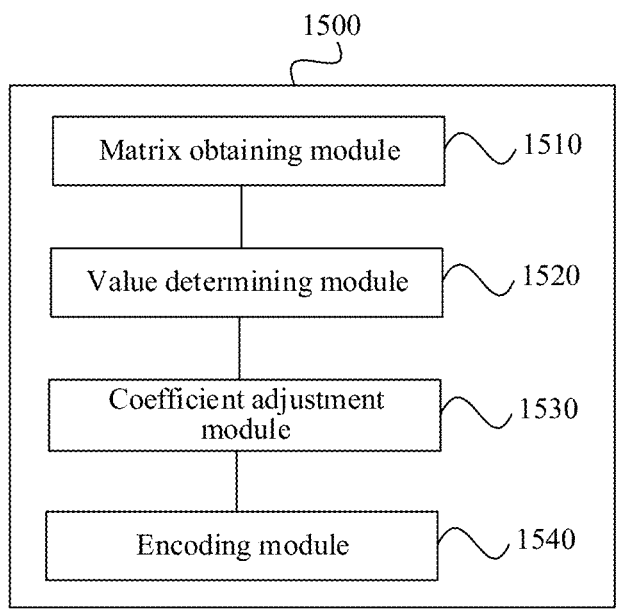
FIG. 15 is a block diagram of a video encoding apparatus according to an embodiment of this application.

FIG. 15 is a block diagram of a video decoding apparatus according to an embodiment of this application. The apparatus has functions of implementing an example of the foregoing video decoding method. The functions may be implemented by using hardware or may be implemented by using hardware executing corresponding software. The apparatus may be a video decoder or may be disposed in a video decoder. The apparatus 1500 may include a matrix obtaining module 1510, a value determining module 1520, a coefficient adjustment module 1530, and an encoding module 1540.

The matrix obtaining module 1510 is configured to obtain a quantization coefficient matrix corresponding to a target coding unit.

The value determining module 1520 is configured to determine a value of a target flag bit whose value needs to be indicated according to the quantization coefficient matrix, the target flag bit being a flag bit of a target sub-block position of the target coding unit, the target sub-block position being a position of a sub-block that requires processing of residual data in the target coding unit.

The coefficient adjustment module 1530 is configured to adjust a quantization coefficient in the quantization coefficient matrix according to the value of the target flag bit to obtain an adjusted quantization coefficient matrix.

The encoding module 1540 is configured to encode the adjusted quantization coefficient matrix.

In an example, the processing of the residual data includes: performing transform and quantization on the residual data or performing transform skip and quantization on the residual data; when the processing of the residual data includes performing transform and quantization on the residual data, the target flag bit is a transform flag bit, the target sub-block position is a sub-block transform position, and the sub-block transform position is a position of a sub-block that requires transform and quantization of the residual data in the coding unit; and when the processing of the residual data includes performing transform skip and quantization on the residual data, the target flag bit is a transform skip flag bit, the target sub-block position is a transform skip sub-block position, and the transform skip sub-block position is a position of a sub-block that requires transform skip and quantization of the residual data in the coding unit.

Figure 16:
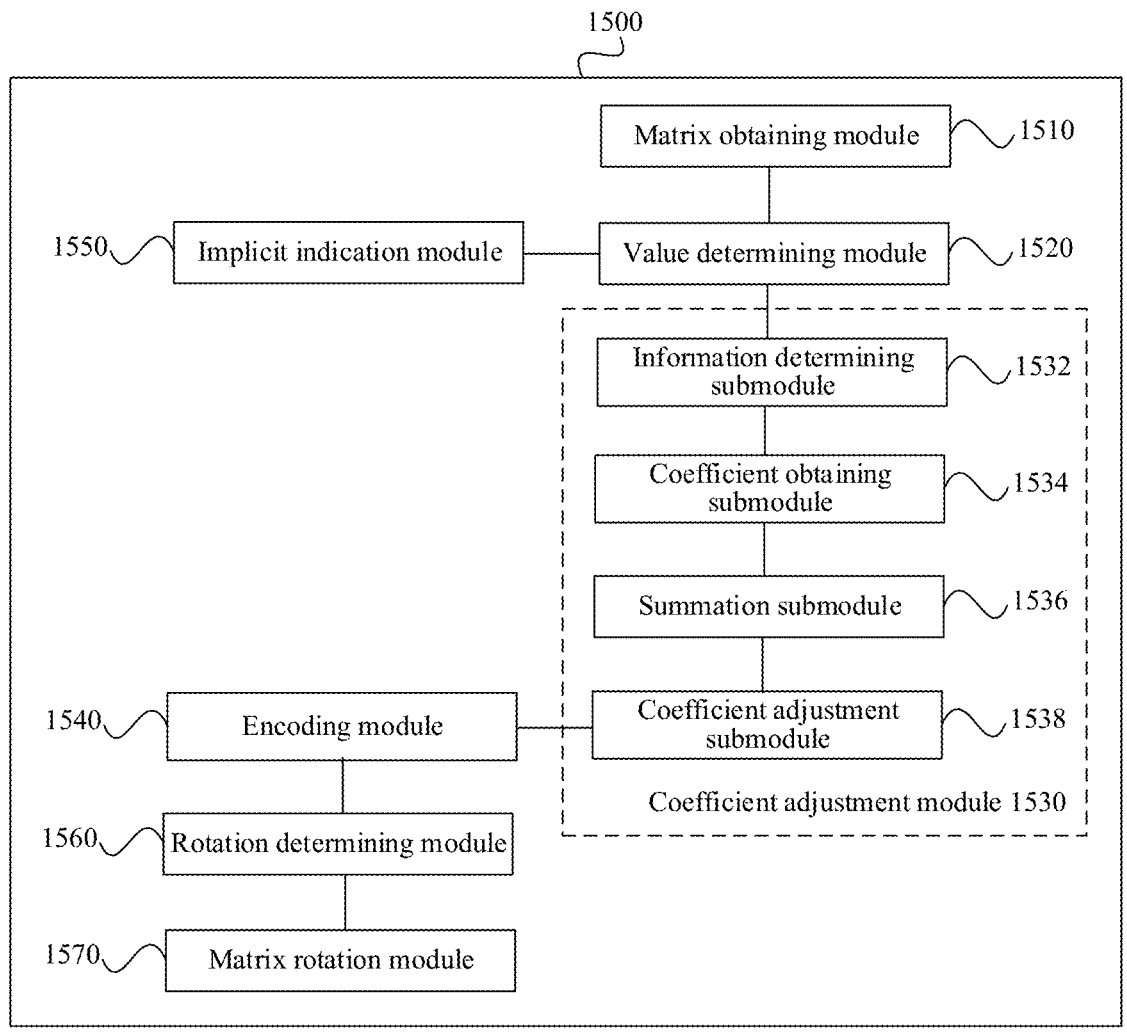
FIG. 16 is a block diagram of a video encoding apparatus according to another embodiment of this application.

In an example, as shown in FIG. 16, the foregoing coefficient adjustment module 1530 includes: an information determining submodule 1532, configured to determine reference information corresponding to the value of the target flag bit as first reference information; a coefficient obtaining submodule 1534, configured to obtain at least one quantization coefficient in the quantization coefficient matrix; a summation submodule 1536, configured to perform statistical summation on the at least one quantization coefficient to obtain a statistical summation result; and a coefficient adjustment submodule 1538, configured to adjust the at least one quantization coefficient according to the statistical summation result, the first reference information, and a first calculation factor to obtain at least one adjusted quantization coefficient, the first reference information being obtained by calculating a remainder of a statistical summation result of the at least one adjusted quantization coefficient by using the first calculation factor, the first calculation factor being a nonzero integer.

In an example, as shown in FIG. 16, the foregoing coefficient obtaining submodule 1534 is configured to implement any manner in the following: obtaining all quantization coefficients in the quantization coefficient matrix; obtaining quantization coefficients in at least one row and at least one column in the quantization coefficient matrix; obtaining all quantization coefficients in an SRCC region of the quantization coefficient matrix; and obtaining quantization coefficients in at least one row and at least one column in an SRCC region of the quantization coefficient matrix.

In an example, as shown in FIG. 16, the coefficient obtaining submodule 1534 is configured to implement at least one manner in the following: obtaining a quantization coefficient in at least one designated position in the quantization coefficient matrix; obtaining quantization coefficients in at least one row in the quantization coefficient matrix; obtaining quantization coefficients in at least one column in the quantization coefficient matrix; obtaining quantization coefficients in at least one diagonal in the quantization coefficient matrix; obtaining quantization coefficients in first n positions in a scan order in the quantization coefficient matrix, n being a positive integer; and obtaining quantization coefficients in middle m positions in a scan order in the quantization coefficient matrix, m being a positive integer.

In an example, as shown in FIG. 16, the coefficient obtaining submodule 1534 is configured to implement at least one manner in the following: obtaining a quantization coefficient in at least one designated position in an SRCC region of the quantization coefficient matrix; obtaining quantization coefficients in at least one row in an SRCC region of the quantization coefficient matrix; obtaining quantization coefficients in at least one column in an SRCC region of the quantization coefficient matrix; obtaining quantization coefficients in at least one diagonal in an SRCC region of the quantization coefficient matrix; obtaining quantization coefficients in first s positions in a scan order in an SRCC region of the quantization coefficient matrix, s being a positive integer; and obtaining quantization coefficients in middle t positions in a scan order in an SRCC region of the quantization coefficient matrix, t being a positive integer.

In an example, as shown in FIG. 16, the foregoing summation submodule 1536 is configured to: perform statistical summation on an original value of the at least one quantization coefficient to obtain the statistical summation result; or perform statistical summation on an absolute value of the at least one quantization coefficient to obtain the statistical summation result; or perform statistical summation on an original value of a quantization coefficient with an original value being an odd number in the at least one quantization coefficient to obtain the statistical summation result; or perform statistical summation on an original value of a quantization coefficient with an absolute value being an odd number in the at least one quantization coefficient to obtain the statistical summation result; or perform statistical summation on an original value of a quantization coefficient with an original value being an even number in the at least one quantization coefficient to obtain the statistical summation result; or perform statistical summation on an original value of a quantization coefficient with an absolute value being an even number in the at least one quantization coefficient to obtain the statistical summation result; or perform statistical summation on an original value of a quantization coefficient with an original value being a nonzero even number in the at least one quantization coefficient to obtain the statistical summation result; or perform statistical summation on an original value of a quantization coefficient with an absolute value being a nonzero even number in the at least one quantization coefficient to obtain the statistical summation result; or map quantization coefficients in the at least one quantization coefficient to obtain at least one mapped quantization coefficient, and perform statistical summation on the at least one mapped quantization coefficient to obtain the statistical summation result.

In an example, the mapping quantization coefficients in the at least one quantization coefficient to obtain at least one mapped quantization coefficient includes: mapping a quantization coefficient with an original value being an odd number in the at least one quantization coefficient into a first value to obtain at least one first quantization coefficient, and mapping a quantization coefficient with an original value being an even number in the at least one quantization coefficient into a second value to obtain at least one second quantization coefficient, the at least one mapped quantization coefficient including the at least one first quantization coefficient and/or the at least one second quantization coefficient; or mapping a quantization coefficient with an original value being zero in the at least one quantization coefficient into a first value to obtain at least one first quantization coefficient, and mapping a quantization coefficient with an original value being nonzero in the at least one quantization coefficient into a second value to obtain at least one second quantization coefficient, the at least one mapped quantization coefficient including the at least one first quantization coefficient and/or the at least one second quantization coefficient; or mapping a quantization coefficient with an original value being a nonzero even number in the at least one quantization coefficient into a first value to obtain at least one first quantization coefficient, and mapping a quantization coefficient with an original value being an odd number or zero in the at least one quantization coefficient into a second value to obtain at least one second quantization coefficient, the at least one mapped quantization coefficient including the at least one first quantization coefficient and/or the at least one second quantization coefficient; or performing computational mapping on the at least one quantization coefficient to obtain the at least one mapped quantization coefficient, the computational mapping including at least one of the following: negative mapping, additive mapping, subtractive mapping, multiplicative mapping, and divisive mapping.

In an example, the target flag bit includes at least one of the following: a first flag bit, used for indicating a partitioning direction of the target sub-block position of the target coding unit, the partitioning direction including transverse partitioning and longitudinal partitioning; and a second flag bit, used for indicating the target sub-block position of the target coding unit based on the partitioning direction indicated by the first flag bit.

In an example, as shown in FIG. 16, the foregoing apparatus 1500 further includes: an implicit indication module 1550, configured to: indicate, according to a target index in encoded data, whether it is necessary to determine a value of the target flag bit according to the quantization coefficient matrix for a coding unit in the encoded data, where the coding unit in the encoded data includes any one of the following: all coding units in the encoded data, a coding unit using an intra-frame prediction mode in the encoded data, and a coding unit using an inter-frame prediction mode in the encoded data.

In an example, as shown in FIG. 16, the foregoing implicit indication module 1550 is configured to implement at least one manner in the following: indicating, according to a first index encoded in a sequence header included in the encoded data, whether it is necessary to determine the value of the target flag bit according to the quantization coefficient matrix for a coding unit in a first sequence, the target index including the first index; indicating, according to a second index encoded in an image header included in the encoded data, whether it is necessary to determine the value of the target flag bit according to the quantization coefficient matrix for a coding unit in a first image, the target index including the second index; indicating, according to a third index encoded in a slice header included in the encoded data, whether it is necessary to determine the value of the target flag bit according to the quantization coefficient matrix for a coding unit in a first slice, the target index including the third index; and indicating, according to a fourth index encoded in header information of a large coding unit included in the encoded data, whether it is necessary to determine the value of the target flag bit according to the quantization coefficient matrix for a coding unit in a first large coding unit, the target index including the fourth index.

In an example, as shown in FIG. 16, the foregoing implicit indication module 1550 is configured to: when it is necessary to determine the value of the target flag bit according to the quantization coefficient matrix for the coding unit in the first image, indicate, according to a first index encoded in a sequence header included in the encoded data and a second index encoded in an image header included in the encoded data, whether it is necessary to determine the value of the target flag bit according to the quantization coefficient matrix for the coding unit in the first image, the target index including the first index and the second index.

In an example, the foregoing matrix obtaining module 1510 is configured to: perform predictive coding on the target coding unit to obtain residual data corresponding to the target coding unit; determine the target sub-block position of the target coding unit; and process the residual data according to the target sub-block position to obtain the quantization coefficient matrix.

In an example, as shown in FIG. 16, the foregoing apparatus 1500 includes: a rotation determining module 1560, configured to determine, according to the value of a flag bit of the target sub-block position, whether the quantization coefficient matrix needs to be rotated; and a matrix rotation module 1570, configured to: when it is determined that the quantization coefficient matrix needs to be rotated, rotate a direction of the quantization coefficient matrix from a second direction to a first direction to obtain a rotated quantization coefficient matrix, the rotated quantization coefficient matrix being used for encoding.

In summary, in the technical solutions provided in the embodiments of this application, a quantization coefficient in a quantization coefficient matrix is adjusted according to a value of a flag bit of a sub-block transform position of a coding unit, to allow a video decoder to determine the value of the flag bit of the sub-block transform position according to the adjusted quantization coefficient in the quantization coefficient matrix, so that a flag bit of a sub-block transform position in a target coding unit is implicitly indicated according to a quantization coefficient in a quantization coefficient matrix corresponding to a coding unit, to avoid explicit coding of the sub-block transform position, thereby reducing a quantity of bits occupied by a video bit stream, and improving the efficiency of video coding. In addition, in the technical solutions provided in the embodiments of this application, it is not necessary to explicitly encode and decode every flag bit at a sub-block transform position, so that the processing overheads of a video encoder and a video decoder can be reduced, which is conducive to improving the encoding efficiency of the video encoder and the decoding efficiency of the video decoder. Alternatively, a flag bit of a transform skip sub-block position in a target coding unit is implicitly indicated by using a quantization coefficient in a quantization coefficient matrix corresponding to a coding unit to determine the transform skip sub-block position in the target coding unit, to avoid explicit coding of the transform skip sub-block position, thereby reducing a quantity of bits occupied by a video bit stream, and improving the efficiency of video coding. In addition, in the technical solutions provided in the embodiments of this application, it is not necessary to explicitly encode and decode every flag bit at a transform skip sub-block position, so that the processing overheads of a video encoder and a video decoder can be reduced, which is conducive to improving the encoding efficiency of the video encoder and the decoding efficiency of the video decoder.

When the apparatus provided in the foregoing embodiment implements the functions thereof, the division of the foregoing functional modules is merely used as an example for description. In practice, the foregoing functions may be assigned to and completed by different functional modules as required. That is, an internal structure of the device may be divided into different functional modules to complete all or some of the functions described above. In addition, the apparatus provided in the foregoing embodiment belongs to the same conception as the embodiment of the method. For a specific implementation process thereof, reference may be made to the method embodiment. Details are not described herein again.

Figure 17:
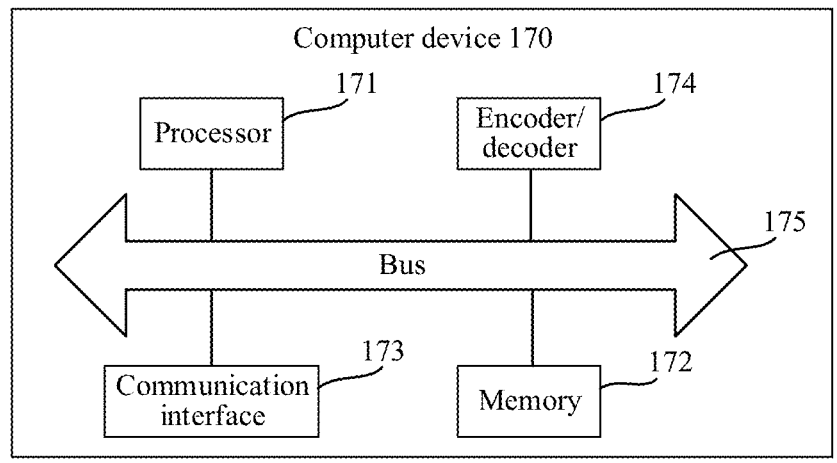
FIG. 17 is a structural block diagram of a computer device according to an embodiment of this application.

FIG. 17 is a structural block diagram of a computer device according to an embodiment of this application. The computer device may be a video decoder described above, for example, the second device 220 in the communication system shown in FIG. 6; or may be a video encoder described above, for example, the first device 210 in the communication system shown in FIG. 6 When the computer device is a video decoder, the computer device is configured to implement the foregoing video decoding method. When the computer device is a video encoder, the computer device is configured to implement the foregoing video encoding method. The computer device 170 may include a processor 171, a memory 172, a communication interface 173, an encoder/decoder 174, and a bus 175.

The processor 171 includes one or more processing cores. The processor 171 runs software programs and modules to perform various function application and information processing.

The memory 172 may be configured to store a computer program. The processor 171 is configured to execute the computer program to implement the foregoing video decoding method or implement the foregoing video encoding method.

The communication interface 173 may be configured to perform communication with other devices, for example, transmit and receive audio/video data.

The encoder/decoder 174 may be configured to implement encoding and decoding functions, for example, encode and decode audio/video data.

The memory 172 is connected to the processor 171 by the bus 175.

In addition, the memory 172 may be implemented by a volatile or non-volatile storage device of any type or a combination thereof. The volatile or non-volatile storage device includes, but is not limited to, a magnetic disk, an optical disc, an electrically erasable programmable read-only memory (EEPROM), an erasable programmable read-only memory (EPROM), a static random-access memory (SRAM), a read-only memory (ROM), a magnetic memory, a flash memory, and a programmable read-only memory (PROM).

A person skilled in the art may understand that the structure shown in FIG. 17 does not constitute any limitation on the computer device 170, and the computer device may include more components or fewer components than those shown in the figure, or some components may be combined, or a different component deployment may be used.

In an exemplary embodiment, a computer-readable storage medium is further provided, the storage medium storing at least one instruction, at least one program, a code set or an instruction set, the at least one instruction, the at least one program, the code set, or the instruction set being executed by a processor of a computer device to implement the foregoing video decoding method or to implement the foregoing video encoding method.

In some embodiments, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product or a computer program is provided. The computer program product or the computer program includes computer instructions, and the computer instructions are stored in a computer-readable storage medium. A processor of a computer device reads the computer instructions from the computer-readable storage medium, the processor executing the computer instructions, to cause the computer device to perform the foregoing video decoding method or implement the foregoing video encoding method.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an exemplary embodiment, a chip is further provided, the chip including a programmable logic circuit and/or program instructions, the chip being configured to, when being run on a computer device, implement the foregoing video decoding method or to implement the foregoing video encoding method.

What is claimed is:

1. A video decoding method, comprising:
   decoding a target coding unit to obtain a quantization coefficient matrix corresponding to the target coding unit;
   determining first reference information according to a quantization coefficient in the quantization coefficient matrix, including:
      obtaining at least one quantization coefficient in the quantization coefficient matrix;
      performing statistical summation on the at least one quantization coefficient to obtain a statistical summation result; and
      calculating a remainder of the statistical summation result according to a first calculation factor to obtain the first reference information, the first calculation factor being a nonzero integer;
   obtaining a value of a target flag bit corresponding to the first reference information, the target flag bit being a flag bit of a target sub-block position, the target sub-block position being a position of a sub-block that requires processing of residual data in a coding unit; and
   determining the target sub-block position of the target coding unit according to the value of the target flag bit.

2. The method according to claim 1, wherein processing of the residual data comprises: performing transform and quantization on the residual data or performing transform skip and quantization on the residual data;
   in accordance with a determination that processing of the residual data comprises performing transform and quantization on the residual data, setting the target flag bit as a transform flag bit, setting the target sub-block position as a sub-block transform position, and setting the sub-block transform position as a position of a sub-block that requires transform and quantization of the residual data in the coding unit; and
   in accordance with a determination that processing of the residual data comprises performing transform skip and quantization on the residual data, setting the target flag bit as a transform skip flag bit, setting the target sub-block position as a transform skip sub-block position, and setting the transform skip sub-block position as a position of a sub-block that requires transform skip and quantization of the residual data in the coding unit.

3. The method according to claim 1, wherein the at least one quantization coefficient in the quantization coefficient matrix is obtained in a manner selected from the group consisting of:
   obtaining all quantization coefficients in the quantization coefficient matrix;
   obtaining quantization coefficients in at least one row and at least one column in the quantization coefficient matrix;
   obtaining all quantization coefficients in a scan region coefficient coding (SRCC) region of the quantization coefficient matrix; and
   obtaining quantization coefficients in at least one row and at least one column in an SRCC region of the quantization coefficient matrix.

4. The method according to claim 1, wherein the at least one quantization coefficient in the quantization coefficient matrix is obtained in one or more manners selected from a group consisting of:
   obtaining a quantization coefficient in at least one designated position in the quantization coefficient matrix;
   obtaining quantization coefficients in at least one row in the quantization coefficient matrix;
   obtaining quantization coefficients in at least one column in the quantization coefficient matrix;
   obtaining quantization coefficients in at least one diagonal in the quantization coefficient matrix;
   obtaining quantization coefficients in first n positions in a scan order in the quantization coefficient matrix, n being a positive integer; and
   obtaining quantization coefficients in middle m positions in a scan order in the quantization coefficient matrix, m being a positive integer.

5. The method according to claim 1, wherein the at least one quantization coefficient in the quantization coefficient matrix is obtained in one or more manners selecting from a group consisting of:
   obtaining a quantization coefficient in at least one designated position in a scan region coefficient coding (SRCC) region of the quantization coefficient matrix;
   obtaining quantization coefficients in at least one row in an SRCC region of the quantization coefficient matrix;
   obtaining quantization coefficients in at least one column in an SRCC region of the quantization coefficient matrix;
   obtaining quantization coefficients in at least one diagonal in an SRCC region of the quantization coefficient matrix;
   obtaining quantization coefficients in first s positions in a scan order in an SRCC region of the quantization coefficient matrix, s being a positive integer; and
   obtaining quantization coefficients in middle t positions in a scan order in an SRCC region of the quantization coefficient matrix, t being a positive integer.

6. The method according to claim 1, wherein performing statistical summation on the at least one quantization coefficient to obtain a statistical summation result comprises:
   performing statistical summation on an original value or an absolute value of the at least one quantization coefficient to obtain the statistical summation result; or
   performing statistical summation on an original value of a quantization coefficient with an original value or an absolute value being an odd number in the at least one quantization coefficient to obtain the statistical summation result; or
   performing statistical summation on an original value of a quantization coefficient with an original value or an absolute value being an even number in the at least one quantization coefficient to obtain the statistical summation result; or
   performing statistical summation on an original value of a quantization coefficient with an original value or an absolute value being a nonzero even number in the at least one quantization coefficient to obtain the statistical summation result; or
   mapping quantization coefficients in the at least one quantization coefficient to obtain at least one mapped quantization coefficient, and performing statistical summation on the at least one mapped quantization coefficient to obtain the statistical summation result.

7. The method according to claim 6, wherein mapping quantization coefficients in the at least one quantization coefficient to obtain at least one mapped quantization coefficient comprises:
   mapping a quantization coefficient with an original value being an odd number in the at least one quantization coefficient into a first value to obtain at least one first quantization coefficient, and mapping a quantization coefficient with an original value being an even number in the at least one quantization coefficient into a second value to obtain at least one second quantization coefficient, the at least one mapped quantization coefficient comprising the at least one first quantization coefficient and/or the at least one second quantization coefficient; or mapping a quantization coefficient with an original value being a nonzero even number in the at least one quantization coefficient into a first value to obtain at least one first quantization coefficient, and mapping a quantization coefficient with an original value being an odd number or zero in the at least one quantization coefficient into a second value to obtain at least one second quantization coefficient, the at least one mapped quantization coefficient comprising the at least one first quantization coefficient and/or the at least one second quantization coefficient; or mapping a quantization coefficient with an original value being zero in the at least one quantization coefficient into a first value to obtain at least one first quantization coefficient, and mapping a quantization coefficient with an original value being nonzero in the at least one quantization coefficient into a second value to obtain at least one second quantization coefficient, the at least one mapped quantization coefficient comprising the at least one first quantization coefficient and/or the at least one second quantization coefficient; or performing computational mapping on the at least one quantization coefficient to obtain the at least one mapped quantization coefficient, the computational mapping comprising at least one of the following: negative mapping, additive mapping, subtractive mapping, multiplicative mapping, and divisive mapping.

8. The method according to claim 1, wherein obtaining a value of a target flag bit corresponding to the first reference information comprises:

determining the value of the target flag bit corresponding to the first reference information according to a correspondence relationship between reference information and a value of the target flag bit.

9. The method according to claim 8, wherein the reference information comprises a first partial remainder and a second partial remainder, and the value of the target flag bit comprises 0 and 1; and the correspondence relationship between reference information and a value of the target flag bit comprises that:

the first partial remainder corresponds to the value of the target flag bit being 0; and the second partial remainder corresponds to the value of the target flag bit being 1.

10. The method according to claim 9, wherein the first partial remainder is 0, and the second partial remainder is 1.

11. The method according to claim 1, wherein the target flag bit comprises at least one of the following:

a first flag bit, used for indicating a partitioning direction of the target sub-block position of the target coding unit, the partitioning direction comprising transverse partitioning and longitudinal partitioning; and a second flag bit, used for indicating the target sub-block position of the target coding unit based on the partitioning direction indicated by the first flag bit.

12. The method according to claim 1, wherein the method further comprises:

determining a value of the target flag bit according to the quantization coefficient matrix for a coding unit in encoded data based on a target index in the encoded data, wherein the coding unit in the encoded data comprises one or more of: coding units in the encoded data, a coding unit using an intra-frame prediction mode in the encoded data, and a coding unit using an inter-frame prediction mode in the encoded data.

13. The method according to claim 12, wherein determining the value of the target flag bit based on the target index in the encoded data comprises one of more elements selected from a group consisting of:

decoding a sequence header in the encoded data to obtain a first index, the target index includes the first index, and determining the value of the target flag bit according to the quantization coefficient matrix for a coding unit in a first sequence based on the first index;

decoding an image header in the encoded data to obtain a second index, the target index includes the second index, and determining the value of the target flag bit according to the quantization coefficient matrix for a coding unit in a first image based on the second index;

decoding a slice header in the encoded data to obtain a third index, the target index includes the third index, and determining, the value of the target flag bit according to the quantization coefficient matrix for a coding unit in a first slice based on the third index; and decoding header information of a large coding unit in the encoded data to obtain a fourth index, the target index includes the fourth index, and determining, the value of the target flag bit according to the quantization coefficient matrix for a coding unit in a first large coding unit (LCU) based on the fourth index.

14. The method according to claim 12, wherein determining the value of the target flag bit according to the quantization coefficient matrix for a coding unit in the encoded data based on the target index in the encoded data comprises:

decoding a sequence header in the encoded data to obtain a first index, the target index includes the first index, and determining the value of the target flag bit according to the quantization coefficient matrix for a coding unit in a first sequence based on the first index;

in accordance with a determination that the first index meets a first criteria, decoding an image header in the encoded data to obtain a second index, the target index includes the second index, and determining the value of the target flag bit according to the quantization coefficient matrix for a coding unit in a first image based on the second index.

15. The method according to claim 1, wherein the method further comprises:

determining the value of the target flag bit according to the quantization coefficient matrix for the coding unit based on a size relationship between a block size of a coding unit and a target block size; or determining the value of the target flag bit according to the quantization coefficient matrix for the coding unit based on a quantity of quantization coefficients with an original value being nonzero in a quantization coefficient matrix corresponding to a coding unit; or determining the value of the target flag bit according to the quantization coefficient matrix for the coding unit based on a position of vertex coordinates in a scan region coefficient coding (SRCC) region of a quantization coefficient matrix corresponding to a coding unit.

16. The method according to claim 1, wherein after obtaining a value of a target flag bit corresponding to the first reference information, the method further comprises:
- determining, based on the value of the target flag bit, whether the quantization coefficient matrix is to be rotated;
- in accordance with a determination that the quantization coefficient matrix is to be rotated, rotating a direction of the quantization coefficient matrix from a first direction to a second direction to obtain a rotated quantization coefficient matrix; and
- processing the rotated quantization coefficient matrix to obtain the residual data.

17. The method according to claim 16, wherein processing the rotated quantization coefficient matrix comprises: performing inverse quantization and inverse transform on the rotated quantization coefficient matrix, or performing inverse quantization on the rotated quantization coefficient matrix;
- in accordance with a determination that processing the rotated quantization coefficient matrix comprises performing inverse quantization and inverse transform on the rotated quantization coefficient matrix, the target flag bit is a transform flag bit, the target sub-block position is a sub-block transform position, and the sub-block transform position is a position of a sub-block that requires transform and quantization of the residual data in the coding unit; and
- in accordance with a determination that processing the rotated quantization coefficient matrix comprises performing inverse quantization on the rotated quantization coefficient matrix, setting the target flag bit as a transform skip flag bit, setting the target sub-block position as a transform skip sub-block position, corresponding to a position of a sub-block that requires transform skip and quantization of the residual data in the coding unit.

18. An electronic device, comprising:
one or more processors; and
memory storing one or more programs, the one or more programs comprising instructions that, when executed by the one or more processors, cause the one or more processors to perform operations comprising:
- decoding a target coding unit to obtain a quantization coefficient matrix corresponding to the target coding unit;
- determining first reference information according to a quantization coefficient in the quantization coefficient matrix, including:
  - obtaining at least one quantization coefficient in the quantization coefficient matrix;
  - performing statistical summation on the at least one quantization coefficient to obtain a statistical summation result; and
  - calculating a remainder of the statistical summation result according to a first calculation factor to obtain the first reference information, the first calculation factor being a nonzero integer;
- obtaining a value of a target flag bit corresponding to the first reference information, the target flag bit being a flag bit of a target sub-block position, the target sub-block position being a position of a sub-block that requires processing of residual data in a coding unit; and
- determining the target sub-block position of the target coding unit according to the value of the target flag bit.

19. A non-transitory computer-readable storage medium, storing a computer program, the computer program, when executed by one or more processors of an electronic device, cause the one or more processors to perform operations comprising:
- decoding a target coding unit to obtain a quantization coefficient matrix corresponding to the target coding unit;
- determining first reference information according to a quantization coefficient in the quantization coefficient matrix, including:
  - obtaining at least one quantization coefficient in the quantization coefficient matrix;
  - performing statistical summation on the at least one quantization coefficient to obtain a statistical summation result; and
  - calculating a remainder of the statistical summation result according to a first calculation factor to obtain the first reference information, the first calculation factor being a nonzero integer;
- obtaining a value of a target flag bit corresponding to the first reference information, the target flag bit being a flag bit of a target sub-block position, the target sub-block position being a position of a sub-block that requires processing of residual data in a coding unit; and
- determining the target sub-block position of the target coding unit according to the value of the target flag bit.

* * * * *